(12) United States Patent
Soltero Borrego et al.

(10) Patent No.: US 12,544,201 B2
(45) Date of Patent: Feb. 10, 2026

(54) MOLD ARCH REINFORCEMENT AND LABELING FOR DENTAL APPLIANCE MANUFACTURING

(71) Applicant: Align Technology, Inc., San Jose, CA (US)

(72) Inventors: Enrique Soltero Borrego, Ciudad Juárez (MX); Denis Fadeev, Moscow (RU); Alexey Kalinichenko, Cary, NC (US); Anatoliy Parpara, Moscow (RU); Fernando Jose Lopez Diaz, Ciudad Juarez (MX); Daniel Antonio Hernandez Lopez, Ciudad Juarez (MX); Isidro Salvador Gonzalez Tobias, Ciudad Juarez (MX)

(73) Assignee: Align Technology, Inc., San Jose, CA (US)

( * ) Notice: Subject to any disclaimer, the term of this patent is extended or adjusted under 35 U.S.C. 154(b) by 468 days.

(21) Appl. No.: 18/103,450

(22) Filed: Jan. 30, 2023

(65) Prior Publication Data
US 2023/0301762 A1 Sep. 28, 2023

Related U.S. Application Data

(60) Provisional application No. 63/305,640, filed on Feb. 1, 2022.

(51) Int. Cl.
*A61C 13/20* (2006.01)
*A61C 13/00* (2006.01)

(52) U.S. Cl.
CPC .......... *A61C 13/20* (2013.01); *A61C 13/0004* (2013.01)

(58) Field of Classification Search
CPC ............................ A61C 13/20; A61C 13/0004
See application file for complete search history.

(56) References Cited

U.S. PATENT DOCUMENTS

| | | | |
|---|---|---|---|
| 2,531,786 A * | 11/1950 | Rembold | G06K 19/063 |
| | | | 209/547 |
| 6,210,162 B1 | 4/2001 | Chishti et al. | |
| 6,497,574 B1 | 12/2002 | Miller | |
| 6,957,118 B2 | 10/2005 | Kopelman et al. | |
| 6,976,627 B1 | 12/2005 | Culp et al. | |
| 7,092,784 B1 | 8/2006 | Simkins | |
| 7,220,124 B2 | 5/2007 | Taub et al. | |
| 7,236,842 B2 | 6/2007 | Kopelman et al. | |
| 7,245,977 B1 | 7/2007 | Simkins | |
| 7,261,533 B2 | 8/2007 | Wrosz et al. | |
| 7,335,024 B2 | 2/2008 | Wen | |
| 7,384,266 B2 | 6/2008 | Wen | |
| 7,435,084 B2 | 10/2008 | Liu et al. | |
| 7,472,789 B2 | 1/2009 | Wu et al. | |

(Continued)

*Primary Examiner* — Nicholas D Lucchesi
(74) *Attorney, Agent, or Firm* — Lowenstein Sandler LLP

(57) ABSTRACT

A mold for a dental appliance includes a dental arch portion and a beam. The dental arch portion is associated with teeth of a user. The dental arch portion includes a first distal portion, a second distal portion, and an incisor portion disposed between the first distal portion and the second distal portion. The beam extends from the first distal portion to the second distal portion. The beam includes a label portion disposed between the first distal portion and the second distal portion. The label portion forms a label for identification of the mold.

20 Claims, 17 Drawing Sheets

(56) References Cited

U.S. PATENT DOCUMENTS

| | | | |
|---|---|---|---|
| 7,473,097 B2 * | 1/2009 | Raby | A61C 13/16 433/213 |
| 7,476,100 B2 | 1/2009 | Kuo | |
| 7,481,647 B2 | 1/2009 | Sambu et al. | |
| 7,604,181 B2 * | 10/2009 | Culp | G06K 1/121 235/494 |
| 7,641,828 B2 | 1/2010 | DeSimone et al. | |
| 7,648,360 B2 | 1/2010 | Kuo | |
| 7,674,422 B2 | 3/2010 | Kuo | |
| 7,711,447 B2 | 5/2010 | Lu et al. | |
| 7,748,199 B2 | 7/2010 | Sankaran et al. | |
| 7,802,987 B1 | 9/2010 | Phan | |
| 7,819,659 B2 | 10/2010 | Wen | |
| 7,831,322 B2 | 11/2010 | Liu et al. | |
| 7,840,373 B2 | 11/2010 | Culp et al. | |
| 7,922,490 B2 | 4/2011 | Wen | |
| 7,957,824 B2 | 6/2011 | Boronvinskih et al. | |
| 8,019,465 B2 | 9/2011 | Spiridonov et al. | |
| 8,030,588 B2 | 10/2011 | Culp et al. | |
| 8,087,932 B2 | 1/2012 | Liu | |
| 8,636,513 B2 | 1/2014 | Wen | |
| 8,765,031 B2 | 7/2014 | Li et al. | |
| 8,776,391 B1 | 7/2014 | Kaza et al. | |
| 9,108,338 B2 | 8/2015 | Sirovskiy et al. | |
| 9,403,238 B2 | 8/2016 | Culp | |
| 9,943,386 B2 | 4/2018 | Webber et al. | |
| 9,943,991 B2 | 4/2018 | Tanugula et al. | |
| 10,336,102 B2 | 7/2019 | Cole | |
| 10,495,973 B2 | 12/2019 | Cole | |
| 10,783,629 B2 | 9/2020 | Parpara et al. | |
| 10,888,395 B2 | 1/2021 | Kopelman | |
| 11,189,021 B2 | 11/2021 | Shah et al. | |
| 11,295,444 B2 | 4/2022 | Cherkas et al. | |
| 11,420,362 B2 | 8/2022 | Mojdeh et al. | |
| 11,511,485 B2 | 11/2022 | Mojdeh et al. | |
| 11,534,277 B2 | 12/2022 | Chavez et al. | |
| 11,602,413 B2 | 3/2023 | Chen et al. | |
| 11,975,463 B2 * | 5/2024 | Lukacs | G06Q 10/087 |
| 12,329,609 B2 * | 6/2025 | DiMarino | A61C 9/0006 |
| 2004/0243361 A1 | 12/2004 | Steuben et al. | |
| 2006/0093982 A1 | 5/2006 | Wen | |
| 2006/0093987 A1 | 5/2006 | Wen | |
| 2006/0093993 A1 | 5/2006 | Wen | |
| 2006/0127850 A1 | 6/2006 | Wen | |
| 2006/0127857 A1 | 6/2006 | Zhenhuan et al. | |
| 2006/0127858 A1 | 6/2006 | Wen | |
| 2006/0127859 A1 | 6/2006 | Wen | |
| 2006/0127860 A1 | 6/2006 | Wen | |
| 2006/0172250 A1 | 8/2006 | Wen | |
| 2006/0199145 A1 | 9/2006 | Liu et al. | |
| 2007/0092853 A1 | 4/2007 | Liu et al. | |
| 2007/0243502 A1 | 10/2007 | Wen | |
| 2008/0083348 A1 | 4/2008 | Kuo et al. | |
| 2009/0148814 A1 | 6/2009 | Li et al. | |
| 2018/0263730 A1 * | 9/2018 | Sirovskiy | A61C 7/08 |
| 2020/0214801 A1 | 7/2020 | Wang et al. | |
| 2020/0246119 A1 * | 8/2020 | Long | B29C 64/20 |
| 2020/0290262 A1 | 9/2020 | Aguilar Mendez et al. | |
| 2021/0030516 A1 | 2/2021 | O'Leary et al. | |
| 2021/0045855 A1 * | 2/2021 | Long | A61C 7/08 |
| 2021/0178639 A1 | 6/2021 | Lukacs et al. | |
| 2022/0175499 A1 * | 6/2022 | DiMarino | A61C 9/0006 |
| 2023/0141168 A1 * | 5/2023 | Gui | A61C 13/34 433/24 |
| 2024/0033989 A1 * | 2/2024 | Martínez González | B29C 51/08 |

\* cited by examiner

MOLD ARCH REINFORCEMENT AND LABELING FOR DENTAL APPLIANCE MANUFACTURING

RELATED APPLICATIONS

This application claims the benefit of Provisional Application No. 63/305,640, filed Feb. 1, 2022, the entire content of which is incorporated by reference herein.

TECHNICAL FIELD

The technical field relates to the field of manufacturing and, in particular, to mold arch reinforcement and labeling for dental appliance manufacturing.

BACKGROUND

Systems produce molds that are used to form dental appliances to be used in corrective dentistry or orthodontic treatment. Dental appliances, such as palatal expanders, dental aligners and attachment formation templates, are used to perform particular functions in accordance with respective treatment plans. For example, incremental palatal expanders can include a set of dental appliances that fit into a palate of a patient and function to expand a patient's palate according to a treatment plan. Aligners can include polymeric dental appliances that include tooth-receiving cavities to receive and reposition a patient's teeth to correct malocclusions. Dental attachment templates can include dental appliances shaped to fit to a patient's dentition and allow for the placement of attachments, e.g., bonded attachments, prefabricated attachments, etc. to the patient's dentition.

SUMMARY

Some example implementations of the present disclosure are summarized herein.

In a first implementation, a mold is for a dental appliance. The mold comprises: a dental arch portion associated with a plurality of teeth of a user, the dental arch portion comprising a first distal portion, a second distal portion, and an incisor portion disposed between the first distal portion and the second distal portion; and a beam extending from the first distal portion to the second distal portion to reinforce the mold, wherein the beam comprises a label portion forming a label for identification of the mold.

A second implementation may further extend the first implementation. In the second implementation, the label comprises through-holes from an upper surface of the label portion to a lower surface of the label portion, wherein the through-holes form digits of an identifier of the label.

A third implementation may further extend the first or second implementations. In the third implementation, the mold further comprises: a pick and place component coupled to the beam, wherein the pick and place component is configured to be secured by dental appliance manufacturing equipment.

A fourth implementation may further extend any of the first through third implementations. In the fourth implementation, the beam comprises a flat portion configured to interface with a locking mechanism of a plate to secure the mold to the plate in a z-direction.

A fifth implementation may further extend any of the first through fourth implementations. In the fifth implementation, the mold further comprises a plurality of identifier features extending from one or more sidewalls of the beam for automated identification of the mold.

A sixth implementation may further extend any of the first through fifth implementations. In the sixth implementation, the beam comprises a reinforcement portion extending from the first distal portion of the dental arch portion to the second distal portion of the dental arch portion, wherein the reinforcement portion is configured to reinforce the beam, and wherein the reinforcement portion has a greater thickness than the label portion.

A seventh implementation may further extend any of the first through sixth implementations. In the seventh implementation, the mold further comprises: a first chamfer disposed between the label portion and the first distal portion of the dental arch portion; and a second chamfer disposed between the label portion and the second distal portion of the dental arch portion.

In an eighth implementation, a method comprises: determining a position of a beam of a mold relative to a dental arch portion of the mold, the dental arch portion comprising a first distal portion, a second distal portion, and an incisor portion disposed between the first distal portion and the second distal portion, wherein the beam is to extend from the first distal portion to the second distal portion; determining layout of an identifier to be formed on the beam between the first distal portion and the second distal portion; and determining a shape of the beam to be attached to the dental arch portion of the mold, wherein the mold is to be formed based on the position of the beam, the layout of the identifier, and the shape of the beam.

A ninth implementation may further extend the eighth implementation. In the ninth implementation, the determining of the position of the beam comprises: identifying a plurality of transformations of the mold, wherein each of the plurality of transformations comprises a corresponding position of the beam relative to the dental arch portion; slicing a three-dimensional (3D) model of the dental arch portion to generate two-dimensional (2D) contours of the 3D model; and selecting, based on the 2D contours, a first transformation of the plurality of transformations, wherein the first transformation comprises the position of the beam relative to the dental arch portion.

A tenth implementation may further extend the eighth or ninth implementations. In the tenth implementation, the selecting of the first transformation comprises: determining a width distance between distal ends of the beam from the first distal portion to the second distal portion in the first transformation meets a threshold distance.

An eleventh implementation may further extend any of the eighth through tenth implementations. In the eleventh implementation, the selecting of the first transformation comprises: determining that the beam is positioned between the incisor portion of the dental arch portion and a line intersecting a first distal end of the first distal portion and a second distal end of the second distal portion in the first transformation; and determining a length distance between the beam and the line in the first transformation meets a threshold distance.

A twelfth implementation may further extend any of the eighth through eleventh implementations. In the twelfth implementation, the selecting of the first transformation comprises: determining a feature offset distance between a pick and place component of the beam and corresponding identifier features extending from the beam in the first transformation meets a threshold distance, wherein the feature offset distance provides clearance for dental appliance manufacturing equipment to secure the pick and place component to move the mold.

A thirteenth implementation may further extend any of the eighth through twelfth implementations. In the thirteenth implementation, the selecting of the first transformation comprises: determining that the identifier to be formed in the beam is not obstructed by geometries of the mold.

A fourteenth implementation may further extend any of the eighth through thirteenth implementations. In the fourteenth implementation, the selecting of the first transformation is further based on determining a gap distance between a trim line of the dental arch portion and a connection between the dental arch portion and the beam in the first transformation meets a threshold distance.

A fifteenth implementation may further extend any of the eighth through fourteenth implementations. In the fifteenth implementation, the determining of the layout of the identifier to be formed on the beam comprises: identifying a predefined format for a label portion of the beam; determining, based on the identifier, digits of a label to be formed in the label portion of the beam; and determining, based on the identifier, a plurality of identifier features that are to extend from sidewalls of the beam, wherein the identifier features form a binary code to be decoded to verify the identifier determined from the digits of the label.

A sixteenth implementation may further extend any of the eighth through fifteenth implementations. In the sixteenth implementation, the shape of the beam comprises: a substantially flat label portion of the beam forming stencil digits cut through the beam based on the identifier; and a plurality of identifier features extending from sidewalls of the beam.

A seventeenth implementation may further extend any of the eighth through sixteenth implementations. In the seventeenth implementation, the shape of the beam comprises: reinforcement portions of the beam configured to prevent deformation of the beam, wherein the reinforcement portions of the beam have a greater thickness than the substantially flat label portion of the beam.

An eighteenth implementation may further extend any of the eighth through seventeenth implementations. In the eighteenth implementation, the shape of the beam comprises: chamfers between a label portion of the beam and the dental arch portion to prevent breakage of the beam, wherein the chamfers are to provide a gap distance between the beam and a trim line of the mold.

In a nineteenth implementation, a non-transitory machine-readable storage medium stores instructions which, when executed, cause a processing device to perform the method of any of the eighth through eighteenth implementations.

In a twentieth implementation, a system comprises: a memory; and a processing device coupled to the memory, the processing device to perform the method of any of the eighth through eighteenth implementations.

In a twenty-first implementation, a method of designing a virtual three-dimensional (3D) model of a mold for a dental appliance. The method comprises: determining an identifier to be associated with the mold, wherein the mold comprises a dental arch portion associated with a plurality of teeth of a user, wherein the dental arch portion comprises a first distal portion, a second distal portion, and an incisor portion disposed between the first distal portion and the second distal portion; determining, based on the identifier, a label to be formed in a label portion of a beam of the mold; and determining a placement of the beam, wherein the beam extends from the first distal portion to the second distal portion in the virtual 3D model of the mold.

A twenty-second implementation may further extend the twenty-first implementation. In the twenty-second implementation, the determining of the identifier comprises: determining a patient identifier associated with the mold; determining control information associated with the mold; determining a material of the dental appliance to be formed by the mold; determining a jaw associated with the mold; determining a material-jaw identifier based on the material and the jaw; and determining a stage identifier associated with the mold, wherein the identifier is based on the patient identifier, the control information, the material-jaw identifier, and the stage identifier.

A twenty-third implementation may further extend the twenty-first or twenty-second implementations. In the twenty-third implementation: the label is a cut-out label that comprises a plurality of digits; a first subset of the plurality of digits is associated with the patient identifier; a second subset of the plurality of digits is associated with the control information; a third subset of the plurality of digits is associated with the material-jaw identifier; and a fourth subset of the plurality of digits is associated with the stage identifier.

A twenty-fourth implementation may further extend any of the twenty-first through twenty-third implementations. In the twenty-fourth implementation, the method further comprises: determining a plurality of identifier features based on the patient identifier, the material-jaw identifier, and the stage identifier; and separating the plurality of identifier features into a first subset and a second subset, wherein the first subset of the plurality of identifier features are to be placed on a first sidewall of the beam and the second subset of the plurality of identifier features are to be formed on a second sidewall of the beam.

A twenty-fifth implementation may further extend any of the twenty-first through twenty-fourth implementations. In the twenty-fifth implementation, the method further comprises: determining a position of a pick and place component on the beam of the mold within a threshold distance of a center of the beam; and determining feature offset associated with the position of the pick and place component, wherein the first subset and the second subset are to be formed based on the feature offset.

A twenty-sixth implementation may further extend any of the twenty-first through twenty-fifth implementations. In the twenty-sixth implementation: a first control pin and a second control pin are to be formed on the first sidewall of the beam; the first subset of the plurality of identifier features are to extend from the first sidewall of the beam between the first control pin and the second control pin; a third control pin and a fourth control pin to be formed on the second sidewall of the beam; and the second subset of the plurality of identifier features extend from the second sidewall of the beam between the third control pin and the fourth control pin.

A twenty-seventh implementation may further extend any of the twenty-first through twenty-sixth implementations. In the twenty-seventh implementation, the method further comprises: determining a type of dental appliance to be formed by the mold, wherein a type label to be formed on a pick and place component of the mold based on the type of dental appliance.

In a twenty-eighth implementation, a non-transitory machine-readable storage medium stores instructions which, when executed, cause a processing device to perform the method of any of the twenty-first through twenty-seventh implementations.

In a twenty-ninth implementation, a system comprises: a memory; and a processing device coupled to the memory, the processing device to perform the method of any of the twenty-first through twenty-seventh implementations.

In a thirtieth implementation, a method is of identifying a mold of a dental arch. The method comprises: receiving an image of the mold of the dental arch; performing a first analysis of the image; determining a region of the image corresponding to a label formed by a label portion of a beam of the mold based on the first analysis, the label forming an identifier having a plurality of digits; performing a second analysis of the region of the image; and identifying, based on the second analysis of the region of the image, each digit of the plurality of digits of the identifier.

A thirty-first implementation may further extend the thirtieth implementation. In the thirty-first implementation, performing the first analysis comprises matching a template to the label portion in the image.

A thirty-second implementation may further extend the thirtieth or thirty-first implementations. In the thirty-second implementation, the method further comprises: receiving historical images of historical labels of historical molds, each of the historical labels being formed in a corresponding label portion of a corresponding beam of a corresponding historical mold; receiving historical regions associated with the historical images; and training a machine learning model using training input comprising the historical images and target outputs comprising the historical regions to generate a trained machine learning model, wherein the performing of the first analysis includes providing the image as input to the trained machine learning model.

A thirty-third implementation may further extend any of the thirtieth through thirty-second implementations. In the thirty-third implementation, the performing of the first analysis of the image comprises: providing the image as input to a trained machine learning model, the trained machine learning model being trained to output a boundary of the region; and receiving, from the trained machine learning model, the output indicative of the region of the image.

A thirty-fourth implementation may further extend any of the thirtieth through thirty-third implementations. In the thirty-fourth implementation, the method further comprises: receiving historical sub-regions of historical images of historical labels of historical molds, each of the historical labels being formed in a corresponding label portion of a corresponding beam of a corresponding historical mold, each of the historical sub-regions corresponding to a historical digit of the historical labels; receiving historical digits of historical identifiers associated with the historical sub-regions; and training a machine learning model using training input comprising the historical sub-regions and target outputs comprising the historical digits to generate a trained machine learning model, wherein the performing of the second analysis includes providing sub-regions of the region of the image as input to the trained machine learning model.

A thirty-fifth implementation may further extend any of the thirtieth through thirty-fourth implementations. In the thirty-fourth implementation, the performing of the second analysis comprises: identifying, based on the region, sub-regions of the image, wherein each sub-region corresponds to a respective digit of the identifier of the mold; providing the sub-regions of the image as input to a trained machine learning model, the trained machine learning model being trained to output the plurality of digits of the identifier; and receiving, from the trained machine learning model, the output indicative of the plurality of digits of the identifier.

A thirty-sixth implementation may further extend any of the thirtieth through thirty-fifth implementations. In the thirty-sixth implementation, the method further comprises: performing a third analysis of the region of the image; identifying, based on the third analysis of the region of the image, identifier feature presence data of the beam; and verifying the identifier based on the identifier feature presence data of the beam.

A thirty-seventh implementation may further extend the thirty-sixth implementation. In the thirty-seventh implementation, the method further comprises: receiving historical sub-areas of historical images of historical beams of historical molds, each of the historical sub-areas corresponding to a historical potential identifier beam of the historical molds; receiving historical identifier feature presence data associated with the historical sub-areas of the historical images; and training a machine learning model using training input comprising the historical sub-areas and target outputs comprising the historical identifier feature presence data to generate a trained machine learning model, wherein the performing of the third analysis includes providing sub-areas of the image as input to the trained machine learning model.

A thirty-eighth implementation may further extend the thirtieth-sixth or thirty-seventh implementation. In the thirty-eighth implementation, the performing of the third analysis comprises: identify a portion of the image corresponding to a pick and place component of the beam of the mold; identifying, in the image, control features on sidewalls of the beam; identifying areas between the control features on either side of the portion of the image; identifying, based on the areas, sub-areas of the image, where each sub-area corresponds to a potential identifier feature of the beam; providing the sub-areas of the image as input to a trained machine learning model, the trained machine learning model being trained to output the identifier feature presence data; and receiving, from the trained machine learning model, the output indicative of the identifier feature presence data.

In a thirty-ninth implementation, a non-transitory machine-readable storage medium stores instructions which, when executed, cause a processing device to perform the method of any of the thirtieth through thirty-eighth implementations.

In a fortieth implementation, a system comprises: a memory; and a processing device coupled to the memory, the processing device to perform the method of any of the thirtieth through thirty-eighth implementations.

BRIEF DESCRIPTION OF THE DRAWINGS

The present invention is illustrated by way of example, and not by way of limitation, in the figures of the accompanying drawings.

DETAILED DESCRIPTION

Figure 1A:
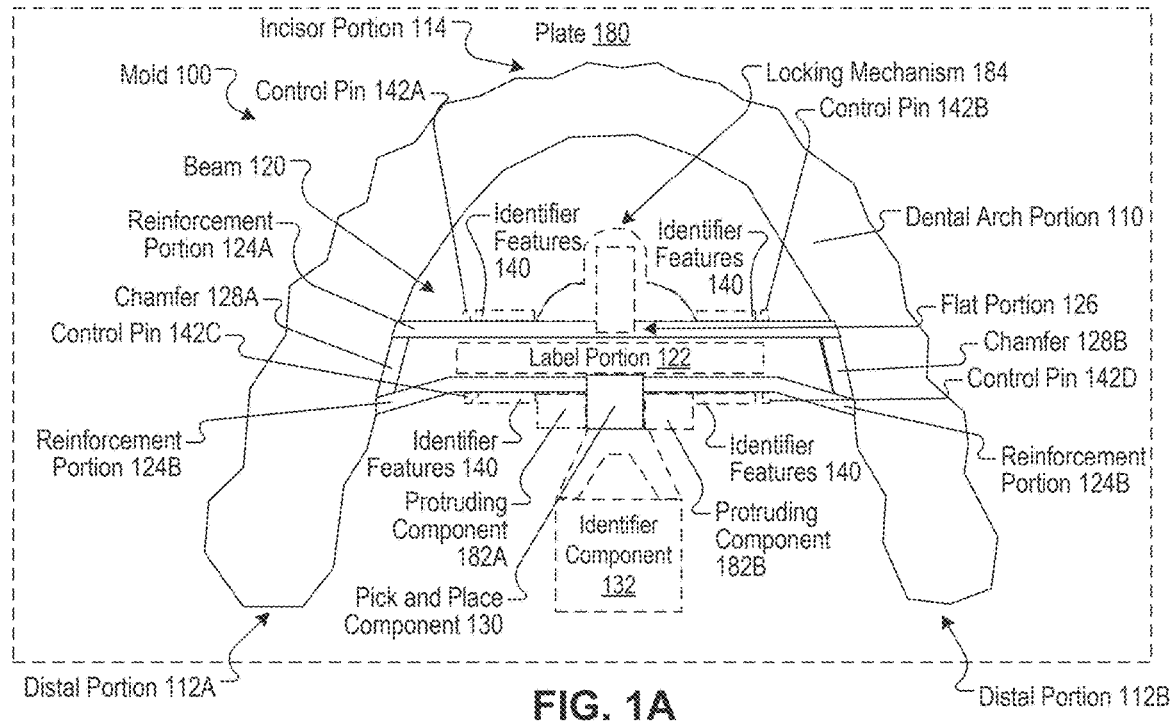
FIGS. 1A-E illustrate molds for producing dental appliances, according to certain embodiments.

Described herein are technologies related to mold arch reinforcement and labeling for dental appliance manufacturing.

Manufacturing systems are used to produce products. Some manufacturing systems use molds to produce products. For example, some dental appliance systems use molds (e.g., of jaws, associated with teeth of a user, associated with a dental arch of a user, etc.) to form dental appliances. A dental appliance may include one or more incremental palatal expanders, orthodontic aligners (e.g., dental appliances with or without mandibular advancement structures and/or other structures), sleep apnea treatment devices, dental attachment templates, attachment formation templates (e.g., appliances used to place attachments that engage with attachment wells and/or other structures in aligners to exert repositioning forces on a patient's dentition) that include regions that comprise pre-fabricated (e.g., 3D printed) attachments, and/or other dental appliances.

During manufacturing of dental appliances, a mold may be manufactured, and that mold may pass through several production stages. Some molds are damaged during this process. Damaged molds cause failure in dental appliance production, defective dental appliances, damage to dental appliance manufacturing equipment, and/or reduced life of dental appliances.

Molds may pass through several production stages to produce dental appliances. Molds may include several registration and support features, each of which may be used for one of mold reinforcement, for pick and place treatment of the mold, to serve as a fixture for use by trimming and thermoforming machines, and to provide a machine readable label and a human readable label. These multiple features included in traditional molds consume materials and processing time in their manufacture. Moreover, these features limit the possible placement of the mold on dental appliance manufacturing equipment.

Moreover, molds are to be identified at the different production stages. Conventional systems add a human-readable identifier to a mold by adding additional material to the side of the mold to form a protruding identifier and adding a coating (e.g., ink, paint, etc.) to the protruding identifier so that the protruding identifier can be read by a user. Conventional systems may also add a machine-readable identifier to the mold by adding additional material and a coating (e.g., ink, paint, etc.) to the mold in the form of a digital matrix to be read by a machine. Conventional techniques for adding human and machine-read identifiers to molds use additional material and coatings than what is used for the body of the mold, use additional manufacturing processes, and are error prone. Conventional identifiers can be obstructed by portions of the mold and/or a dental appliance. Conventional solutions can interfere with dental appliance manufacturing and cause defective dental appliances. Conventional solutions can cause errors in reading of the identifier.

Embodiments of the devices, systems, components, and methods described herein address at least some of the above described deficiencies of conventional systems.

In some embodiments, a mold includes a dental arch portion and a beam. The dental arch portion is associated with teeth of a user (e.g., a dental arch of the user, an upper jaw or a lower jaw of the user). The dental arch portion may include a first distal portion (e.g., first molars), a second distal portion (e.g., second molars), and an incisor portion (e.g., incisors) disposed between the first distal portion and the second distal portion. The beam extends from the first distal portion to the second distal portion. The beam includes a label portion disposed between the first distal portion and the second distal portion. The label portion forms a label (e.g., cut-out label) for identification of the mold. In some embodiments, pins, protrusions, divots, recesses, and/or other features extend from and/or are included in the beam to form a machine-readable identifier for identifying or verifying the identifier of the mold.

In embodiments, the beam may be configured to perform the functions traditionally performed by multiple different features. For example, the beam may provide mold reinforcement, allow for pick and place treatment of the mold via the beam, serve as a fixture for use by trimming and thermoforming machines, and provide a machine readable label and a human readable label. Each mold may be designed with a tailored beam having a size and/or position on the mold to both provide a threshold level of reinforcement for the mold, to have a sufficient area to accommodate a machine and human readable label, and/or to maximize placement options of the mold on dental appliance manufacturing equipment.

A method may include determining an identifier for a mold. A method may include determining the position of components of the mold for manufacturing of the mold. A method may include forming a mold that includes the identifier (e.g., in the cut-out label, in the pins). A method may include reading the identifiers from the mold. In some embodiments, one or more trained machine learning models may be used to read the identifiers from the mold.

Aspects of the present disclosure result in technological advantages of significant reduction in wasted material, significant increase in throughput, and significant improvement in quality as compared to traditional dental appliance manufacturing systems. The mold of the present disclosure includes a beam that provides reinforcement of the mold compared to conventional molds. This allows the mold of the present disclosure to avoid failure in dental appliance production, defective dental appliances, damage to dental appliance equipment, and reduced life of dental appliances of conventional solutions. The identifiers (e.g., cut-out label and/or pins) of the present disclosure avoid the added material, added processes, and added errors of identifiers of conventional solutions. The methods of determining an identifier for a mold, determining positions of components of the mold, forming the mold, and reading the identifier from the mold of the present disclosure avoids errors in reading identifiers, errors in manufacturing, consumption of additional material, consumption of additional time, and performance of additional processes of conventional solutions. The mold of the present disclosure reduces a percentage of damaged molds, reduces material consumption, provides additional degrees of freedom for mold placement as compared to traditional molds for dental appliances, provides solid grip for a pick and place robot to grasp molds, provides a fixture for use by trimming and thermoforming machines, and provides a surface for mold labeling (e.g., both human- and machine-readable).

Although some embodiments of the present disclosure describe a mold for producing a dental appliance, in other embodiments, other types of objects may be formed and other processes may be performed by the methods of the present disclosure.

FIGS. 1A-1E illustrate molds 100 for producing dental appliances, according to certain embodiments. The mold 100 may be produced using rapid prototyping equipment (e.g., 3D printers) that may employ additive manufacturing techniques (e.g., stereolithography) and/or subtractive manufacturing techniques (e.g., milling). Printing of molds for dental appliance is discussed in greater detail below.

The mold 100 may be disposed on a plate 180 (e.g., platform). The plate 180 may have a substantially horizontal upper surface and the mold 100 may have a substantially horizontal lower surface (e.g., to be disposed on the substantially horizontal upper surface of the plate 180). FIG. 1A may be an upper view of the mold 100 disposed on a plate 180. The mold 100 may be lifted off of the plate 180 and placed onto the plate 180 in the positive and negative z-directions. The plate 180 may include one or more protruding components 182 and a locking mechanism 184.

Mold 100 includes a dental arch portion 110. The dental arch portion 110 may be associated with teeth of a patient (e.g., is a representation of teeth and a portion of the gums of a dental arch of the patient). A dental appliance may be formed on the dental arch portion 110, and then the dental appliance may later be used on the dental arch of the patient. The dental arch portion 110 includes a distal portion 112A, a distal portion 112B, and an incisor portion 114. The incisor portion 114 is between the distal portions 112A-B. The distal portions 112A-B may include the molars of the dental arch and the incisor portion 114 may include the incisors of the dental arch.

Mold 100 includes a beam 120. Beam 120 extends between distal portion 112A and distal portion 112B. Beam 120 includes a label portion 122 (e.g., substantially flat label portion) that is disposed between distal portion 112A and distal portion 112B. The label portion 122 forms a label for identification of the mold 100. In some embodiments, the label is a cut-out label that extends through the label portion 122 (e.g., the label includes through-holes from an upper surface of the label portion to a lower surface of the label portion, where the through-holes form digits). In some embodiments, the label is recessed into label portion 122. The label (e.g., cut-out label) is human-readable and/or machine-readable. The label may be or include a series of digits (e.g., numbers) that form the identifier. In some embodiments, the beam 120 combines a fixture for pick and place operation (e.g., pick and place component 130), a fixture for use by trimming and thermoforming machines (e.g., cut-out label formed in label portion 122 and/or identifier features 140), a surface (e.g., cut-out label) for a human and/or machine readable label, and mold reinforcement in one piece or component. The beam may additionally or alternatively be adapted for different purposes, such as additional identifier component 132 (e.g., data matrix part).

The beam 120 may be parameterized and adjusted to be used by dental appliance manufacturing equipment, as described in greater detail below.

Molds 100 of jaws are to be labeled with a patient identifier (PIN) and stage identifier (e.g., stage number) while they are manufactured (e.g., 3D printed) in embodiments. In subsequent operations (e.g., thermoforming and edge cutting of the dental appliance), molds 100 may be properly identified to perform respective patient ID and stage number dependent processing operations, such as to determine proper trimming instructions to use to trim the mold. The label (e.g., cut-out label) may be formed by stencil font symbols in some embodiments. The label (e.g., cut-out label) may be readable by both humans and machine vision systems, or by just humans or by just machine vision systems. Additional control information may be provided in the form of extra symbols in the label (e.g., cut-out label) and pins, divots or other features that can be recognizable by machine vision systems. The label (e.g., cut-out label) and/or the identifier features 140 may replace the digits printed on the side of conventional molds and data matrix codes coupled to molds for conventional machine vision systems. The identifier features 140 may include one or more pins, protrusions, recesses, grooves, and/or other types of features that are readable by a machine to determine a value (e.g., an identifier for the mold 100). Mold 100 may have reduced material consumption compared to conventional solutions. Mold 100 may combine both human- and machine-readable labels in one component (e.g., beam 120) of the mold 100.

In some embodiments, mold 100 includes a pick and place component 130 configured to be secured by dental appliance manufacturing equipment. The dental appliance manufacturing equipment (e.g., a robot) may secure the mold 100 via the pick and place component 130 to lift the mold 100 and place the mold 100 in a location for a dental appliance manufacturing process. The pick and place component 130 may be coupled to (e.g., secured to, adjacent to, integral with, part of) the beam 120. The pick and place component 130 has a height (e.g., in the z-direction) that is greater than the height of the beam 120 so that dental appliance manufacturing equipment can secure the pick and place component 130. In some embodiments, pick and place component 130 has a height (e.g., in the z-direction) that is greater than the height of the protruding components 182 of the plate 180.

In some embodiments, beam 120 includes one or more reinforcement portions 124 that extend from the distal portion 112A to the distal portion 112B to reinforce the beam 120 (e.g., in x-direction between distal portion 112A and distal portion 112B). Each reinforcement portion 124 may have a greater thickness (e.g., height in the z-direction) than label portion 122. In some embodiments, each reinforcement portion 124 may include a stronger material (e.g., metal) than the label portion 122. In some embodiments, each reinforcement portion 124 may be made of the same material as the label portion 122. Reinforcement portion 124A may include a first sidewall of the beam 120 and reinforcement portion 124B may include a second sidewall of the beam 120. Reinforcement portions 124 may reinforce the mold 100 while minimizing the material used to make beam 120 and while minimizing the material to be removed from label portion 122 to form the label (e.g., cut-out label).

Figure 1B:
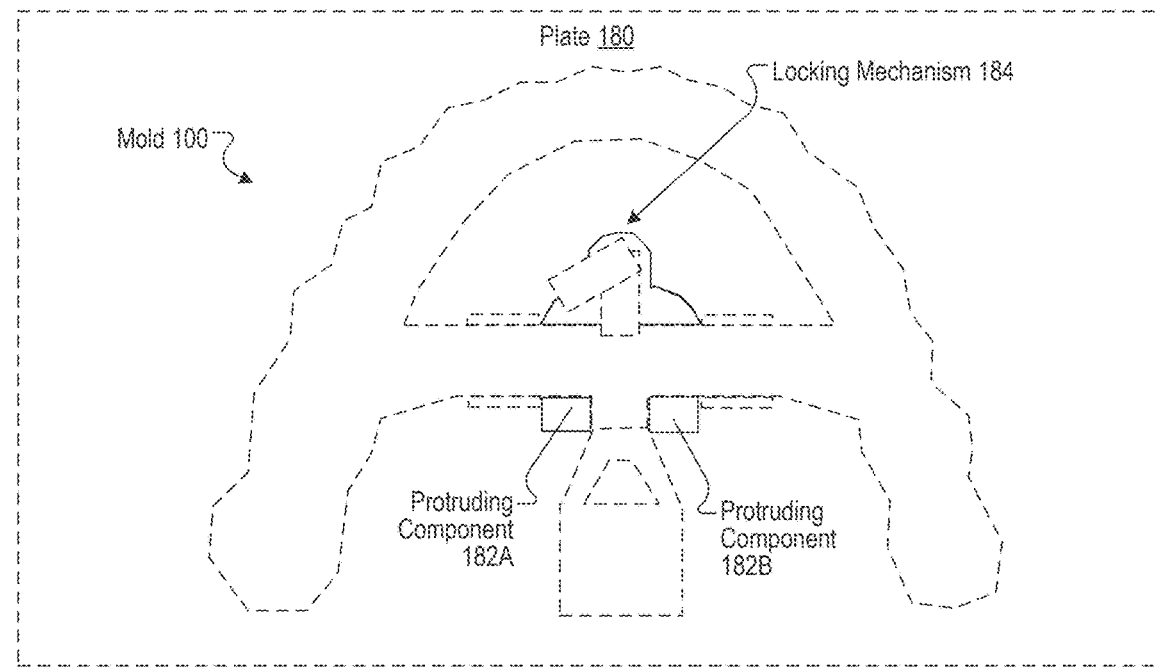

In some embodiments, beam 120 includes a flat portion 126 (e.g., of reinforcement portion 124A) configured to interface with a locking mechanism 184 of plate 180. The locking mechanism 184 may have a fixed portion 186 that is fixed to the plate 180 and a pivoting portion 188 that is pivotably coupled to the fixed portion 186. The pivoting portion 188 may pivot to overlap the flat portion 126 of the beam 120 of mold 100. The fixed portion 186 of the locking mechanism 184 and the protruding components 182A-B may secure the mold 100 in the x-direction and the y-direction and the pivoting portion 188 of the locking mechanism 184 may secure the mold 100 in the z-direction (e.g., in the thermoforming chamber). FIGS. 1B and 1E illustrate an unlocked position of the pivoting portion 188 that does not overlap the beam 120 and allows the mold 100 to be placed on the plate 180 and/or removed from the plate 180. FIGS. 1B and 1E further illustrate a locked position of the pivoting portion 188 that overlaps the beam 120 to prevent the mold 100 from being removed from the plate 180. As shown in FIG. 1E, fixed portion 186 may include a thicker portion (e.g., closer to distal portion 112B) that prevents the pivoting portion 188 from pivoting in a first direction (e.g., to the right from the locked position) and may have a thinner portion (e.g., closer to distal portion 112A) that allows the pivoting portion 188 to pivot in the second direction (e.g., to the left from the locked position). Dental appliance manufacturing equipment (e.g., a robot) may be configured to move the pivoting portion 188 to a locked position and to an unlocked position.

In some embodiments, mold 100 (e.g., beam 120) includes identifier features 140 for automated identification (e.g., machine-readable identification) of mold 100. In one embodiment, identifier features 140 extend from the sidewalls of beam 120 (e.g., from the reinforcement portions 124). In some embodiments, beam 120 includes a control pin 142A (or other control feature), which may be the pin or other feature closest to distal portion 112A proximate reinforcement portion 124A, a control pin 142B (or other control feature), which is the pin or feature closest to distal portion 112B proximate reinforcement portion 124A, control pin 142C (or other control feature), which is the pin or other feature closest to distal portion 112A proximate reinforcement portion 124B, and control pin 142D (or other control feature), which is the pin or other feature closest to distal portion 112B proximate reinforcement portion 124B. The identifier features 140 may be identified based on the control pins 142 or features (e.g., a first subset of the identifier features 140 are between control pins 142A-B and a second subset of the identifier features 140 are between the control pins 142C-D). The identifier features 140 may form a barcode (e.g., 0 for no pin, 1 for a pin) that is machine-readable to determine the identifier for mold 100 (which may be the same identifier as in the label (e.g., cut-out label) formed by label portion 122).

In some embodiments, mold 100 includes a chamfer 128A disposed between the label portion 122 and the distal portion 112A and a chamfer 128B disposed between the label portion 122 and the distal portion 112B. Each chamfer 128 may slope (e.g., increase in thickness) from the label portion 122 to the distal portion 112. Each chamfer 128 may be shaped to provide a clearance between the chamfer 128 and a cut-line along the mold 100 (e.g., a trim line for trimming the dental appliance from the mold 100).

In some embodiments, mold 100 (e.g., beam 120) includes an identifier component 132 that is coupled to the beam 120 (e.g., attached to the pick and place component 130 that is attached to or integral with beam 120). The identifier component 132 may be a digital matrix in some embodiments. The identifier component 132 may be used to verify the label (e.g., cut-out label) formed in label portion 122 and the identifier features 140. The identifier component 132 may be removed prior to performing dental appliance manufacturing processes.

Figure 1C:
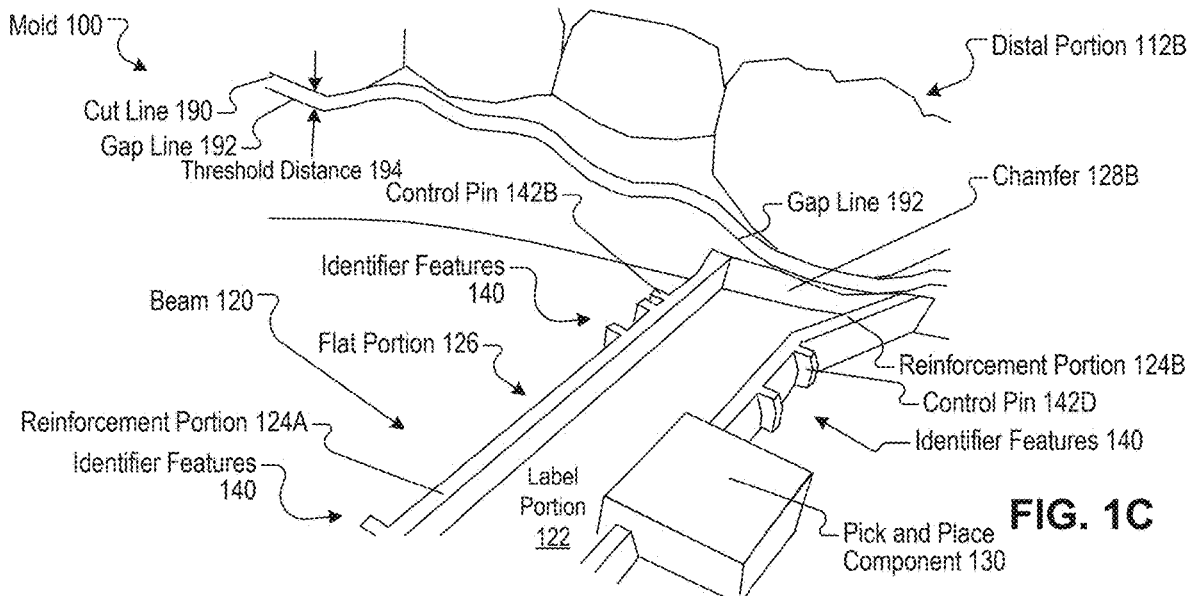
Figure 1D:
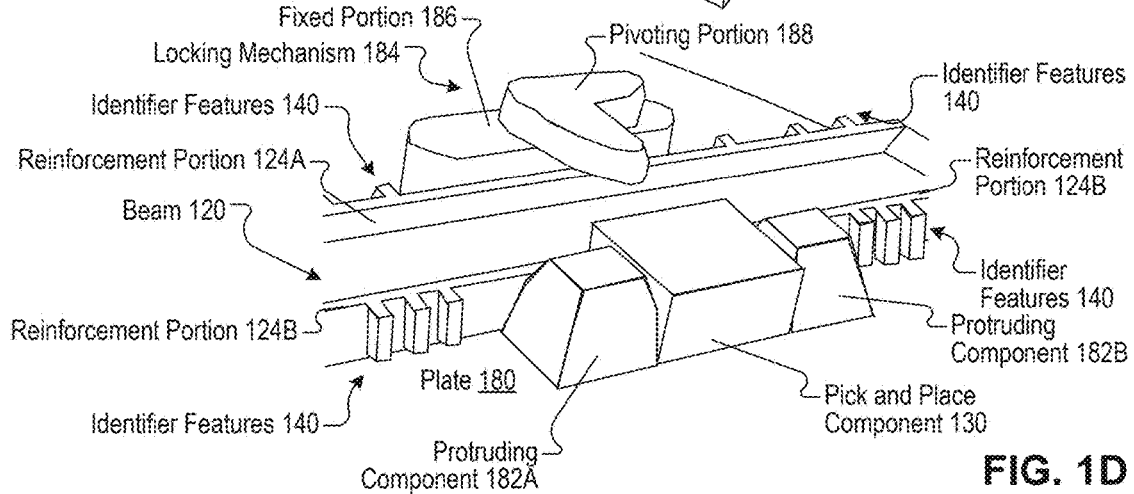
Figure 1E:
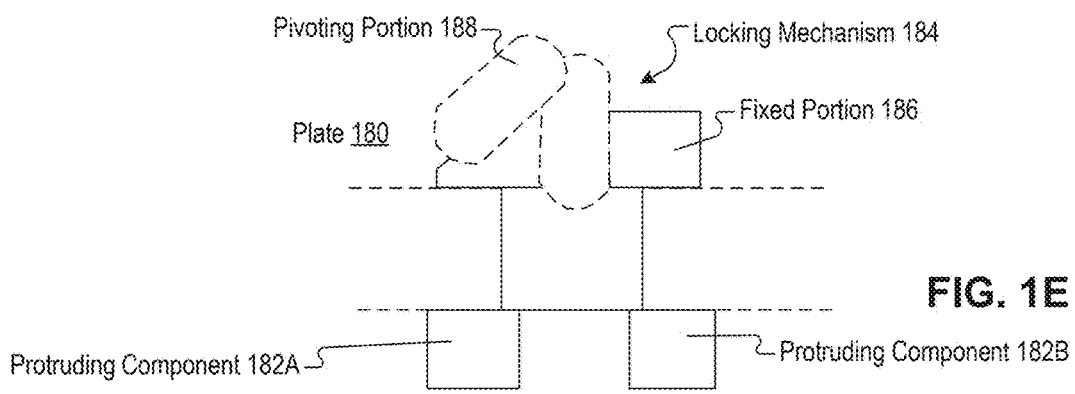

As shown in FIG. 1C, the mold 100 may have a cut line 190 where the dental appliance equipment (e.g., cutting equipment, trimming equipment) cuts (e.g., trims) the dental appliance from the mold 100. A gap line 192 is located a threshold distance 194 from the cut line 190. The chamfers 128 may be shaped to not pass the gap line 192 to provide a safety gap for trimming of the dental appliance from the mold 100.

Figure 2A:
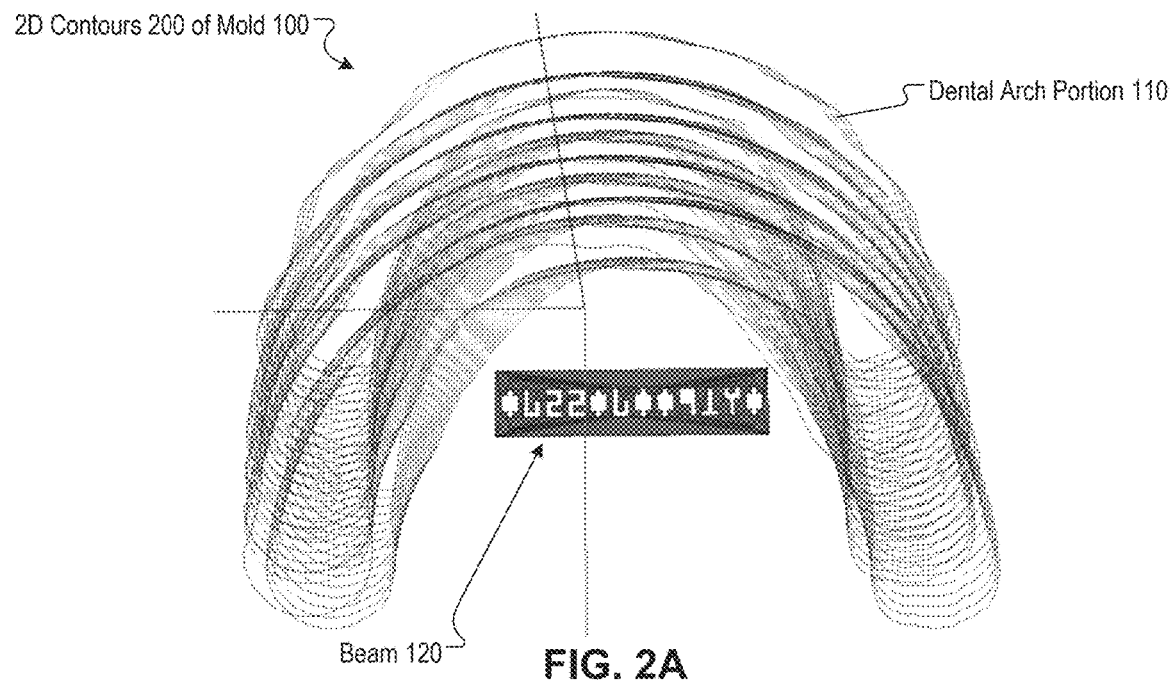
FIGS. 2A-B illustrate molds for producing dental appliances, according to certain embodiments.
Figure 2B:
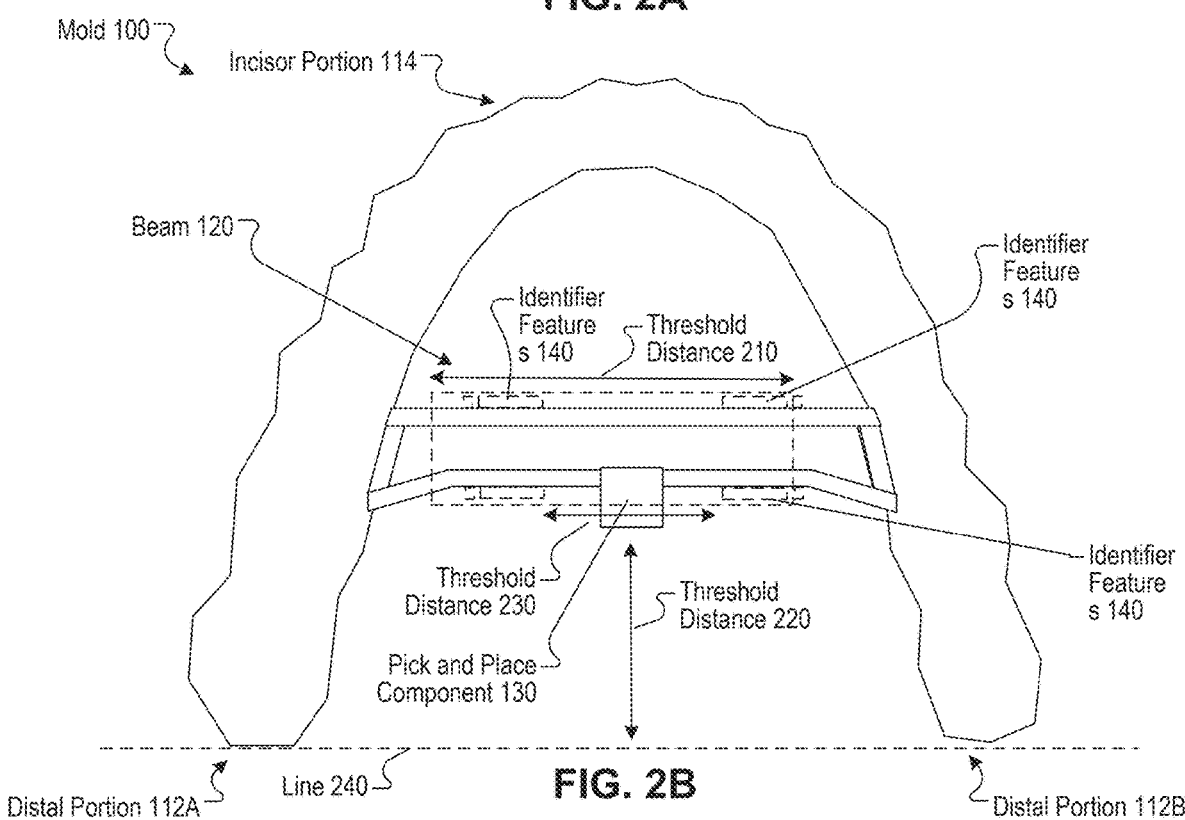

FIGS. 2A-B illustrate molds 100 for producing dental appliances, according to certain embodiments.

FIG. 2A illustrates two-dimensional (2D) contours 200 of a three-dimensional (3D) model of a dental arch portion 110 of the mold 100, according to certain embodiments. As described in FIG. 5A, translations of the mold may include a corresponding position of the beam 120 relative to the dental arch portion 110. The dental arch portion 110 may be at different distances or angles from the beam 120 in the different transformations. The dental arch portion 110 may have different heights in the different transformations (e.g., dental arch portion 110 includes different amounts of the gum region in different transformations). A bottom surface of the dental arch portion 110 may be at different angles relative to the upper surface of the dental arch portion 110 in different transformations (e.g., the gum region is cut at different angles to form the bottom surface of the dental arch portion 110 in different transformations). In some embodiments, the beam has different lengths or different chamfers 128 in different transformations of the mold. The 2D contours may be created for the different transformations of the mold 100 (e.g., of the dental arch portion 110).

FIG. 2B illustrates threshold distances 210-230 of the mold 100, according to certain embodiments. The 2D contours 200 of mold 100 are used to determine different transformations of the mold 100 (e.g., configurations of the beam 120 and the dental arch portion 110). Distances of each of the transformations may be compared to threshold distances as described in FIG. 5B.

A width distance between distal ends of the beam 120 of a mold 100 (e.g., of each of the transformations of the mold) may be compared to threshold distance 210 (e.g., width distance of label portion 122 of beam 120). The threshold distance 210 may be the minimum width of a beam to fit a label formed by the label portion 122 of the beam 120.

A length distance between the beam 120 and a line 240 intersecting a first distal end of the first distal portion 112A (e.g., corresponding to rear molar on first side of dental arch) and a second distal end of the second distal portion 112B (e.g., corresponding to rear molar on second side of dental arch) of the dental arch portion 110 is compared to threshold distance 220. The threshold distance 220 may be about 0 to about 15 mm. The beam 120 is to be between the incisor portion 112C and the line 240.

A feature offset distance between identifier features 140 on either side of the pick and place component 130 is to meet a threshold distance 230 (e.g., about 4.5 mm). This provides an offset for the dental appliance equipment to secure the pick and place component 130 to move the mold 100 without contacting the identifier features 140.

Figure 5A:
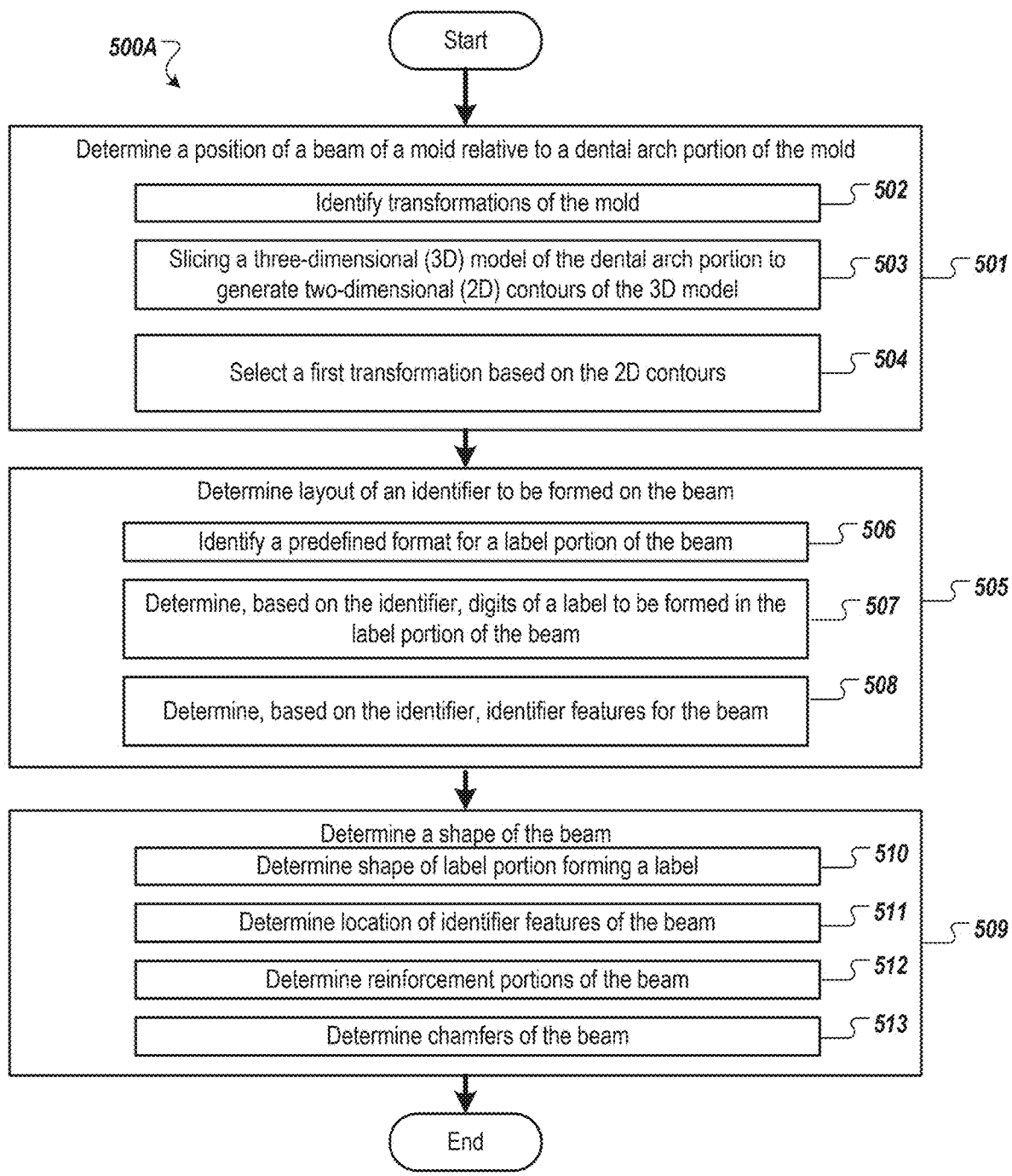
FIGS. 5A-K are flow diagrams of methods associated with molds for producing dental appliances, according to certain embodiments.

As described in FIG. 5A, a translation of the mold (e.g., position of the beam relative to the dental arch position) is selected based on 2D contours of the 3D model. As described in FIG. 5B, a translation of the mold (e.g., position of the beam relative to the dental arch position) is further selected based on distances of the mold meeting threshold distances (e.g., threshold distances 210-230).

Figure 3A:
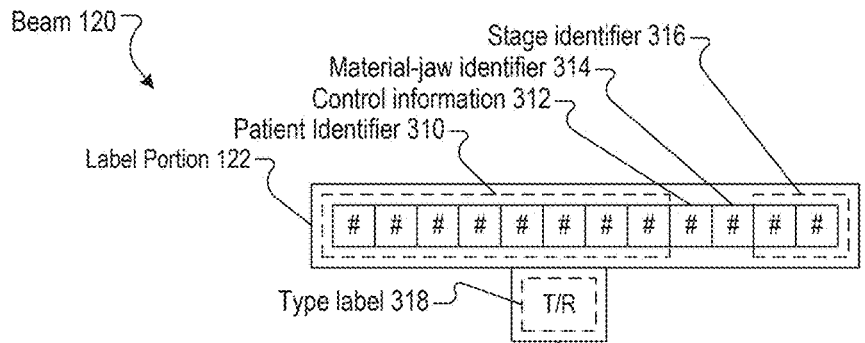
FIGS. 3A-C illustrate portions of molds for producing dental appliances, according to certain embodiments.
Figure 3B:
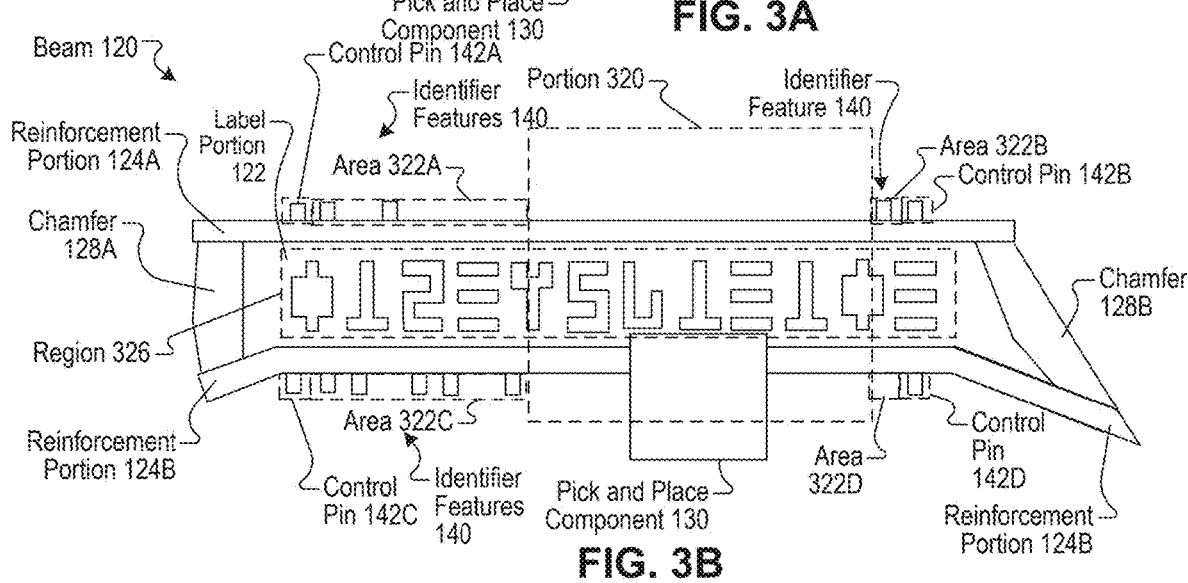
Figure 3C:
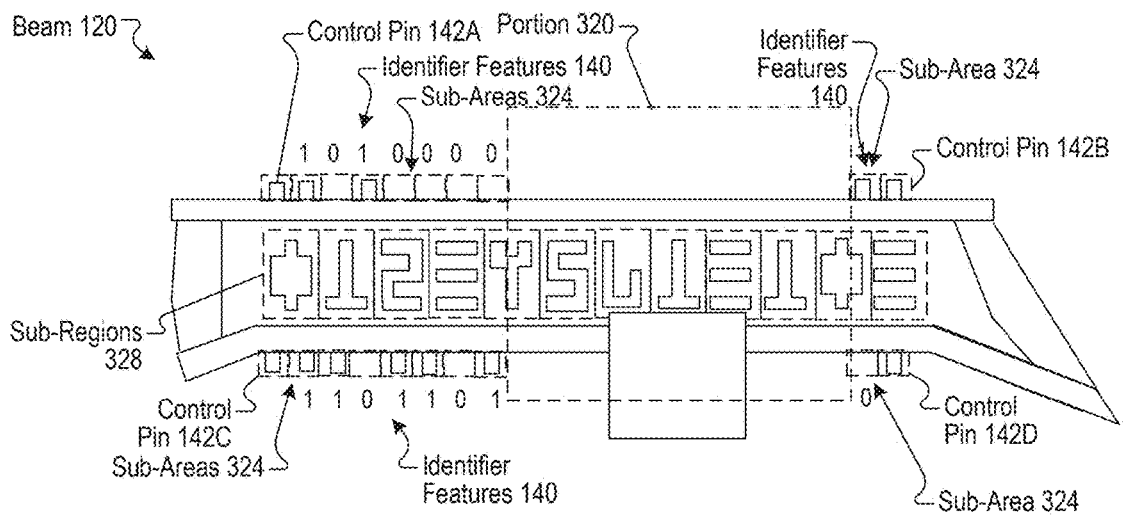

FIGS. 3A-C illustrate portions of molds 100 for producing dental appliances, according to certain embodiments.

FIG. 3A illustrates a block diagram of a beam 120 and pick and place component 130 of a mold 100, according to certain embodiments. The beam 120 includes a label portion 122 that forms a label (e.g., cut-out label). The label (e.g., cut-out label) includes an identifier made of digits. In some embodiments, the first 7-8 digits of the label (e.g., cut-out label) are the patient identifier (PIN) 310, the next 1-2 digits are the control information 312, the next digit is the material-jaw identifier 314, and the final 2 digits is the stage identifier 316. Each patient may have a specific PIN 310 (e.g., specific number unique to that patient). A patient may have different molds that each have a corresponding stage (e.g., a patient first uses an aligner that is made using a first mold of a first stage, after a first predetermined amount of time the patient uses a second aligner that is made using a second mold of a second stage, etc. to move the teeth). Each stage corresponds to a corresponding stage identifier 315. Material-jaw identifier 314 may identify what type of mold and if the mold is for the upper or the lower jaw. The label (e.g., cut-out label) formed by the label portion 122 may include 11-13 digits in some embodiments. Alternatively, the label (e.g., cut-out label) may include a different number of digits.

The material-jaw identifier 314 may be selected according to the following table:

| Material-Jaw Identifier value | Material | Jaw |
|---|---|---|
| 0 | N | U |
| 1 | N | L |
| 2 | T | U |
| 3 | T | L |
| 4 | R | U |
| 5 | R | L |

The material-jaw identifier 314 may be a single digit (e.g., 0-5). Each material-jaw identifier 314 may correspond to an N (e.g., which may indicate a material for an aligner), T (e.g., which may indicate a material for a template), or R (e.g., which may indicate a material for a retainer). Each material-jaw identifier 314 may correspond to an upper jaw (U) or a lower jaw (L). In the embodiment in which there are three possible materials (N, T and R) and two possible jaw options (U and L), there may be five possible combinations, each of which may be represented by a material-jaw identifier value (e.g., ranging from 0 to 5).

In some embodiments, the pick and place component 130 forms a type label 318. The type label 318 may be a "T" (template) if a template is to be formed, an "R" (retainer) if a retainer is to be formed, or nothing (aligner) if an aligner is to be formed. The type label 318 may allow for quick human-identification of whether the mold 100 is to be used to form an aligner, a template or a retainer.

FIG. 3B illustrates beam 120 of mold 100, according to certain embodiments.

Beam 120 may be designed by one or more of methods of 5A, 5B, and/or 5D. A transformation of the mold 100 is determined which includes a position of the beam 120 relative to the dental arch portion 110. A shape of the chamfers 128 is determined to attach the beam 120 to the dental arch portion.

Beam 120 may be formed based on the design (e.g., 3D model) and may be used to form a dental appliance by method of 500C. Beam 120 may be used to identify the mold by one or more of methods of 500E-K.

Beam 120 has a label portion 122, control pins 142A-D (or other control features), and identifier features 140. The control pins 142 are the closest features (e.g., pins) to the distal portions 112A-B of the dental arch portion 110. The control pins 142 are used to identify the identifier features 140 start (e.g., all of the pins between the control pins 142 are the identifier features 140).

The pick and place component 130 may be located within a threshold distance of the center of the beam 120. The pick and place component 130 may be located to provide clearance for dental appliance manufacturing equipment (e.g., a robot) to secure the pick and place component 130 without contacting other portions of the mold 100 (e.g., without contacting teeth of the mold). A portion 320 of beam 120 corresponding to pick and place component 130 may be located. In one embodiment, an imaging system of dental appliance manufacturing equipment generates an image of the mold 100 or of a portion of the mold 100 (e.g., of the beam 120). A processing device may process the image using traditional image processing techniques to determine a location of portion 320. The portion 320 may include region that is devoid of control pins/features and/or identifier features. In embodiments, the portion includes a bare area (devoid of control pins/features and/or identifier features) such that closest control pins/features and/or identifier features are a threshold distance from either side of pick and place component 130. Thus, portion 320 provides space to accommodate a gripper and/or other device for grabbing, holding and/or securing mold 100.

Beam 120 of mold 100 may include a region 326. A processing device may process the image using traditional image processing techniques and/or one or more trained machine learning models to determine a location of region 326 of the mold 100. Region 326 corresponds to the label (e.g., cut-out label) formed in the label portion 122 of the beam 120. The region 326 shown in FIG. 3B is divided into equal sub-regions 328 shown in FIG. 3C. Twelve sub-regions 328 may be located on the beam. Each sub-region 328 may include a digit of the identifier.

Beam 120 of mold 100 may include control pins 142A-B on a first sidewall of the beam 120 and control pins 142C-D on a second sidewall of the beam 120. A processing device may process the image using traditional image processing techniques and/or one or more trained machine learning models to determine a location of control pins 142. Areas 322A-B between the control pins 142A-B and areas 322C-D between control pins 142C-D (excluding the portion 320) are identified (e.g., by a processing device may process the image using traditional image processing techniques and/or one or more trained machine learning models). The areas 322 shown in FIG. 3B are divided into equal sub-areas 324 shown in FIG. 3C. Eight sub-areas 324 may be located on the first sidewall of the beam 120 and eight sub-areas 324 may be on the second sidewall of the beam. A sub-area 324 containing an identifier feature 140 (e.g., identifier pin) may be considered a "1" and a sub-area 324 not containing an identifier feature 140 be considered a "0." The 1's and 0's (e.g., identifier feature presence data) from the sub-areas 324 may be used to determine (e.g., verify) an identifier. The label (e.g., cut-out label) of the label portion 122 may be used to determine the same identifier. The identifier may be determined by the label (e.g., cut-out label) and the identifier may be separately determined by the identifier features 140 to have redundancy in determining the identifier. If the identifier determined via the label (e.g., cut-out label) and the identifier determined via the identifier features 140 do not match, then a corrective action may be performed (e.g., provide an alert, not use the mold 100 for forming a dental appliance, etc.).

Figure 4A:
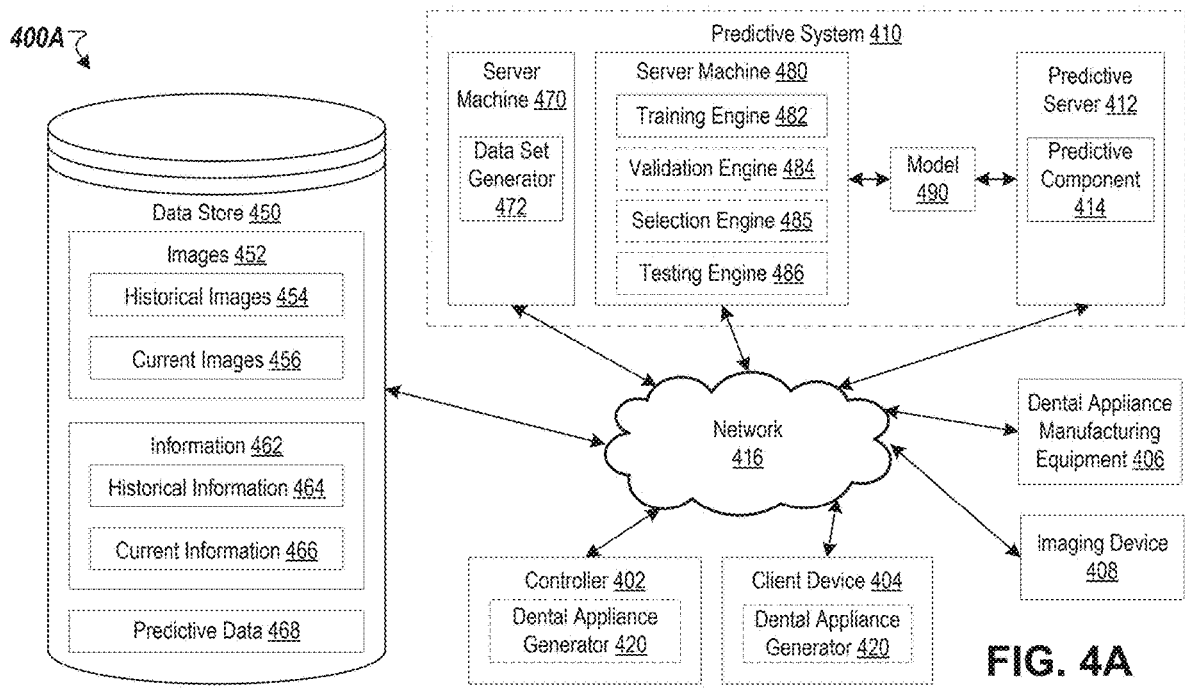
FIG. 4A is a block diagram illustrating an exemplary system architecture, according to certain embodiments.

FIG. 4A is a block diagram illustrating an exemplary system architecture of system 400A, according to certain embodiments. The system 400A may perform one or more processes associated with mold and/or dental appliance production. For example, system 400A may perform mold design, mold formation, mold identification, dental appliance production, and/or the like. In some embodiments, processes associated with mold and/or dental appliance production are controlled by a controller 402 or a client device 404.

Figure 5B:
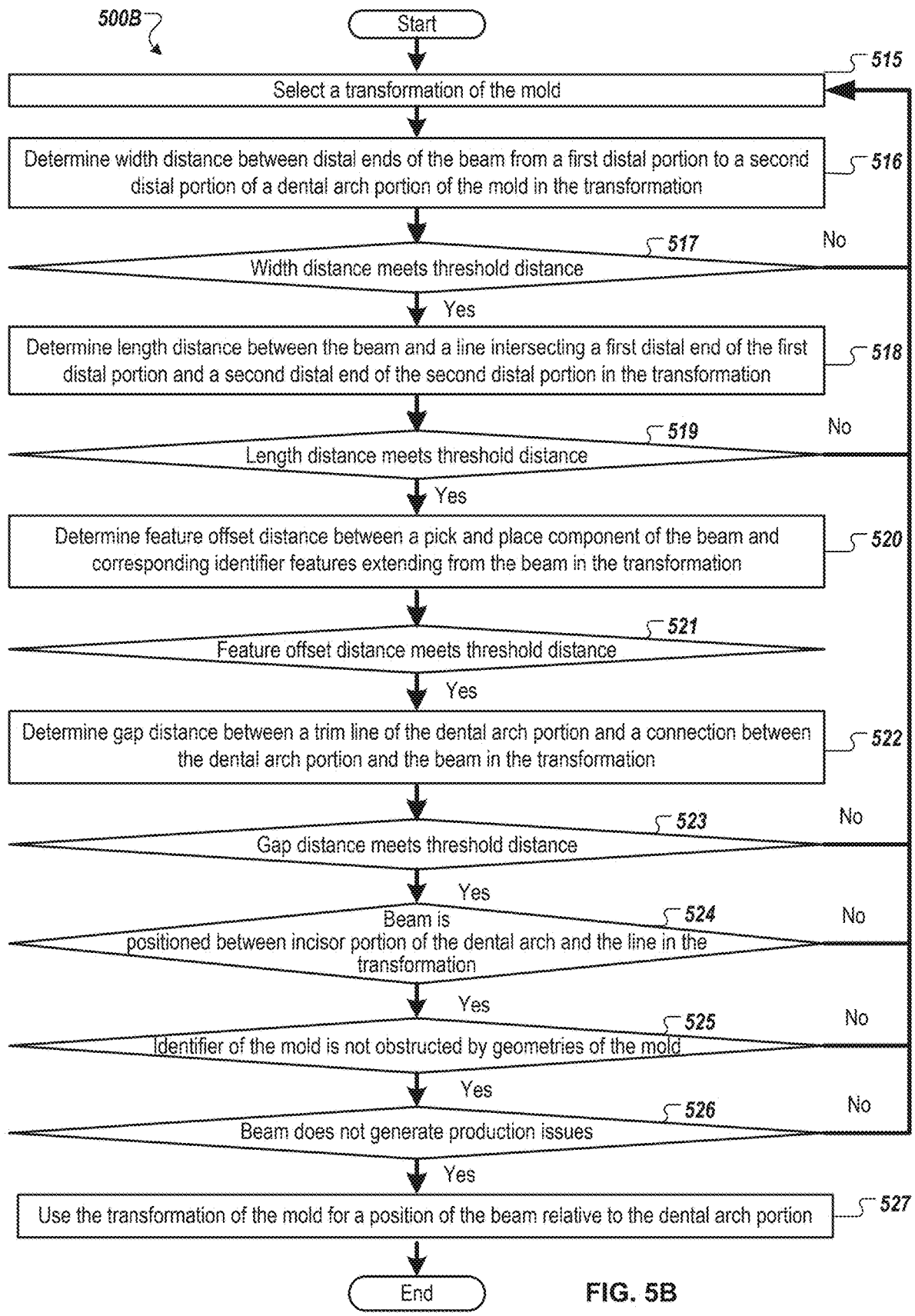
Figure 5C:
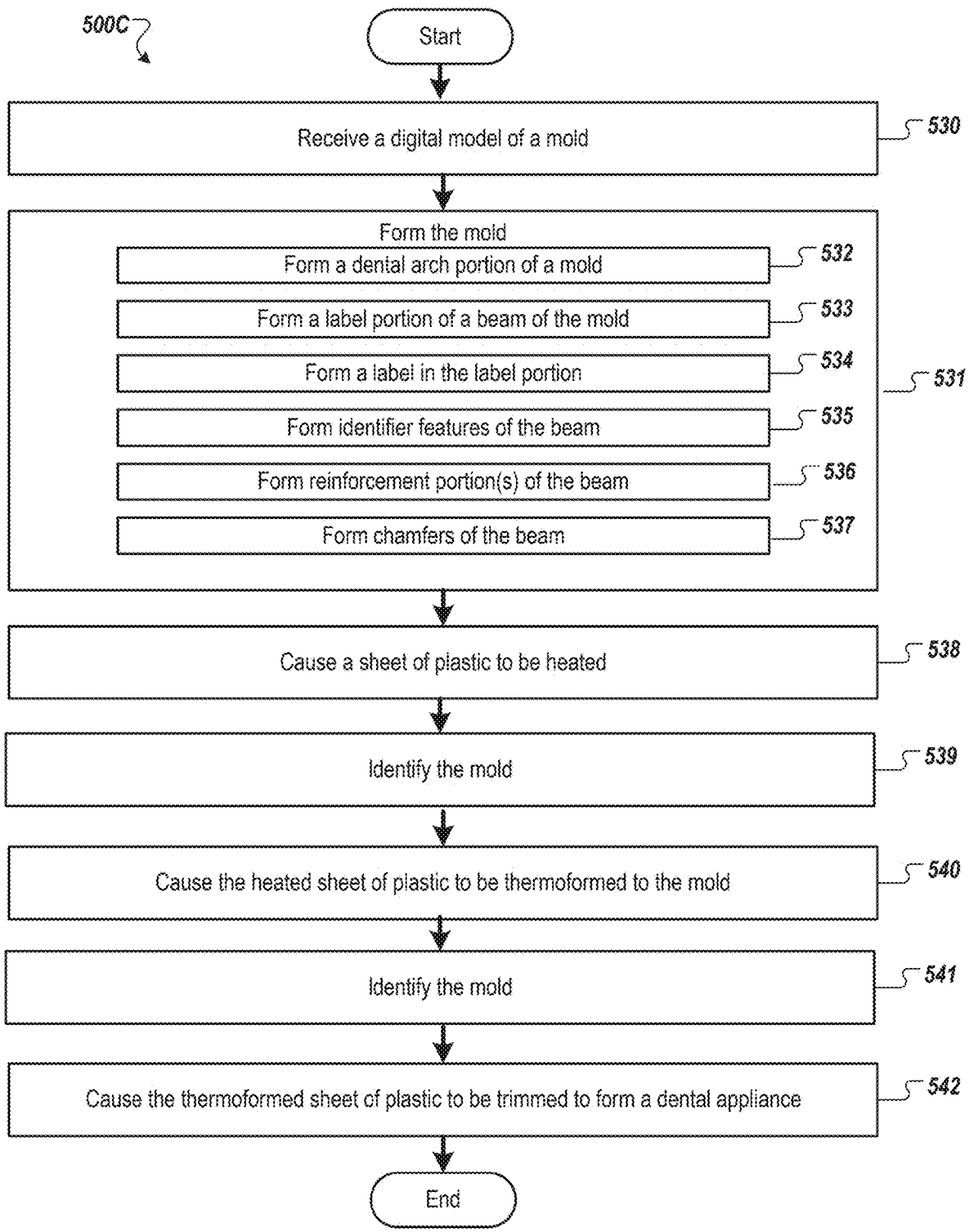
Figure 5D:
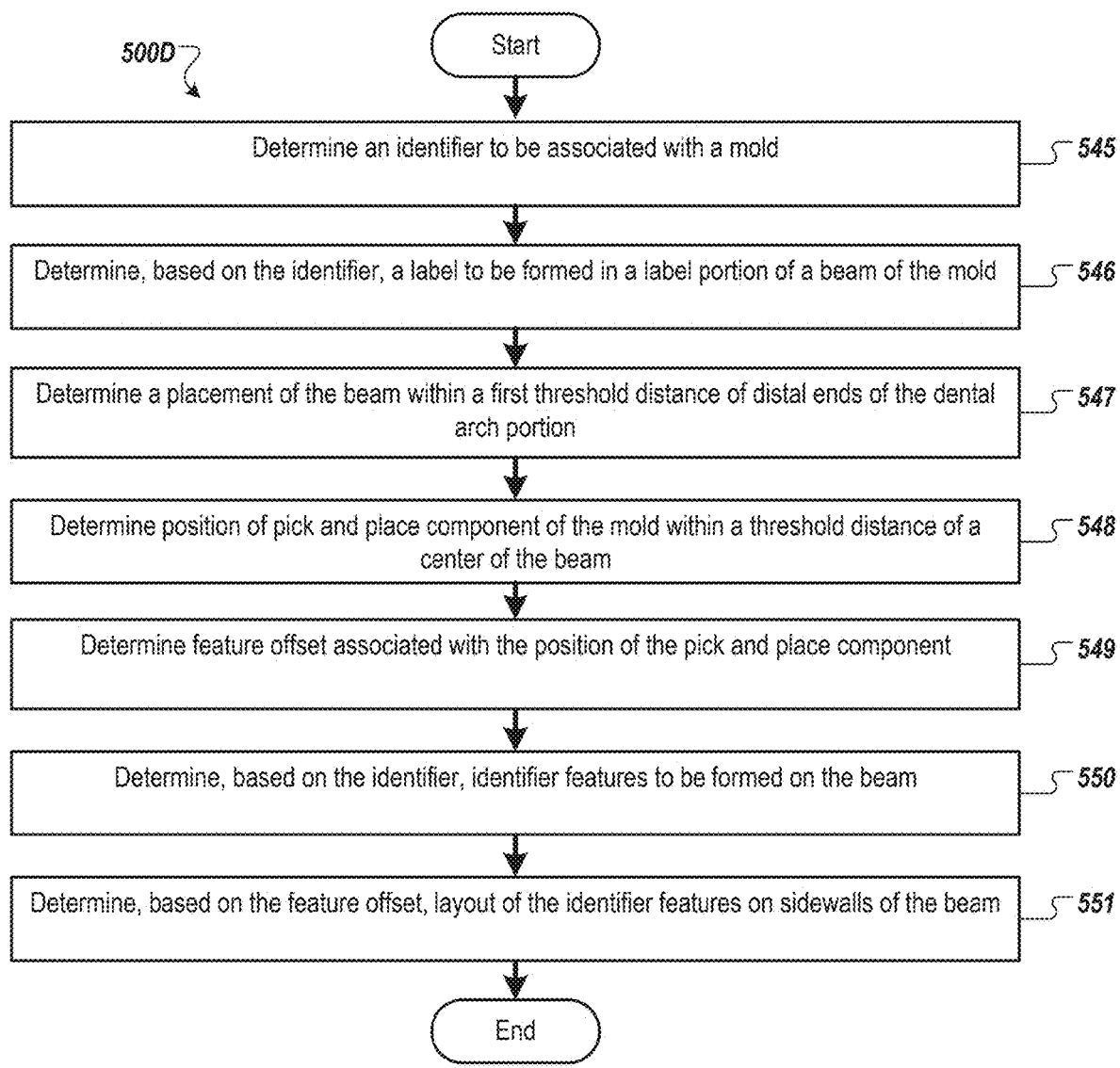

In some embodiments, controller 402 and/or client device 404 may perform mold design (e.g., see FIGS. 5A, 5B, and 5D). Controller 402 and/or client device can determine a position of the beam, layout of an identifier to be formed on the beam, and/or shape of the beam and can cause dental appliance manufacturing equipment 406 to form a mold. Controller 402 and/or client device can determine an identifier for a mold, a label to be formed on the mold, a placement of the beam relative to a dental arch portion of the mold, position of a pick and place component of the mold, feature offset associated with the position of the pick and place component, identifier features to be formed on the beam, and/or layout of the identifier features on the beam and can cause dental appliance manufacturing equipment 406 to form a mold.

In some embodiments, controller 402 and/or client device 404 may perform mold and/or dental appliance production (e.g., see FIG. 5B). Controller 402 and/or client device can receive a digital model of a mold, form the mold, cause a sheet of plastic to be heated, cause the heated sheet of plastic to be thermoformed on the mold, and cause the thermoformed sheet of plastic to be trimmed to form a dental appliance.

In some embodiments, controller 402 and/or client device 404 may perform mold identification (e.g., see FIGS. 5E-K). In some embodiments, controller 402 and/or client device 404 receives predictive data from predictive system 410 to perform mold identification. Predictive system 410 can train and use a machine learning model to provide predictive data (see FIGS. 5F-K). For example, predictive system 410 can predict a region of an image of a mold corresponds to a label, can predict the digits of the label from the image, and/or can determine the feature presence data based on an image of the identifier features of the mold.

The system 400A includes a controller 402, a client device 404, dental appliance manufacturing equipment 406, imaging device 408, predictive server 412, and data store 450. The predictive server 412 may be part of a predictive system 410 (e.g., to predict a region of an image corresponding to a label of a mold, predict digits of a label from the image, predict identifier feature presence data from the image). The predictive system 410 may further include server machines 470 and 480.

The controller 402, client device 404, dental appliance manufacturing equipment 406, imaging device 408, predictive server 412, data store 450, server machine 470, and server machine 480 may be coupled to each other via a network 416. In some embodiments, network 416 is a public network that provides client device 404 with access to the predictive server 412, data store 450, and other publically available computing devices. In some embodiments, network 416 is a private network that provides controller 402 access to the dental appliance manufacturing equipment 406, imaging device 408, data store 450, and other privately available computing devices and that provides client device 404 access to the predictive server 412, data store 450, and other privately available computing devices. Network 116 may include one or more wide area networks (WANs), local area networks (LANs), wired networks (e.g., Ethernet network), wireless networks (e.g., an 802.11 network or a Wi-Fi network), cellular networks (e.g., a Long Term Evolution (LTE) network), routers, hubs, switches, server computers, cloud computing networks, and/or a combination thereof.

The client device 404 may include a computing device such as a personal computer (PC), desktop computer, laptop, mobile phone, smart phone, tablet computer, netbook computer, etc. The client device 404 may include a dental appliance generator 420. Dental appliance generator 420 may receive user input (e.g., via a graphic user interface (GUI) displayed via the client device 404) of a mold 100 to be generated and/or a dental appliance to be formed using a mold 100. In some embodiments, the dental appliance generator 420 transmits data to the predictive system 410, receives output (e.g., predictive data 468) from the predictive system 410, and/or causes the mold 100 and/or dental appliance to be generated. Client device 404 may include an operating system that allows users to one or more of generate, view, or edit data. In some embodiments, the dental appliance generator 420 may cause a mold and/or dental appliance to be generated.

The controller 402, predictive server 412, server machine 470, and server machine 480 may each include one or more computing devices such as a rackmount server, a router computer, a server computer, a PC, a mainframe computer, a laptop computer, a tablet computer, a desktop computer, graphics processing unit (GPU), accelerator application-specific integrated circuit (ASIC) (e.g., tensor processing unit (TPU)), etc.

The controller 402 and/or client device 404 may include a dental appliance generator 420. The dental appliance generator 420 may perform processes associated with mold and/or dental appliance production (e.g., FIGS. 5A-5K). For example, dental appliance generator 420 may receive images 452 (e.g., from imaging device 408, from the data store 450), and store the sets of images 452 and information 462 in the data store 450. Predictive system 410 may use at least a portion of the images 452 and/or information 462 to determine predictive data 468.

The predictive server 412 may include a predictive component 414. In some embodiments, the predictive component 414 may retrieve at least portions of images 452 from data store 450 and generate output (e.g., predictive data 468) for production of molds 100 and/or dental appliances. In some embodiments, the predictive component 414 may use a trained machine learning model 490 to determine the output for producing the molds 100 and/or dental appliances. The trained machine learning model 490 may be trained using historical images 454 and/or historical information 464 to learn key process and hardware parameters.

Data store 150 may be memory (e.g., random access memory), a drive (e.g., a hard drive, a flash drive), a database system, or another type of component or device capable of storing data. Data store 150 may include multiple storage components (e.g., multiple drives or multiple databases) that may span multiple computing devices (e.g., multiple server computers). The data store 450 may store images 452, information 462, predictive data 468, etc.

Images 452 may include an image of an entire mold 100, an image of a beam 120 of a mold 100, an image of a label portion 122 of the beam, an image of a digit of the label portion 122, an image of control pins 142 and/or identifier features 140, an image of a single control pin and/or identifier feature 140, etc.

Information 462 may include a region of the mold 100 corresponding to the label, digits of a label of a mold 100, identifier feature presence data, etc.

Predictive data 468 may include a predicted information of the mold 100. For example, predicted data 468 can include predicted region of the mold 100 corresponding to the label, predictive digits of a label of the mold, predicted identifier presence data, etc.

In some embodiments, the client device 404 may store images 452 and/or information 462 in the data store 450 and the predictive server 412 may retrieve the images 452 and/or information 462 from the data store 450. In some embodiments, the predictive server 412 may store output (e.g., predictive data 468) of the trained machine learning model 490 in the data store 450 and the client device 404 may retrieve the output from the data store 450.

In some embodiments, predictive system 410 further includes server machine 470 and server machine 480. Server machine 470 includes a data set generator 472 that is capable of generating data sets (e.g., a set of data inputs, a set of data inputs and a set of target outputs) to train, validate, and/or test a machine learning model 490. Some operations of data set generator 472 are described in detail below with respect to FIGS. 4B and 5E. In some embodiments, the data set generator 472 may partition the images 452 and information 462 into a training set (e.g., sixty percent of the images 452 and information 462), a validating set (e.g., twenty percent of the images 452 and information 462), and a testing set (e.g., twenty percent of the images 452 and information 462). In some embodiments, the predictive system 410 (e.g., via predictive component 414) generates multiple sets of features. For example, a first set of features may be a first set of data (e.g., first portions of images 452, etc.) that correspond to each of the data sets (e.g., training set, validation set, and testing set) and a second set of features may be a second set of types of data (e.g., second portions of images 452) that correspond to each of the data sets.

Server machine 480 includes a training engine 482, a validation engine 484, selection engine, and/or a testing engine 486. An engine (e.g., training engine 482, a validation engine 484, selection engine 485, and a testing engine 486) may refer to hardware (e.g., circuitry, dedicated logic, programmable logic, microcode, processing device, etc.), software (such as instructions run on a processing device, a general purpose computer system, or a dedicated machine), firmware, microcode, or a combination thereof. The training engine 482 may be capable of training a machine learning model 490 using one or more sets of features associated with the training set from data set generator 472. The training engine 482 may generate multiple trained machine learning models 490, where each trained machine learning model 490 corresponds to a distinct set of features of the training set (e.g., portions of images 452). For example, a first trained machine learning model may have been trained using all features (e.g., X1-X5), a second trained machine learning model may have been trained using a first subset of the features (e.g., X1, X2, X4), and a third trained machine learning model may have been trained using a second subset of the features (e.g., X1, X3, X4, and X5) that may partially overlap the first subset of features.

The validation engine 484 may be capable of validating a trained machine learning model 490 using a corresponding set of features of the validation set from data set generator 472. For example, a first trained machine learning model 490 that was trained using a first set of features of the training set may be validated using the first set of features of the validation set. The validation engine 484 may determine an accuracy of each of the trained machine learning models 490 based on the corresponding sets of features of the validation set. The validation engine 484 may discard trained machine learning models 490 that have an accuracy that does not meet a threshold accuracy. In some embodiments, the selection engine 485 may be capable of selecting one or more trained machine learning models 490 that have an accuracy that meets a threshold accuracy. In some embodiments, the selection engine 485 may be capable of selecting the trained machine learning model 490 that has the highest accuracy of the trained machine learning models 490.

The testing engine 486 may be capable of testing a trained machine learning model 490 using a corresponding set of features of a testing set from data set generator 472. For example, a first trained machine learning model 490 that was trained using a first set of features of the training set may be tested using the first set of features of the testing set. The testing engine 486 may determine a trained machine learning model 490 that has the highest accuracy of all of the trained machine learning models based on the testing sets.

The machine learning model 490 may refer to the model artifact that is created by the training engine 482 using a training set that includes data inputs and, in some embodiments, corresponding target outputs (correct answers for respective training inputs). Patterns in the data sets can be found that cluster the data input and/or map the data input to the target output (the correct answer), and the machine learning model 490 is provided mappings that captures these patterns. The machine learning model 490 may use one or more of linear regression, random forest, neural network (e.g., artificial neural network), etc.

Predictive component 414 may provide current image 456 of a mold to the trained machine learning model 490 and may run the trained machine learning model 490 on the input to obtain one or more outputs. The predictive component 414 may be capable of determining (e.g., extracting) predictive data 468 associated with identifying the mold (e.g., predicted region of the current image 456 corresponding to the label, predicted digits from the label, predicted identifier feature presence data) from the output of the trained machine learning model 490 and may determine (e.g., extract) confidence data from the output that indicates a level of confidence that the predictive data 468 corresponds to the information 462 of the mold 100. The predictive component 414 or dental appliance generator 420 may use the confidence data to decide whether to cause a mold 100 or dental appliance to be produced and/or to cause a corrective action to be performed based on the predictive data 468. For example, responsive to determining confidence data that does not meet a threshold amount (e.g., low confidence of the identifier of the mold), the dental appliance generator 420 may cause the dental appliance to not be produced on the mold.

The confidence data may include or indicate a level of confidence that the predictive data 468 corresponds to the current image 456 (e.g., correspond to the mold 100). In one example, the level of confidence is a real number between 0 and 1 inclusive, where 0 indicates no confidence that the predictive data 468 corresponds to the current image 456 and 1 indicates absolute confidence that the predictive data 468 corresponds to the current image 456. In some embodiments, the system 400A may use predictive system 410 to determine predictive data 468 instead of manually inspecting the mold 100. In some embodiments, responsive to the confidence data indicating a level of confidence that is below a threshold level, the system 400A may cause a corrective action of providing an alert to not use the mold 100, stop producing molds 100, inspect the equipment, to manually inspect the mold 100, etc. Responsive to the confidence data indicating a level of confidence below a threshold level for a predetermined number of instances (e.g., percentage of instances, frequency of instances, total number of instances, etc.) the predictive component 414 may cause the trained machine learning model 490 to be re-trained (e.g., based on the current images 456 and current information 466 that corresponds to the current images 456, etc.).

For purpose of illustration, rather than limitation, aspects of the disclosure describe the training of a machine learning model using images 452 and information 462 and inputting current image 452 into the trained machine learning model to determine predictive data 468. In other implementations, a heuristic model or rule-based model is used to determine predictive data 468 (e.g., without using a trained machine learning model). Predictive component 414 may monitor images 452 and information 462. Any of the information described with respect to data inputs 401 of FIG. 4B may be monitored or otherwise used in the heuristic or rule-based model.

In some embodiments, the functions of controller 402, client device 404, predictive server 412, server machine 470, and server machine 480 may be provided by a fewer number of machines. For example, in some embodiments server machines 470 and 480 may be integrated into a single machine, while in some other embodiments, server machine 470, server machine 480, and predictive server 412 may be integrated into a single machine. In some embodiments, controller 402 and client device 404 may be integrated into a single machine.

In general, functions described in one embodiment as being performed by controller 402, client device 404, predictive server 412, server machine 470, and server machine 480 can also be performed on predictive server 412 in other embodiments, if appropriate. In addition, the functionality attributed to a particular component can be performed by different or multiple components operating together. For example, in some embodiments, the predictive server 412 may determine whether to cause a mold 100 or dental appliance to be produced or performance of a corrective action based on the predictive data 468. In another example, client device 404 may determine the predictive data 468 based on output from the trained machine learning model.

In addition, the functions of a particular component can be performed by different or multiple components operating together. One or more of the predictive server 412, server machine 470, or server machine 480 may be accessed as a service provided to other systems or devices through appropriate application programming interfaces (API).

In embodiments, a "user" may be represented as a single individual. However, other embodiments of the disclosure encompass a "user" being an entity controlled by a plurality of users and/or an automated source. For example, a set of individual users federated as a group of administrators may be considered a "user."

Although embodiments of the disclosure are discussed in terms of determining predictive data 468 based on images 452 to produce molds 100 and/or dental appliances or to perform a corrective action in dental appliance manufacturing, embodiments may also be generally applied to determining predictive data to perform an action.

Figure 4B:
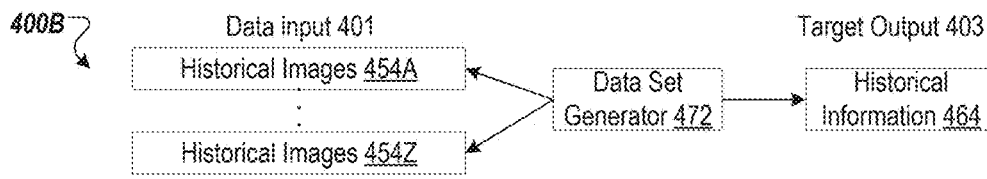
FIG. 4B is an example data set generator to create data sets for a machine learning model, according to certain embodiments.

FIG. 4B is an example data set generator 472 to create data sets for a machine learning model 490, according to certain embodiments. System 400B of FIG. 4B shows data set generator 472, data inputs 401, and target output 403.

In some embodiments, data set generator 472 generates a data set (e.g., training set, validating set, testing set) that includes one or more data inputs 401 (e.g., training input, validating input, testing input). In some embodiments, the data set further includes one or more target outputs 403 that correspond to the data inputs 401. The data set may also include mapping data that maps the data inputs 401 to the target outputs 403. Data inputs 401 may also be referred to as "features," "attributes," or information." In some embodiments, data set generator 472 may provide the data set to the training engine 482, validating engine 484, or testing engine 486, where the data set is used to train, validate, or test the machine learning model 490. Some embodiments of generating a training set may further be described with respect to FIG. 5E.

In some embodiments, data set generator 472 generates the data input 401 based on historical images 454 and generates the target output 403 based historical information 464 associated with the historical images 454. The data set generator 472 may determine the mapping from each set of the historical images 454 to historical information 464.

In some embodiments, data inputs 401 may include one or more sets of features for the historical images 454. Each instance of historical images 454 may be an image of an entire mold 100, an image of a beam 120 of a mold 100, an image of a label portion 122 of the beam, an image of a digit of the label portion 122, an image of control pins 142 and/or identifier features 140, an image of a single control pin and/or identifier feature 140, etc.

In some embodiments, data set generator 272 may generate a first data input corresponding to a first set of features to train, validate, or test a first machine learning model and the data set generator 272 may generate a second data input corresponding to a second set of features to train, validate, or test a second machine learning model.

In some embodiments, the data set generator 272 may discretize one or more of the data input 401 or the target output 403 (e.g., to use in classification algorithms for regression problems). Discretization of the data input 401 or target output 403 may transform continuous values of variables into discrete values. In some embodiments, the discrete values for the data input 401 indicate discrete portions of images to obtain a target output 403 (e.g., discrete information regarding a digit in the portion of the image or whether there is a pin in the portion of the image).

Data inputs 401 and target outputs 403 to train, validate, or test a machine learning model may include information for a particular facility (e.g., for a particular dental appliance manufacturing facility). For example, the historical images 454 and historical information 464 may be for the same dental appliance manufacturing facility.

In some embodiments, the information used to train the machine learning model may be from specific types of manufacturing equipment (e.g., imaging device 408 associated with dental appliance manufacturing equipment 406) of the dental appliance manufacturing facility having specific characteristics and allow the trained machine learning model to determine outcomes for a specific group of dental appliance manufacturing equipment. In some embodiments, the information used to train the machine learning model may be for components from two or more manufacturing facilities and may allow the trained machine learning model to determine outcomes for molds 100 based on input from one manufacturing facility.

In some embodiments, subsequent to generating a data set and training, validating, or testing machine learning model 490 using the data set, the machine learning model 490 may be further trained, validated, or tested (e.g., further images 452 and information 462) or adjusted (e.g., adjusting weights associated with input data of the machine learning model 490, such as connection weights in a neural network).

Figure 4C:
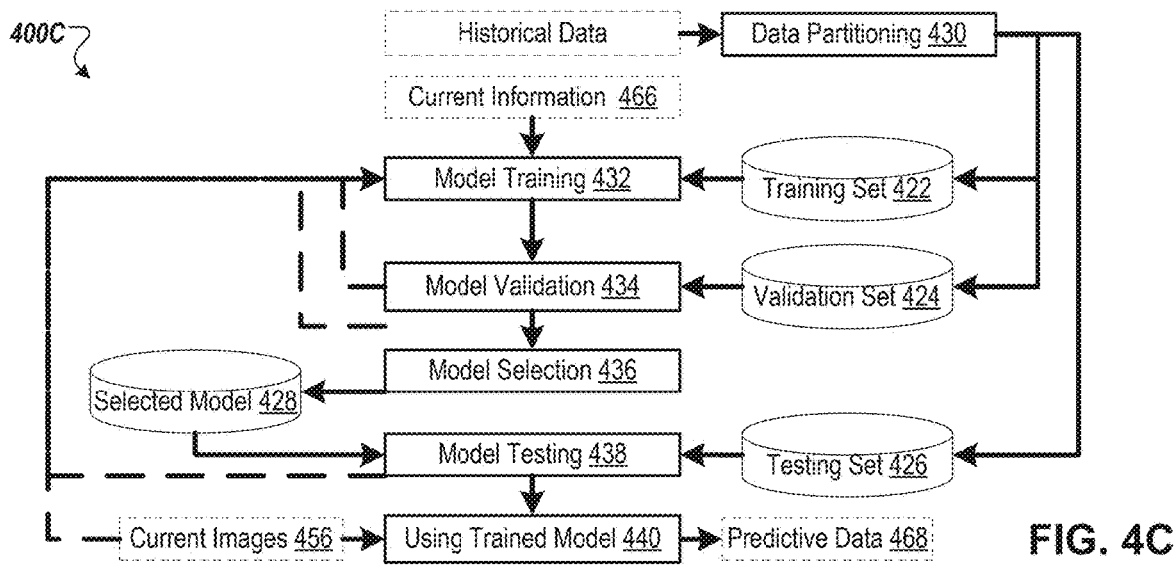
FIG. 4C is a block diagram illustrating determining predictive data, according to certain embodiments.

FIG. 4C is a block diagram illustrating determining predictive data 468, according to certain embodiments. System 400C may be used to determine whether to produce a mold 100 and/or dental appliance or to perform a corrective action (e.g., associated with the mold 100, dental appliance manufacturing equipment 406, etc.) based on historical data (e.g., historical images 454 and historical information 464).

At block 430, the system 400C (e.g., predictive system 410 of FIG. 4A) performs data partitioning (e.g., via data set generator 472 of server machine 470 of FIG. 1) of the historical data (e.g., historical images 454 and historical information 464) to generate the training set 422, validation set 424, and testing set 426. For example, the training set may be 60% of the historical data, the validation set may be 20% of the historical data, and the validation set may be 20% of the historical data. The system 400C may generate a plurality of sets of features for each of the training set, the validation set, and the testing set. For example, if the historical data is associated with 20 imaging devices 408 and 100 molds 100 (e.g., molds 100 that correspond to images 452 from the 20 imaging devices 408), a first set of features may be imaging devices 1-10, a second set of features may be imaging devices 11-20, the training set may be molds 1-60, the validation set may be molds 61-80, and the testing set may be molds 81-100. In this example, the first set of features of the training set would be associated with images 452 and information 462 associated with imaging devices 1-10 and molds 1-60.

At block 432, the system 400C performs model training (e.g., via training engine 482 of FIG. 1) using the training set 422. The system 400C may train multiple models using multiple sets of features of the training set 422 (e.g., a first set of features of the training set 422, a second set of features of the training set 422, etc.). For example, system 400C may train a machine learning model to generate a first trained machine learning model using the first set of features in the training set (e.g., images from imaging devices 1-10 for molds 1-60) and to generate a second trained machine learning model using the second set of features in the training set (e.g., images from imaging devices 11-20 for molds 1-60). In some embodiments, the first trained machine learning model and the second trained machine learning model may be combined to generate a third trained machine learning model (e.g., which may be a better predictor than the first or the second trained machine learning model on its own). In some embodiments, sets of features used in comparing models may overlap (e.g., first set of features being from imaging devices 1-15 and second set of features being from imaging devices 5-20). In some embodiments, hundreds of models may be generated including models with various permutations of features and combinations of models.

At block 434, the system 400C performs model validation (e.g., via validation engine 484 of FIG. 1) using the validation set 424. The system 400C may validate each of the trained models using a corresponding set of features of the validation set 424. For example, system 400C may validate the first trained machine learning model using the first set of features in the validation set (e.g., images from imaging devices 1-10 for molds 61-80) and the second trained machine learning model using the second set of features in the validation set (e.g., images from imaging devices 11-20 for molds 61-80). In some embodiments, the system 400C may validate hundreds of models (e.g., models with various permutations of features, combinations of models, etc.) generated at block 432. At block 434, the system 400C may determine an accuracy of each of the one or more trained models (e.g., via model validation) and may determine whether one or more of the trained models has an accuracy that meets a threshold accuracy. Responsive to determining that none of the trained models has an accuracy that meets a threshold accuracy, flow returns to block 432 where the system 400C performs model training using different sets of features of the training set. Responsive to determining that one or more of the trained models has an accuracy that meets a threshold accuracy, flow continues to block 436. The system 400C may discard the trained machine learning models that have an accuracy that is below the threshold accuracy (e.g., based on the validation set).

At block 436, the system 400C performs model selection (e.g., via selection engine 485 of FIG. 1) to determine which of the one or more trained models that meet the threshold accuracy has the highest accuracy (e.g., the selected model 428, based on the validating of block 434). Responsive to determining that two or more of the trained models that meet the threshold accuracy have the same accuracy, flow may return to block 432 where the system 400C performs model training using further refined training sets corresponding to further refined sets of features for determining a trained model that has the highest accuracy.

At block 438, the system 400C performs model testing (e.g., via testing engine 486 of FIG. 1) using the testing set 426 to test the selected model 428. The system 400C may test, using the first set of features in the testing set (e.g., images from imaging devices 1-10 for molds 81-100), the first trained machine learning model to determine the first trained machine learning model meets a threshold accuracy (e.g., based on the first set of features of the testing set 426). Responsive to accuracy of the selected model 428 not meeting the threshold accuracy (e.g., the selected model 428 is overly fit to the training set 422 and/or validation set 424 and is not applicable to other data sets such as the testing set 426), flow continues to block 432 where the system 400C performs model training (e.g., retraining) using different training sets corresponding to different sets of features. Responsive to determining that the selected model 428 has an accuracy that meets a threshold accuracy based on the testing set 426, flow continues to block 440. In at least block 432, the model may learn patterns in the historical images 454 to make predictions and in block 438, the system 400C may apply the model on the remaining data (e.g., testing set 426) to test the predictions.

At block 440, system 400C uses the trained model (e.g., selected model 428) to receive current images 456 and determines (e.g., extracts), from the output of the trained model, predictive data 468 to produce molds 100 and/or dental appliances or to perform corrective actions associated mold or dental appliance production.

In some embodiments, current information 466 corresponding to the current images 456 is received and the model is re-trained based on the current images 456 and the current information 466.

In some embodiments, one or more operations of the blocks 430-440 may occur in various orders and/or with other operations not presented and described herein. In some embodiments, one or more operations of blocks 430-440 may not be performed. For example, in some embodiments, one or more of data partitioning of block 430, model validation of block 434, model selection of block 436, or model testing of block 438 may not be performed.

FIGS. 5A-K are flow diagrams of methods 500A-K associated with mold and/or dental appliance production, according to certain embodiments. In some embodiments, one or more operations of methods 500A-K are performed by a processing logic of a computing device (e.g., controller 402 of FIG. 4A, client device 404 of FIG. 4A, predictive server 412 of FIG. 4A, etc.) to automate one or more operations of producing an object (e.g., a dental appliance and/or mold). The processing logic may include hardware (e.g., circuitry, dedicated logic, programmable logic, microcode, processing device, etc.), software (e.g., instructions executed by a processing device, a general purpose computer system, or a dedicated machine), firmware, microcode, or a combination thereof. For example, one or more operations of methods 500A-K may be performed by a processing device executing a program or module, such as dental appliance generator 420 of FIGS. 4A and 6.

It may be noted that components described with respect to one or more of FIGS. 4A-C may be used to illustrate aspects of FIGS. 5A-K. In some embodiments, a non-transitory machine-readable storage medium stores instructions that when executed by a processing device (e.g., of controller 402 of FIG. 4A, client device 404 of FIG. 4A, predictive server 412 of FIG. 4A, predictive system 410 of FIG. 4A, etc.) cause the processing device to perform methods 500A-K.

For simplicity of explanation, methods 500A-K are depicted and described as a series of acts. However, acts in accordance with this disclosure can occur in various orders and/or concurrently and with other acts not presented and described herein. Furthermore, not all illustrated acts may be performed to implement the methods 500A-K in accordance with the disclosed subject matter. In addition, those skilled in the art will understand and appreciate that the methods 500A-K could alternatively be represented as a series of interrelated states via a state diagram or events.

Referring to FIG. 5A, method 500A is associated with producing a mold for forming dental appliances (e.g., forming a digital model for the mold), according to certain embodiments.

At block 501, processing logic determines a position of a beam of a mold relative to a dental arch portion of the mold (e.g., processing logic finds an appropriate position of the beam). The dental arch portion includes a first distal portion (e.g., including molars of a first side of a jaw), a second distal portion (e.g., including molars of a second side of the jaw), and an incisor portion (e.g., including the incisors of the front of the jaw) disposed between the first distal portion and the second distal portion. The beam is to extend from the first distal portion to the second distal portion (e.g., offset from the distal ends of the distal portions of the dental arch portion). In some embodiments, the beam is substantially parallel to line 240 of FIG. 2B).

In some embodiments, block 501 includes one or more of blocks 502-504.

At block 502, processing logic identifies transformations of the mold. Each of transformations includes a corresponding position of the beam relative to the dental arch portion. In some embodiments, transformations are pre-calculated transformations (e.g., different orientations and/or sizes of the beam). Each of the transformations may include a corresponding position of the beam 120 relative to the dental arch portion 110. In some examples, the beam 120 is at different distances from the distal ends of the distal portions of the dental arch portion 110 (e.g., different distances from line 240 of FIG. 2B) in different transformations of the mold 100. In some examples, the beam 120 and dental arch portion 110 are at different angles relative to each other. In some examples, the beam 120 and/or dental arch portion 110 have different heights (e.g., dental arch portion 110 includes different amounts of the gum region) in different transformations of the mold 100. In some examples, a substantially horizontal lower surface of the dental arch portion 110 is at different angles relative to an upper surface (e.g., teeth) of the dental arch portion 110 in different transformations of the mold 100 (e.g., the gum portion of the dental arch portion 110 forms a substantially horizontal lower surface at different angles relative to the upper surface in different transformations of the mold 100). In some examples, the beam 120 has different lengths or different chamfers 128 in different transformations of the mold 100.

At block 503, processing logic slices a 3D model of the dental arch portion to generate 2D contours of the 3D mold. FIG. 2A illustrates 2D contours of the 3D model. In some embodiments, the 2D contours are created for the different transformations of the dental arch portion 110. The 2D contours may be generated for one or more heights of the dental arch portion 110 that include or are parallel to the lower surface of the dental arch portion 110. In some embodiments, 2D contours are generated for one or more heights that correspond to a thickness of the beam 120 (e.g., of the chamfer 128 of the beam).

At block 504, processing logic selects a first transformation of the transformations based on the 2D contours. The transformation includes a position of the beam 120 relative to the dental arch portion 110. The transformation may include shape of the dental arch portion (e.g., how much of the gum region is included in the dental arch portion 110). In some embodiments, the processing logic checks each transformation from the list of pre-calculated transformations and chooses the first transformation that satisfies several conditions (e.g., see FIG. 5B).

At block 505, process logic determines layout of an identifier to be formed on the beam between the first distal portion and the second distal portion (e.g., processing logic generates the tag).

Block 505 may include one or more of blocks 506-508.

At block 506, the processing logic identifies a predefined format for a label portion of the beam (e.g., generate the tag in a predefined format). For example, the predefined format may be a label portion of the beam of a first threshold length.

At block 507, processing logic determines, based on the identifier, digits of a label (e.g., cut-out label) to be formed in the label portion of the beam (e.g., generate control information including control digits of cut-out label). The processing logic may determine an 11-13 digit label based on the identifier. The label may include stencil-shaped numerals to be formed in the beam. Each digit may be a void of material (e.g., through-holes through the beam) that forms a number. The digits of the label may be human-readable and machine-readable.

At block 508, processing logic determines, based on the identifier, identifier features for the beam (e.g., generate control information include pins, such as 16 bits of control information). The processing logic may determine a pattern of 0's and 1's, where 0 corresponds to no identifier feature and 1 corresponds to an identifier feature. The pattern of 0's and 1's is configured to be read as identifier feature presence data. The identifier feature presence data may be used to verify the identifier displayed by the label. In some embodiments, the identifier features form a binary code to be decoded to verify the identifier determined from the digits of the label.

At block 509, processing logic determines a shape of the beam to be attached to the dental arch portion of the mold (e.g., processing logic constructs the beam shape). The mold is to be formed based on the position of the beam (from block 501), the identifier (from block 505), and the shape of the beam (from block 509).

Block 509 may include one or more of blocks 510-513.

At block 510, the processing logic determines shape of a label portion forming a label (e.g., cut-out label) based on the identifier (e.g., create a flat beam with stencil digits). The label portion is to provide a threshold area for each digit of the identifier. Processing logic may determine a threshold length for the label portion based on the number of digits of the identifier.

At block 511, the processing logic determines, based on the identifier, location of identifier features (e.g., control pins, identifier features) on the beam (e.g., create flat beam with binary identifier features). To determine the location of the pins, the processing logic may determine the location of the pick and place component (e.g., a location where the pick and place robot has clearance to secure the pick and place component) and then locate the pins a threshold distance from the pick and place component. Each of the sub-areas along the sidewalls of the beam that correspond to an identifier feature (e.g., "1") or a lack of an identifier feature (e.g., "0") may each have a predetermined area.

At block 512, the processing logic determines reinforcement portions of the beam (e.g., create reinforcement parts to prevent beam deformation). The reinforcement portions of the beam may extend from chamfer to chamfer. The reinforcement portions of the beam may be configured to extend from a first distal portion of the dental arch portion to the second distal portion of the dental arch portion.

At block 513, the processing logic determines chamfers of the beam (e.g., create chamfers between the beam and the mold to prevent beam breakage, fit chamfer shape to the cutting line to provide safety gap). The reinforcement portions may have a greater thickness than the label portion. The chamfer portion may start at the same thickness as the label portion and may increase in thickness until it has the same thickness as the reinforcement portions.

Referring to FIG. 5B, method 500B is associated with selecting a transformation of the mold for dental appliance production, according to certain embodiments.

At block 515, processing logic selects a transformation of the mold. Multiple potential transformations of the mold may be generated and method 500B may be repeated until a transformation meets all of the conditions of method 500B. In some embodiments method 500B is repeated for each of the transformations of the mold and then the transformations that meet all of the conditions of method 500B are compared to each other.

At block 516, processing logic determines (e.g., measures) a width distance between distal ends of a beam of the mold from a first distal portion of the dental arch portion of the mold to a second distal portion of the dental arch portion of the mold in the transformation of the mold selected in block 515.

At block 517, processing logic determines whether the width distance of block 516 meets a threshold distance (e.g., length of label portion, combined length of label portion and chamfers) (e.g., there is enough room between distal portions 112A-B for the label to be formed in the label portion 122). Responsive to the width distance not meeting the threshold distance, flow returns to block 515 where another transformation of the mold is chosen. Responsive to the width distance meeting the threshold distance, flow continues to block 518.

At block 518, processing logic determines (e.g., measures) a length distance between the beam and a line intersecting a first distal end of the first distal portion and the second distal end of the second distal portion (e.g., line 240 of FIG. 2B) in the transformation of the mold selected in block 515.

At block 519, processing logic determines whether the length distance of block 518 meets a threshold distance (e.g., about 0 mm to about 15 mm) (e.g., distance from farthest point of the molars and beam is less than about 15 mm). Responsive to the width distance not meeting the threshold distance, flow returns to block 515 where another transformation of the mold is chosen. Responsive to the length distance meeting the threshold distance, flow continues to block 520.

At block 520, processing logic determines (e.g., measures) a feature offset distance between a pick and place component of the beam and corresponding identifier features of the beam (e.g., closest identifier pins extending from sidewalls of the beam) in the transformation of the mold selected in block 515.

At block 521, processing logic determines whether the feature offset distance of block 520 meets a threshold distance. In some embodiments, processing logic determines whether a feature offset distance on a first sidewall of the beam (e.g., that aligns with the pick and place component) meets a threshold distance (e.g., about 4.5 mm) and whether a feature offset distance on a second sidewall of the beam (e.g., that is attached to the pick and place component) meets the threshold distance (e.g., about 4.5 mm) (e.g., see threshold distance 230 of FIG. 2B). The feature offset distance provides clearance for dental appliance manufacturing equipment (e.g., a robot) to secure the pick and place component 130 to move the mold 100. Responsive to the feature offset distance not meeting the threshold distance, flow returns to block 515 where another transformation of the mold is chosen. Responsive to the feature offset distance meeting the threshold distance, flow continues to block 522.

At block 522, processing logic determines (e.g., measures) a gap distance between a trim line of the mold (e.g., of the dental arch portion, where the thermoformed sheet of plastic will be trimmed from the mold) and a connection between the dental arch portion and the beam (e.g., chamfers) in the transformation selected in block 515.

At block 523, processing logic determines whether the gap distance of block 522 meets a threshold distance. Responsive to the gap distance not meeting the threshold distance, flow returns to block 515 where another transformation of the mold is chosen. Responsive to the gap distance meeting the threshold distance, flow continues to block 518.

At block 524, processing logic determines whether the beam is positioned between the incisor portion of the dental arch and the line (e.g., line 240 of FIG. 2B) intersecting distal ends of the distal portions of the dental arch in the transformation (e.g., distal ends of beam 120 are fully connected to the dental arch portion 110, no portion of distal ends of beam 120 extend past line 240). Responsive to the beam not being positioned between the incisor portion and the line, flow returns to block 515 where another transformation of the mold is selected. Responsive to the beam being positioned between the incisor portion and the line, flow continues to block 525.

At block 525, processing logic determines whether the identifier of the mold (e.g., label and/or identifier features) are not obstructed by geometries of the mold (e.g., inclined teeth). Responsive to the identifier being obstructed, flow returns to block 515 where another transformation of the mold is chosen. Responsive to the identifier not being obstructed, flow continues to block 526.

At block 526, processing logic determines whether the beam would generate production issues. For example, processing logic determines whether webbing (e.g., additional material between the beam and the dental arch portion, gaps in the material between the beam and the dental arch portion) occurs. Responsive to determining the beam would generate production issues, flow returns to block 515 where another transformation of the mold is chosen. Responsive to the beam would not generate production issues, flow continues to block 527.

At block 527, processing logic uses the transformation of the mold selected at block 515 for a position of the beam relative to the dental arch portion (e.g., see blocks 501 and block 504 of FIG. 5A). In some embodiments, the processing logic uses the first transformation that meets the conditions of FIG. 5B. In some embodiments, the processing logic identifies multiple transformations that meet the conditions of FIG. 5B, ranks the transformations, and then uses the highest ranking transformation. The processing logic may rank the transformations based on amount of material used (e.g., less material is ranked higher), distance from the line between the distal ends of the distal portions of the dental arch portion (e.g., closer to the line is ranked higher, closer to 15 mm from the line is ranked higher, etc.), and/or the like.

Referring to FIG. 5C, method 500C is associated with dental appliance production using a mold, according to certain embodiments.

At block 530, processing logic receives a digital model of a mold. In some embodiments, the mold associated with a dental arch of a user, such as a mold usable to form a dental appliance. In some embodiments, the mold is to be used to form a dental appliance (e.g., to be used in relation to a dental arch of a user), such as incremental palatal expanders, aligners (e.g., aligners with or without mandibular advancement structures and/or other structures), dental attachment templates, and/or other dental appliances.

A shape of a dental arch for a patient at a treatment stage may be determined based on a treatment plan to generate the digital model of the mold. In the example of orthodontics, the treatment plan may be generated based on an intraoral scan of a dental arch (e.g., dental arch to receive a dental appliance, dental arch to be modeled). The intraoral scan of a patient's dental arch may be performed to generate a 3D virtual model of the patient's dental arch. For example, a full scan of the mandibular and/or maxillary arches of a patient may be performed to generate 3D virtual models thereof. The intraoral scan may be performed by creating multiple overlapping intraoral images from different scanning stations and then stitching together the intraoral images to provide a composite 3D virtual model. In other applications, virtual 3D models may also be generated based on scans of an object to be modeled or based on use of computer aided drafting techniques (e.g., to design the virtual 3D mold). Alternatively, an initial negative mold may be generated from an actual object to be modeled. The negative mold may then be scanned to determine a shape of a positive mold that will be produced.

Once the virtual 3D model of the patient's dental arch is generated, a dental practitioner may determine a desired treatment outcome, which includes final positions and orientations for the patient's teeth. Processing logic may then determine a number of treatment stages to cause the teeth to progress from starting positions and orientations to the target final positions and orientations. The shape of the final virtual 3D model and each intermediate virtual 3D model may be determined by computing the progression of tooth movement throughout orthodontic treatment from initial tooth placement and orientation to final corrected tooth placement and orientation. For each treatment stage, a separate virtual 3D model of the patient's dental arch at that treatment stage may be generated. The shape of each virtual 3D model will be different. The original virtual 3D model, the final virtual 3D model and each intermediate virtual 3D model is unique and customized to the patient.

The processing logic may determine an initial shape for a mold of the patient's dental arch at a treatment stage based on the digital model of the dental arch at that treatment stage. Processing logic may additionally determine one or more features to add to the object.

The processing logic may determine a final shape for the mold and may generate a digital model of the mold. Alternatively, the digital model may have already been generated. In such an instance, processing logic may update the already generated digital model to include one or more determined features for the mold. The digital model may be represented in a file such as a computer aided drafting (CAD) file or a 3D printable file such as a stereolithography (STL) file. The digital model may include instructions that will control a fabrication system or device in order to produce the mold with specified geometries.

At block 531, process logic forms the mold. Block 521 may include one or more of blocks 532-537. In embodiments, the mold is formed via three-dimensional printing, such as by using a rapid prototyping machine.

At block 532, processing logic causes a dental arch portion of a mold to be formed.

At block 533, processing logic causes a label portion of a beam of the mold to be formed.

At block 534, processing logic causes a label (e.g., cut-out label) to be formed in the label portion.

At block 535, processing logic causes pins (e.g., identifier features, control pins) to be formed on the beam.

At block 536, processing logic causes reinforcement portions of the beam to be formed.

At block 537, processing logic causes chamfers of the beam to be formed.

In embodiments, some or all of the options of blocks 532-537 may be performed in parallel during formation of the mold (e.g., the mold is formed layer by layer). In some embodiments, one or more of blocks 532-537 are performed in series. For example, the dental arch portion may be formed at block 532 and then the label portion of the mold may be formed at block 533, and then the label of block 534 may be formed (e.g., material is removed from the label portion to form the label), etc.

A mold may be generated based on the digital model of block 530. A virtual 3D model of a patient's dental arch may be used to generate a unique customized mold associated with the dental arch at a particular stage of treatment. The shape of the mold may be at least in part based on the shape of the virtual 3D model for that treatment stage. The mold may correspond to a dental arch of a patient and the mold may include a sloping portion that commences below a gum line of the dental arch and extends away from the dental arch to a lower portion of the mold. In some embodiments, the mold is generated with the sloping portion commencing below the gum line (e.g., to assist in the release of the thermoformed sheet of plastic from the mold). The mold may be formed using a rapid prototyping equipment (e.g., 3D printers) to manufacture the mold using additive manufacturing techniques (e.g., stereolithography) or subtractive manufacturing techniques (e.g., milling). The digital model may be input into a rapid prototyping machine. The rapid prototyping machine then manufactures the mold using the digital model. One example of a rapid prototyping manufacturing machine is a 3D printer. 3D Printing includes any layer-based additive manufacturing processes. 3D printing may be achieved using an additive process, where successive layers of material are formed in proscribed shapes. 3D printing may be performed using extrusion deposition, granular materials binding, lamination, photopolymerization, continuous liquid interface production (CLIP), or other techniques. 3D printing may also be achieved using a subtractive process, such as milling.

In one embodiment, stereolithography (SLA), also known as optical fabrication solid imaging, is used to fabricate an SLA mold. In SLA, the mold is fabricated by successively printing thin layers of a photo-curable material (e.g., a polymeric resin) on top of one another. A platform rests in a bath of a liquid photopolymer or resin just below a surface of the bath. A light source (e.g., an ultraviolet laser) traces a pattern over the platform, curing the photopolymer where the light source is directed, to form a first layer of the mold. The platform is lowered incrementally, and the light source traces a new pattern over the platform to form another layer of the mold at each increment. This process repeats until the mold is completely fabricated. Once all of the layers of the mold are formed, the mold may be cleaned and cured. In one embodiment, a system such as described earlier herein (e.g., system 400A, dental appliance manufacturing equipment 406) is used to print the mold.

Materials such as a polyester, a co-polyester, a polycarbonate, a polycarbonate, a thermoplastic polyurethane, a polypropylene, a polyethylene, a polypropylene and polyethylene copolymer, an acrylic, a cyclic block copolymer, a polyetheretherketone, a polyamide, a polyethylene terephthalate, a polybutylene terephthalate, a polyetherimide, a polyethersulfone, a polytrimethylene terephthalate, a styrenic block copolymer (SBC), a silicone rubber, an elastomeric alloy, a thermoplastic elastomer (TPE), a thermoplastic vulcanizate (TPV) elastomer, a polyurethane elastomer, a block copolymer elastomer, a polyolefin blend elastomer, a thermoplastic co-polyester elastomer, a thermoplastic polyamide elastomer, or combinations thereof, may be used to directly form the mold. The materials used for fabrication of the mold can be provided in an uncured form (e.g., as a liquid, resin, powder, etc.) and can be cured (e.g., by photopolymerization, light curing, gas curing, laser curing, crosslinking, etc.). The properties of the material before curing may differ from the properties of the material after curing.

Optionally, the rapid prototyping techniques described herein allow for fabrication of a mold including multiple materials, referred to herein as "multi-material direct fabrication." In some embodiments, a multi-material direct fabrication method involves concurrently forming a mold from multiple materials in a single manufacturing step. For instance, a multi-tip extrusion apparatus can be used to selectively dispense multiple types of materials (e.g., resins, liquid, solids, or combinations thereof) from distinct material supply sources in order to fabricate a mold from a plurality of different materials. Alternatively or in combination, a multi-material direct fabrication method can involve forming a mold from multiple materials in a plurality of sequential manufacturing steps. For instance, a first portion of the mold (e.g., a main portion of the mold) can be formed from a first material in accordance with any of the direct fabrication methods herein, then a second portion of the mold (e.g., complex features added to the mold) can be formed from a second material in accordance with methods herein, and so on, until the entirety of the mold has been formed. The relative arrangement of the first and second portions can be varied as desired. In one embodiment, multi-material direct fabrication is used to cause a first material to be used for the markings of the cut line on the mold, and to cause one or more additional materials to be used for the remainder of the mold.

In some embodiments, a dental appliance may be formed from the mold (e.g., by thermoforming the dental appliance over the mold). The dental appliance may be configured to provide forces to move the patient's teeth, or may be configured to perform other actions such as to protect a patient's teeth from bruxism. The shape of each dental appliance is unique and customized for a particular patient and a particular treatment stage. In an example, dental appliances can be pressure formed or thermoformed over printed molds. Each mold may be used to fabricate a dental appliance that will apply forces to the patient's teeth at a particular stage of the orthodontic treatment. The dental appliances each have teeth-receiving cavities that receive and resiliently reposition the teeth in accordance with a particular treatment stage.

Responsive to forming the mold, the mold is removed from the build platform. The mold may then be secured to a plate (e.g., plate 180 of FIGS. 1A, 1B, and 1D). The mold may be secured to the plate via fasteners such as a pin, a keyway, and/or a locking mechanism (e.g., locking mechanism 184). The mold may be secured to the plate to avoid movement of the mold in the x-, y-, and/or z-direction and to avoid rotation (e.g., change in angle) of the mold during further processing.

The processing logic may identify the mold via the label (e.g., cut-out label) and/or pins of the beam prior to moving the mold (e.g., pick and place operations). The processing logic may identify the mold via an imaging system (e.g., part of an imaging station, part of thermoforming station, part of trimming station, part of robot used to move the mold, etc.). Responsive to identifying the mold via the label (e.g., cut-out label) and/or pins of the beam, the processing logic may cause the mold to be moved (e.g., pick and place operations) by securing the mold by the pick and place component coupled to (e.g., integral to) the beam. The mold may be moved to a thermoforming station via a robot arm, conveyor belt, or other transport mechanism. The mold may be secured at the thermoforming station via a locking mechanism of a plate that secures the flat portion of the mold.

At block 538, processing logic causes a sheet of plastic to be heated. The sheet of plastic may be secured to a pallet and the sheet of plastic secured to the pallet may be surrounded with a mask prior to heating the sheet of plastic. The sheet of plastic may be an elastic thermoplastic, a sheet of polymeric material, etc. The sheet of plastic may be lowered onto the pallet so that holding pins of the pallet pierce the sheet of plastic to secure the sheet of plastic to the pallet. A pressurized cylinder may lower the mask onto the sheet of plastic secured to the pallet. The sheet of plastic may be heated to a temperature at which the sheet of plastic becomes pliable. The sheet of plastic may be heated using a ceramic heater, convection oven, or infrared heater. The mask may allow the sheet of plastic to be heated to 336° F. without hanging to avoid air leaks.

At block, 539, processing logic identifies the mold via the label (e.g., cut-out label) and/or identifier features of the beam (e.g., see FIGS. 5E-K). The processing logic may receive an image of the mold, determine an identifier of the mold based on the image (e.g., see FIGS. 5E-K), and retrieve thermoforming instructions based on the identifier.

At block 540, processing logic causes the heated sheet of plastic to be thermoformed to the mold (e.g., based on the identifier of the mold and/or the thermoforming instructions). The processing logic may perform block 540 subsequent to identifying the mold in block 539. To thermoform the heated sheet of plastic over the mold, pressure may concurrently be applied to the sheet of plastic to form the now pliable sheet of plastic around the mold (e.g., with features that will imprint markings and/or elements in the dental appliance formed on the mold). Once the sheet cools, it will have a shape that conforms to the mold. In one embodiment, a release agent (e.g., a non-stick material) is applied to the mold before forming the dental appliances (e.g., shells). This may facilitate later removal of the molds from the shells.

At block, 541, processing logic identifies the mold via the label (e.g., cut-out label) and/or identifier features of the beam (e.g., see FIGS. 5E-K). The processing logic may receive an image of the mold, determine an identifier of the mold based on the image (e.g., see FIGS. 5E-K), and retrieve trimming instructions based on the identifier.

At block 542, process logic causes the thermoformed sheet of plastic to be trimmed to form a dental appliance (e.g., based on the identifier of the mold and/or the thermoforming instructions). The mold with the thermoformed sheet of plastic may be moved to a trimming station and image recognition is performed to verify the correct mold and trimming instructions are being used. The processing logic may perform block 542 subsequent to identifying the mold in block 539 or 541. The thermoformed sheet of plastic may be removed from the mold (e.g., using a shell removal device) prior to being trimmed or after being trimmed. The thermoformed sheet of plastic may be trimmed to generate the dental appliance. In some embodiments, the portion of thermoformed sheet of plastic that is disposed on a portion of the mold that slopes outward below the gum line is removed during the trimming of the thermoformed sheet of plastic to generate the dental appliance. Before or after the thermoformed sheet of plastic is removed from the mold for a treatment stage, the thermoformed sheet of plastic is trimmed along one or more cut lines (also referred to as a trim line). The cut line may be a gingival cut line that represents an interface between a dental appliance and a patient's gingiva. In one embodiment, the dental appliance is manually cut by a technician using scissors, a bur, a cutting wheel, a scalpel, or any other cutting implement. In another embodiment, the dental appliance is cut by a computer controlled trimming machine such as a CNC machine or a laser trimming machine. The computer controlled trimming machine may control an angle and position of a cutting tool of the trimming machine to trim the thermoformed sheet of plastic.

In some embodiments, the transferring of the plate securing the mold and/or the sheet of plastic is via a conveyor system (e.g., via lateral movement). In some embodiments, the transferring of the plate securing the mold and/or the sheet of plastic is via a dial system (e.g., via rotational movement).

In some embodiments, the mold is transferred to be located below the thermoforming station and is lifted to have the heated sheet thermoformed over the first mold and the second mold. In some embodiments, the transferring of the first mold to be located below the thermoforming station is via lateral movement (e.g., conveyor system). In some embodiments, the transferring of the mold to be located below the thermoforming station is via rotational movement (e.g., dial system).

In some embodiments, the techniques herein can be used to form molds, such as thermoforming molds. Examples of these can be found in: U.S. Pat. No. 9,943,991, by inventors Tanugula et al., entitled "Mold with separable features;" U.S. Pat. No. 9,943,386, to inventors Webber et al., entitled "Mold with weakened areas;" and U.S. Pat. No. 8,776,391 to inventors Kaza et al., entitled "System for post-processing orthodontic appliance molds;" as well as any continuation or divisional application claiming priority and any utility or provisional application to which these claim priority therefrom. These patents/applications are hereby incorporated by reference as if set forth fully herein.

In some embodiments, the techniques herein can be used to form appliances with mandibular repositioning features. Examples of these can be found in: U.S. Pat. No. 9,844,424 by inventors Wu et al., entitled, "Dental appliance with repositioning jaw elements;" U.S. Pat. Pub. No. 2015/0238280 by inventors Wu et al., entitled "Dental appliance with repositioning jaw elements;" U.S. Pat. No. 10,213,277 by inventors Webber et al., entitled "Dental appliance binding structure;" as well as any continuation or divisional application claiming priority and any utility or provisional application to which these claim priority therefrom. These patents/applications are hereby incorporated by reference as if set forth fully herein.

In some embodiments, the techniques herein can be used to form palatal expanders. Examples can be found in: U.S. Pat. No. 9,610,141 by inventors Kopelman et al., entitled, "Arch expanding appliance;" U.S. Pat. No. 7,192,273 by inventor McSurdy entitled "System and method for palatal expansion;" U.S. Pat. No. 7,874,836 by inventor McSurdy entitled "System and method for palatal expansion;" as well as any continuation or divisional application claiming priority and any utility or provisional application to which these claim priority therefrom. These patents/applications are hereby incorporated by reference as if set forth fully herein.

In some embodiments, the techniques herein can be used to form attachment formation templates. Examples can be found in: U.S. Pat. Pub. No. 2017/0007368 by inventor Boronkay entitled "Direct fabrication of attachment templates with adhesive;" U.S. Pat. Pub. No. 2017/0165032 by inventors Webber et al., entitled "Dental attachment placement structure;" U.S. Pat. Pub. No. 2017/0319296 by inventors Webber et al., entitled "Dental attachment placement structure;" the contents of U.S. patent application Ser. No. 16/366,686 by inventors Webber et al., entitled "Dental attachment placement structure;" as well as any continuation or divisional application claiming priority and any utility or provisional application to which these claim priority therefrom. These patents/applications are hereby incorporated by reference as if set forth fully herein.

In some embodiments, the techniques herein can be used to form directly fabricated aligners. Examples can be found in: U.S. Pat. App. Pub. No. 2016/0310236 by inventors Kopelman et al., entitled "Direct fabrication of orthodontic appliances with elastics;" U.S. Pat. App. Pub. No. 2017/0007365 to Kopelman et al., entitled "Direct fabrication of aligners with interproximal force coupling;" U.S. Pat. App. Pub. No. 2017/0007359 to Kopelman et al., entitled "Direct fabrication of orthodontic appliances with variable properties;" U.S. Pat. App. Pub. No. 2017/0007360 to Kopelman et al., entitled "Systems, apparatuses and methods for dental appliances with integrally formed features;" U.S. Pat. No. 10,363,116 to Boronkay entitled "Direct fabrication of power arms;" U.S. Pat. App. Pub. No. 2017/0007366 to Kopeleman et al., entitled "Direct fabrication of aligners for arch expansion;" U.S. Pat. App. Pub. No. 2017/0007367 to Li et al., entitled "Direct fabrication of palate expansion and other application;" as well as any continuation or divisional application claiming priority and any utility or provisional application to which these claim priority therefrom. These patents/applications are hereby incorporated by reference as if set forth fully herein.

Examples of materials that can be used with the embodiments discussed herein include the subject matter of U.S. Pat. Pub. No. 2017/0007362, by inventors Yan CHEN et al., entitled, "Dental Materials Using Thermoset Polymers;" International Patent Application Number PCT/US2019/030683 to ALIGN TECHNOLOGY, INC., entitled "Curable Composition for Use in a High Temperature Lithography-Based Photopolymerization Process and Method of Producing Crosslinked Polymers Therefrom; and International Patent Application Number PCT/US2019/030687 to ALIGN TECHNOLOGY, INC., entitled, "Polymerizable Monomers and Method of Polymerizing the Same." These patents/applications are hereby incorporated by reference as if set forth fully herein. As noted herein, the hybrid 3D printing techniques may combine advantages of SLA, DLP and FDM into a single technology that can be used as the basis of 3D printing objects (dental appliances, hearing aids, medical implants, etc.) for mass production.

Referring to FIG. 5D, method 500D is associated with generating a digital model of a mold (e.g., adding features to a digital model of a dental arch) for forming a dental appliance, according to certain embodiments.

At block 545, processing logic determines an identifier to be associated with a mold. Block 540 may include determining a patient identifier (e.g., 8 digits) associated with the mold, control information (e.g., control digit used to verify tag recognition correctness, notify about recognition errors, and/or correct errors of recognition) associated with the mold, a material-jaw identifier based on material of a dental appliance to be formed by the mold and jaw associated with the mold, and/or a stage identifier (e.g., 1-99) associated with the mold. In some embodiments, determining of the material-jaw identifier includes determining a material (e.g., aligner, template, or retainer) of a dental appliance to be formed by the mold and determining a jaw (e.g., lower or upper) associated with the mold. In some embodiments, the identifier is based on the patient identifier, the control information, the material-jaw identifier, and the stage identifier.

In some embodiments, the control information (e.g., control digit) may cover the last three symbols of the identifier (e.g., material/jaw and stage).

The control information may be calculated for the digits (e.g., cut-out label) and for the identifier features.

At block 546, process logic determines, based on the identifier, a label (e.g., cut-out label) to be formed by a label portion of a beam of the mold for identification of a mold. The mold may include a dental arch portion associated with a plurality of teeth of a user. The dental arch portion may include a first distal portion, a second distal portion, and an incisor portion disposed between the first distal portion and the second distal portion. The beam is to extend from the first distal portion to the second distal portion.

The label (e.g., cut-out label) may include digits, where a first subset of the digits is associated with the patient identifier, a second subset of the digits is associated with the control information, a third subset of the of digits is associated with the material-jaw identifier, and a fourth subset of the digits is associated with the stage identifier. The control information may be used to verify the identifier. For example, a sum of all of the digits of at least a portion of the identifier may be performed, then an algorithm (e.g., modulus 10 algorithm, mod 10 algorithm, Luhn algorithm, Luhn formula) is applied to the sum, and then a permutation is applied to the algorithm result (e.g., apply permutation 1246395078). The result (e.g., permutation applied to the mod 10 result of the sum of the digits) may be compared to the control information digit(s). If the result matches the control information digit(s), then it may be verified that the digits are correct.

For example, if at least a portion of the identifier is 123456, then:
Sum of each of the digits 123456: 1+2+3+4+5+6=21
Apply mod 10 to the sum: 21 mod 10=1
Apply permutation: apply permutation 1246395078 to 1=2 (second digit, indexing from zero)
2 is used as the control information digit on the label formed in the label portion of the beam.

At block 547, processing logic determines placement of the beam within a first threshold distance of distal ends of the dental arch portion.

At block 548, processing logic determines a position of a pick and place component of the mold within a threshold distance (e.g., threshold distance 230 of FIG. 2B) of a center of the beam. The processing logic may determine the location closest to the center of the beam where dental appliance manufacturing equipment (e.g., a robot) would not be obstructed by geometries (e.g., teeth) of the mold when securing the pick and place component.

In some embodiments, processing logic determines a type of dental appliance to be formed by the mold and a type label to be formed on the pick and place component of the mold based on the type of dental appliance.

At block 549, processing logic determines feature offset associated with the position of the pick and place component. In some embodiments, the feature offset is a block is from negative max block offset (e.g., about −4.5 mm from the center of the pick and place component) to positive block offset (e.g., about +4.5 mm from the center of the pick and place component) on either side of the beam (e.g., along both sidewalls of the beam).

At block 550, process logic determines, based on the identifier, identifier features to be formed on the beam. The identifier features may form a barcode (e.g., a 16-bit barcode). The identifier features may extend from sidewalls of the beam. The barcode may be formed based on at least a portion (e.g., 11 digits) of the identifier (e.g., tag) except for control digit (e.g., include PID plus three last symbols of the identifier: material/jaw and stage).

At block 551, process logic determines, based on the feature offset, layout of the identifier features on sidewalls of the beam. Processing logic may generate control information (e.g., a row of 16 bits) and separate the control information into two bytes. The first byte may be located on the first sidewall (e.g., top or first side of the beam) and the second byte may be located on the second sidewall (e.g., bottom or second side of the beam). In one embodiment, processing logic calculates the right offset to the pins from the center of the portion 320 (e.g., depending on top fixture size and bottom fixture size parameters that may be equal to about 13 mm, so that there is about 6.5 mm on each side in the x-direction (right and left)). Processing logic may fill identifier features on the right side of the beam (e.g., locate as many pins as possible on the right side) Processing logic may then calculate the left offset (e.g., similar to the calculating of the right offset) and fill identifier features on the left side of the beam (e.g., similar to the filling of the identifier features on the right side).

The identifier feature may be represented in decimal positional numeral system and after this XOR all $16-digits$ parts, starting with lowest digits.

For example, if at least a portion of the identifier is 123456, then:
  Convert from decimal system to binary system: 123456 becomes 11110001001000000 (or 1E240 hex)
  Apply XOR all to the result: 1110001001000000 XOR 1=1110001001000001 (or E241 hex).

The result can then be shown on the beam as identifier features. Half of the digits is shown along a first sidewall (e.g., first 8 digits) and half of the digits (e.g., last 8 digits) is shown along a second sidewall. Each 0 is shown as a lack of identifier feature (e.g., lack of protruding pin) and each 1 is shown as an identifier (e.g., a protruding pin).

In some embodiments, processing logic determines identifier features based on the patient identifier, the material-jaw identifier, and/or the stage identifier. The processing logic may separate the identifier features into a first subset and a second subset and may cause the first subset of the identifier features to be formed on a first sidewall of the beam and the second subset of the identifier features to be formed on a second sidewall.

In some embodiments, the processing logic causes a first control pin and a second control pin to be formed on the first sidewall of the beam, where the first subset of the identifier features extend from the first sidewall of the beam between the first control pin and the second control pin. The processing logic may cause a third control pin and a fourth control pin to be formed on the second sidewall of the beam, where the second subset of the identifier features extend from the second sidewall of the beam between the third control pin and the fourth control pin.

Figure 5E:
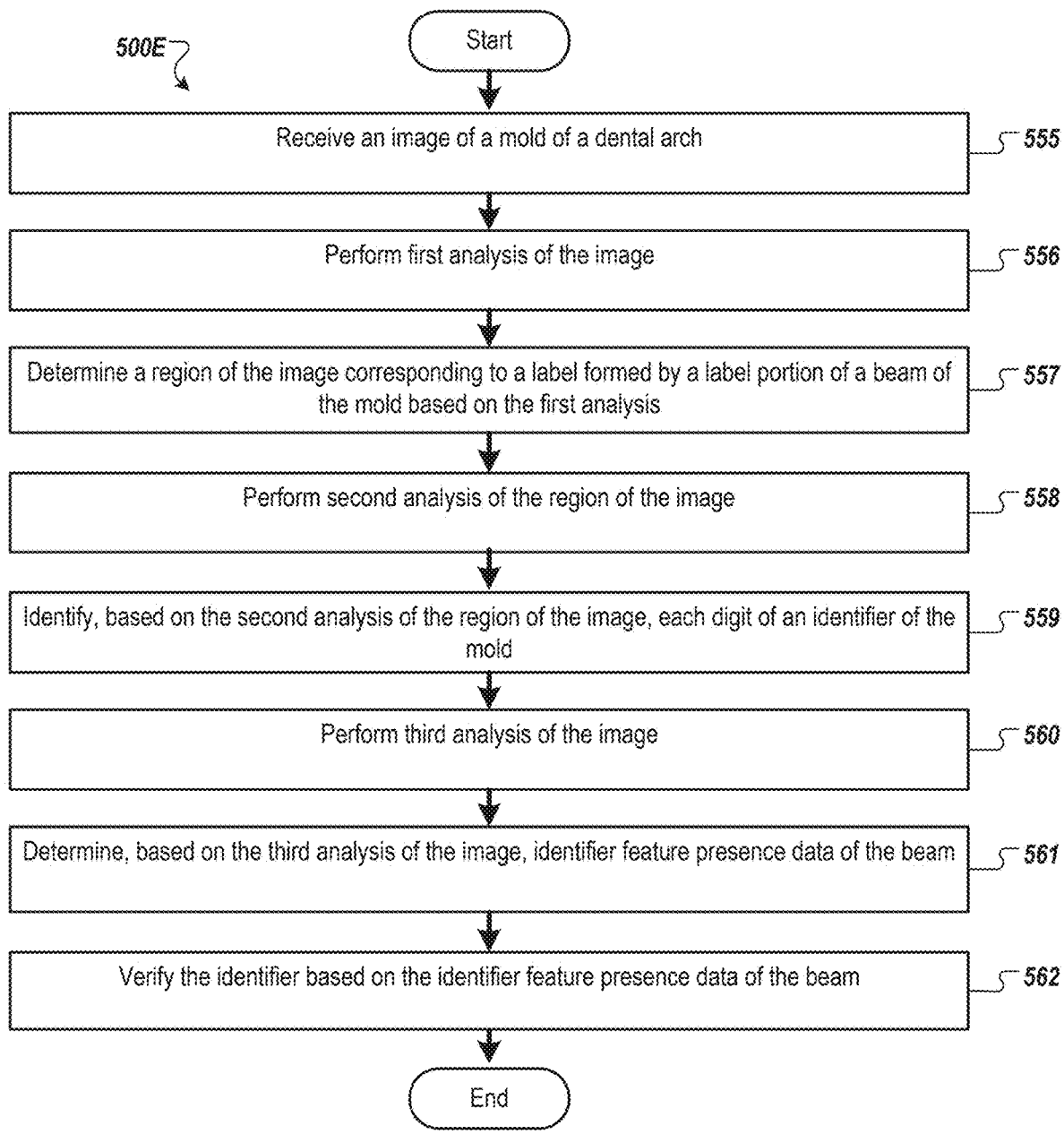

Referring to FIG. 5E, method 500E to identify a mold to form a dental appliance, according to certain embodiments.

At block 555, processing logic receives an image of a mold of a dental arch of a patient. The image may be captured by an imaging device of dental appliance manufacturing equipment or separate from dental appliance manufacturing equipment. The image may be captured before using the mold in a station of the dental appliance manufacturing equipment (e.g., thermoforming station, trimming station, etc.).

At block 556, processing logic performs first analysis of the image. In some embodiments, block 556 is performed via machine learning of FIGS. 5F-G. In some embodiments, block 556 is performed by processing logic without using machine learning.

At block 557, processing logic determines a region of the image corresponding to a label (e.g., cut-out label) formed by a label portion of a beam of the mold based on the first analysis. The label (e.g., cut-out label) may form an identifier. In some embodiments, performing first analysis of the image (e.g., determining of the region) may include matching a template to the label portion in the image. For example, a template may be a rectangle that has a width to length ratio that matches a label portion of a beam. The template may be enlarged or shrunk (e.g., while matching the width to length ratio) to match the label portion of the beam. In some embodiments, performing first analysis of the image includes using a trained machine learning model (e.g., see FIGS. 5F-K) to determine the region. For example, a machine learning model may be trained using input of historical images and target output of historical regions (e.g., indication of historical regions of historical images). The image of block 555 may be input into the trained machine learning model and then the output may be indicative of the region of the label portion for the image.

At block 558, processing logic performs second analysis of the region of image. In some embodiments, block 558 is performed via machine learning of FIGS. 5H-I. In some embodiments, block 558 is performed by processing logic without using machine learning.

At block 559, process logic identifies, based on second analysis of the region of the image, each digit of the identifier of the label (e.g., cut-out label). The identifier is to be used for production of a dental appliance using the mold. In some embodiments, the second analysis includes using a trained machine learning model (e.g., see FIGS. 5H-I).

At block 560, processing logic performs third analysis of the image. In some embodiments, block 560 is performed via machine learning of FIGS. 5J-K. In some embodiments, block 560 is performed by processing logic without using machine learning.

At block 561, processing logic determines, based on third analysis of the image, identifier feature presence data. The identifier feature presence data may indicate whether there is an identifier feature in each potential identifier feature location between the control pins. In some embodiments, block 561 includes identifying a portion of the image corresponding to a pick and place component of the beam of the mold. Block 561 may further include identifying, in the image, a first control pin and a second control pin extending from a first sidewall of the beam and a third control pin and a fourth control pin extending from a second sidewall of the beam. Block 561 may further include identifying sub-areas of the image between the control pins on either side of the portion of the image corresponding to the pick and place component, a first subset of the sub-areas of the image being between the first control pin and the second control pin along the first sidewall of the beam, a second subset of the sub-areas of the image being between the third control pin and the fourth control pin along the second sidewall of the beam. Block 561 may further include determining whether each of the sub-areas of the image corresponds to a respective pin extending from the beam. In some embodiments, third analysis includes using a trained machine learning model (e.g., see FIGS. 5J-K).

At block 562, processing logic verifies the identifier determined at block 559 based on the identifier feature presence data of the beam determined at block 561. At block 562, processing logic may compare to an identifier based on the label (e.g., cut-out label) with an identifier based on the identifier features. Responsive to the identifiers matching, the processing logic may cause the mold to be use to form a dental appliance. Responsive to the identifiers not matching, the processing logic may cause a corrective action to be performed (e.g., provide an alert, cause the mold to be manually examined, stop the dental appliance manufacturing, etc.).

Figure 5F:
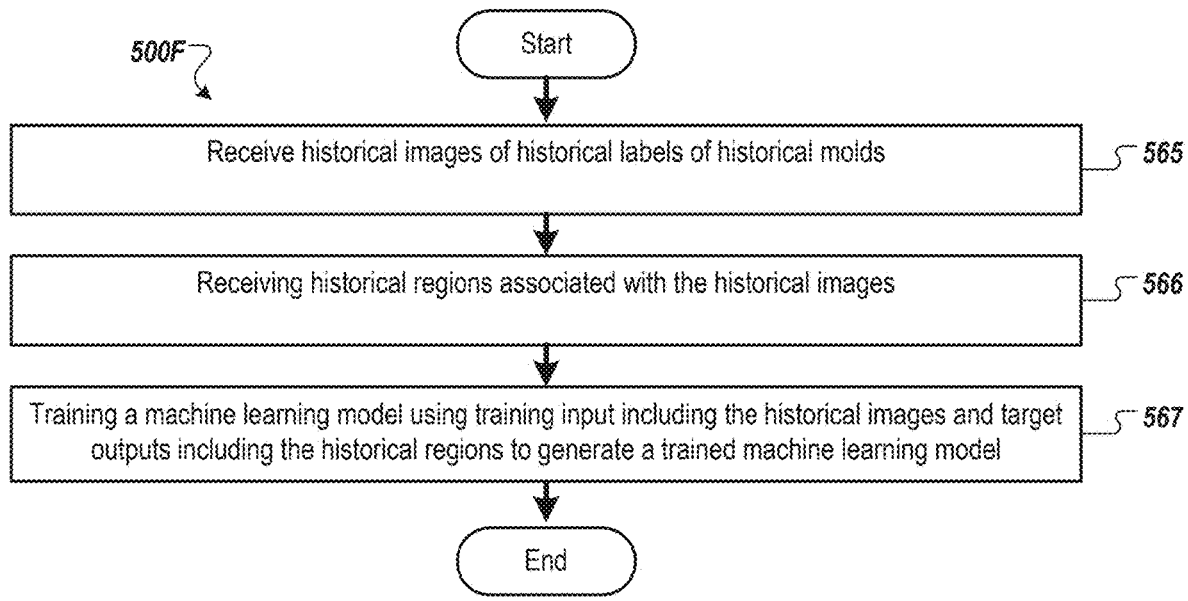

Referring to FIG. 5F, method 500F is associated with training a machine learning model associated with identifying a mold (e.g., determining a region of an image corresponding to a label formed by a label portion of a beam of the mold), according to certain embodiments.

At block 565, processing logic identifies historical images of historical labels of historical molds. The historical images may be of similar molds or different molds than the mold of block 555 of FIG. 5E.

At block 566, processing logic identifies historical regions associated with the historical images. The historical regions may be manually identified. The historical regions may be determined by one of the methods disclosed herein (e.g., method 500G) and manually verified. The historical regions indicate a historical boundary of a label portion of a beam that forms the label (e.g., cut-through label) of the beam.

At block 567, processing logic trains a machine learning model using data input including the historical images and target output including the historical regions to generate a trained machine learning model configured to generate outputs associated with predicting a region of a label portion of a beam of a mold responsive to inputting an image of the mold.

Figure 5G:
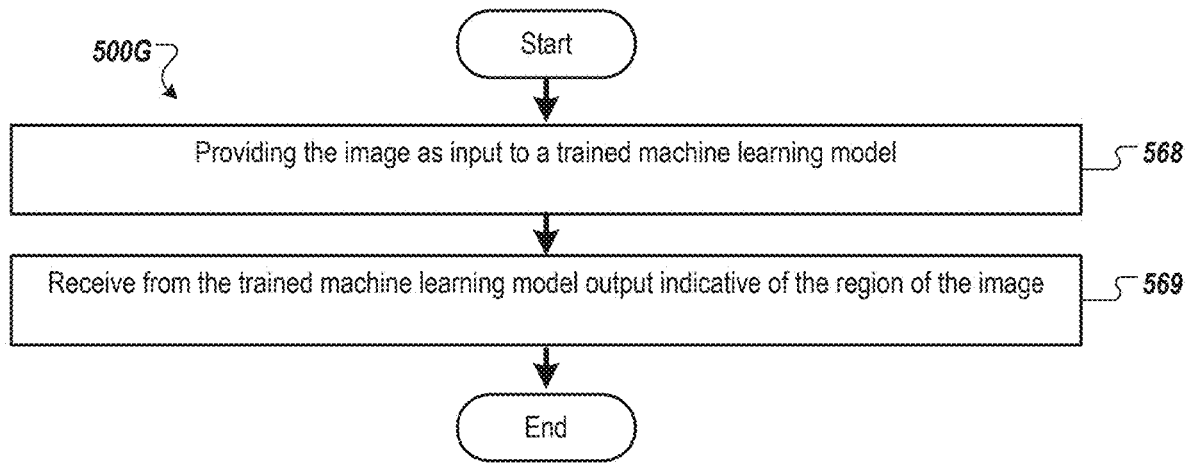

Referring to FIG. 5G, method 500G is associated with using a machine learning model associated with identifying a mold (e.g., determining a region of an image corresponding to a label formed by a label portion of a beam of the mold), according to certain embodiments.

At block 568, processing logic provides an image (e.g., of block 555 of FIG. 5E) as input to a trained machine learning model. The trained machine learning model may be trained by method 500F.

At block 569, processing logic obtains, from the trained machine learning model, one or more outputs indicative of predictive data including a predictive region of the image corresponding to the label portion of the beam. The predictive region may be used for identifying the digits of the label of the beam of the mold.

Figure 5H:
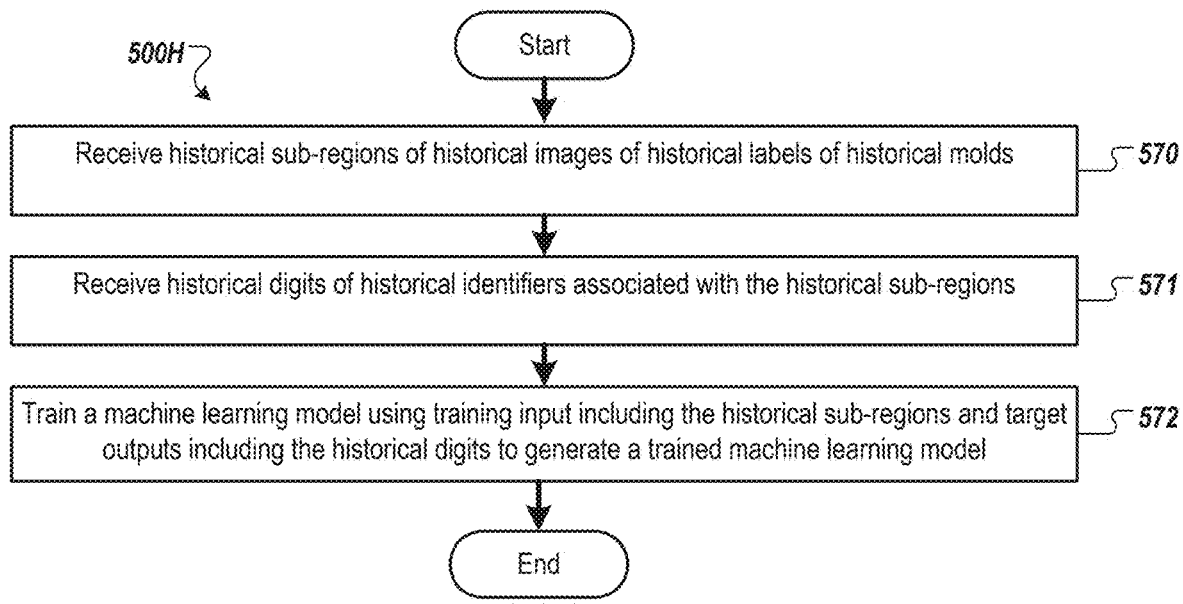

Referring to FIG. 5H, method 500H is associated with training a machine learning model associated with identifying a mold (e.g., determining digits of a label formed by a label portion of a beam of the mold), according to certain embodiments.

At block 570, processing logic identifies historical sub-regions of historical images of historical labels of historical molds. The historical sub-regions may be determined by a method disclosed herein (e.g., method 500I) and manually verified. The historical sub-regions may be the region determined by block 557 of FIG. 5E or method 500G of FIG. 5G divided by the number of digits of the historical labels (e.g., determined via user input).

At block 571, processing logic identifies historical digits associated with the historical sub-regions. The historical digits may be manually identified. The historical digits may be determined by one of the methods disclosed herein (e.g., method 500I) and manually verified.

At block 572, processing logic trains a machine learning model using data input including the historical sub-regions and target output including the historical digits to generate a trained machine learning model configured to generate outputs associated with predicting digits of a label in an image.

Figure 5I:
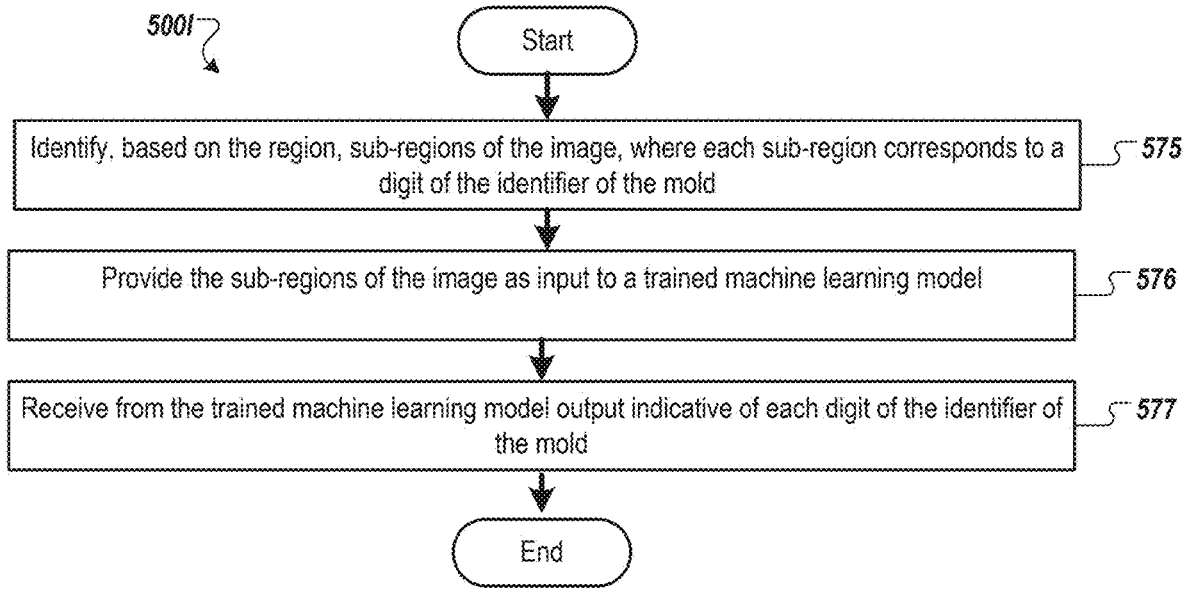

Referring to FIG. 5I, method 500I is associated with using a machine learning model associated with identifying a mold (e.g., determining digits of a label formed by a label portion of a beam of the mold), according to certain embodiments.

At block 580, processing logic identifies, based on the region of the label portion, sub-regions of the image, where each sub-region corresponds to a digit of the identifier of the mold. In some embodiments, the processing logic divides the region into equal sub-regions based on a predetermined number of digits (e.g., received via user input, identifiers for all molds have the same number of digits).

At block 581, processing logic provides the current sub-regions of the image to a trained machine learning model. The trained machine learning model may be trained by method 500H.

At block 582, processing logic obtains, from the trained machine learning model, one or more outputs indicative of predictive data including predictive digits of the identifier of the mold. The predictive digits (e.g., the identifier) may be used for identifying the mold.

Figures 5J, 5K:
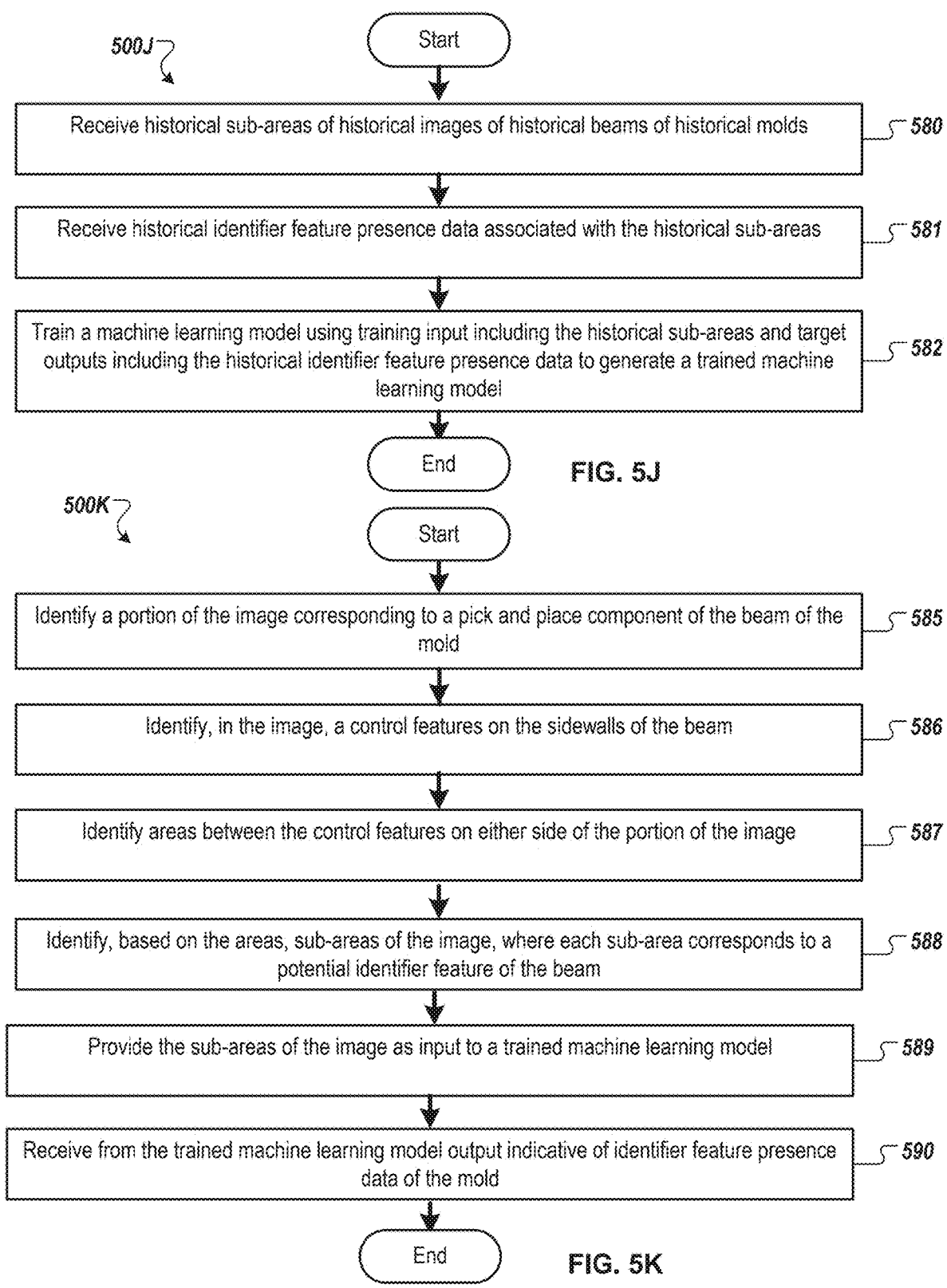

Referring to FIG. 5J, method 500J is associated with training a machine learning model associated with identifying a mold (e.g., determining identifier feature presence data of a beam of the mold), according to certain embodiments.

At block 580, processing logic identifies historical sub-areas of historical images associated with molds. The historical sub-areas may be manually identified. The historical sub-areas may be determined by a method disclosed herein (e.g., method 500K) and manually verified. The historical sub-areas may be the area determined by blocks 585-587 of FIG. 5K divided by the number of potential identifier features of the historical beams (e.g., determined via user input).

At block 581, processing logic identifies historical identifier feature presence data associated with the historical sub-areas. The historical identifier feature presence data may be manually identified. The historical identifier feature presence data may be determined by a method disclosed herein (e.g., method 500K) and manually verified.

At block 582, processing logic trains a machine learning model using data input including the historical sub-areas of the historical images and target output including the historical identifier feature presence data to generate a trained machine learning model configured to generate outputs associated with predicting identifier feature presence data of a mold.

Referring to FIG. 5K, method 500K is associated with using a machine learning model associated with (e.g., determining identifier feature presence data of a beam of the mold), according to certain embodiments.

At block 585, processing logic identifies a portion of an image (e.g., of block 555 of FIG. 5E) corresponding to a pick and place component of a beam of a mold. The portion of the image may include a threshold distance around the pick and place component (e.g., a box that has a 4.5 mm length that is centered at the center of the pick and place component).

At block 586, processing logic identifies, in the image, control features of the sidewalls (e.g., control pins 142 of FIG. 1A extending from the sidewalls) of the beam. The control features may be the features (e.g., pins) on the sidewalls of the beam that are closest to the distal portions of the dental arch portion of the mold. For example, a first control feature may be the closest feature on a first sidewall to a first distal portion of the dental arch portion, a second control feature may be the closest feature on the first sidewall to a second distal portion of the dental arch portion, a third control feature may be the closest feature on a second sidewall to the first distal portion of the dental arch portion, and a fourth control feature may be the closest feature on the second sidewall to the second distal portion of the dental arch portion, At block 587, processing logic identifies areas between the control features on either side of the portion of the image. The areas may include a first area along the first sidewall that is between the first control pin and the portion of the image, a second area along the first sidewall that is between the second control pin and the portion of the image, a third area along the second sidewall that is between the third control pin and the portion of the image, and a fourth area along the second sidewall that is between the fourth control pin and the portion of the image.

At block 588, processing logic identifies, based on the areas, sub-areas of the image. The processing logic may determine the sub-areas based on a predetermined amount of spaces for identifier features along the sidewalls of the beam. For example, for eight potential identifier features along the first sidewall and eight potential identifier features along the second sidewall, the processing logic may take a sum of the length of the first and second areas (e.g., length is along the sidewall) and divide the sum by eight and the processing logic may do the same for the third and fourth areas (e.g., divide a sum of their lengths by eight). Each sub-area corresponds to a potential identifier feature of the beam.

At block 589, processing logic provides the sub-areas to a trained machine learning model. The trained machine learning model may be trained by method 500J.

At block 590, processing logic obtains, from the trained machine learning model, one or more outputs indicative of predictive data indicative of identifier feature presence data of the mold. The identifier feature presence data may be used for identifying (e.g. or verifying the identifier of) the mold.

Figure 6:
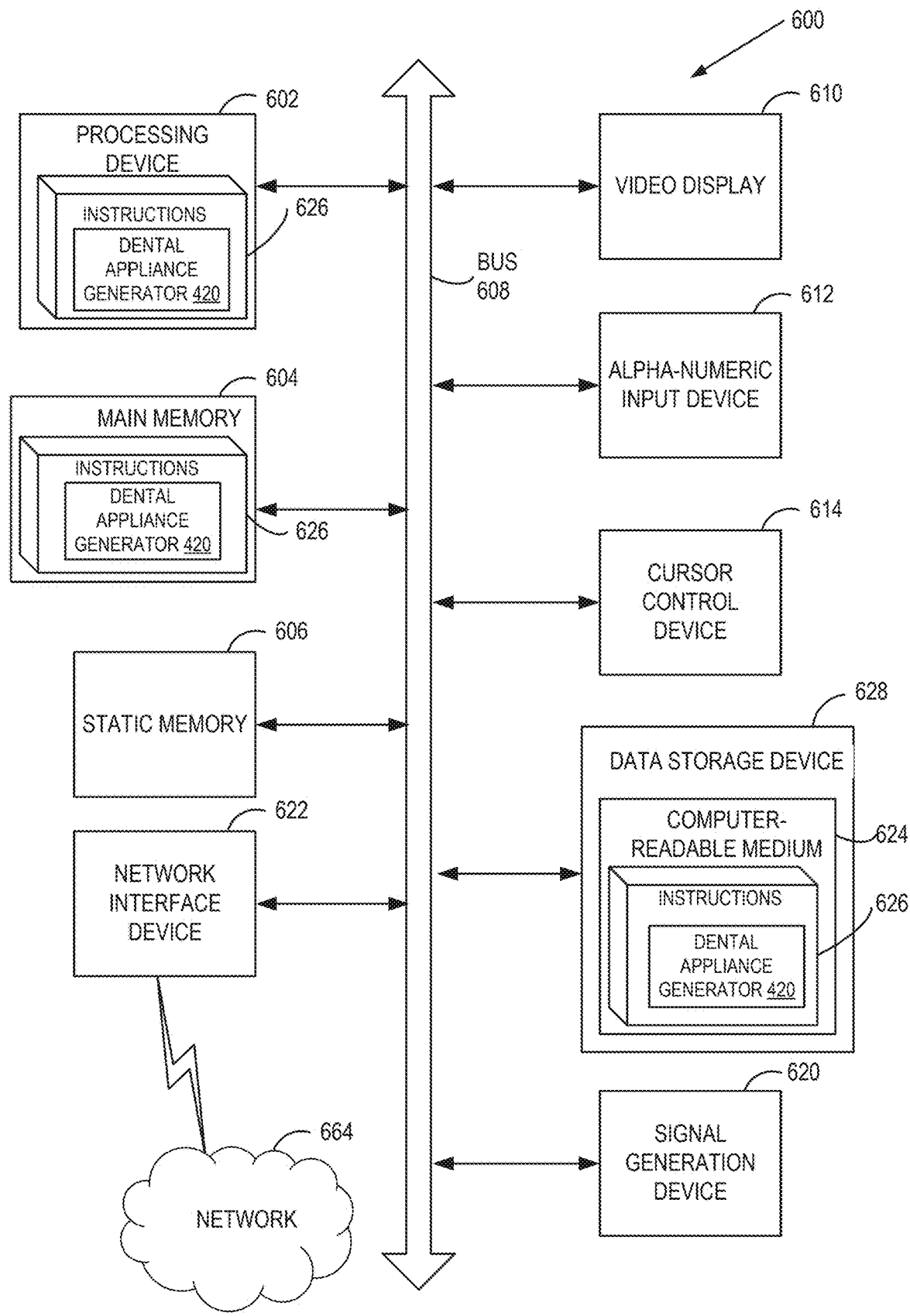
FIG. 6 illustrates a block diagram of an example computing device, according to certain embodiments.

FIG. 6 illustrates a diagrammatic representation of a machine in the example form of a computing device 600 within which a set of instructions, for causing the machine to perform any one or more of the methodologies discussed with reference to the methods of FIGS. 5A-K. In alternative embodiments, the machine may be connected (e.g., networked) to other machines in a Local Area Network (LAN), an intranet, an extranet, or the Internet. For example, the machine may be networked to a rapid prototyping apparatus such as a 3D printer or SLA apparatus. The machine may operate in the capacity of a server or a client machine in a client-server network environment, or as a peer machine in a peer-to-peer (or distributed) network environment. The machine may be a personal computer (PC), a tablet computer, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

In some embodiments, computing device 600 is one or more of controller 402, client device 404, dental appliance manufacturing equipment 406, imaging device 408, predictive server 412, server machine 470, or server machine 480. In some embodiments, computing device 600 includes one or more of the components illustrated in FIG. 6.

The example computing device 600 includes a processing device 602, a main memory 604 (e.g., read-only memory (ROM), flash memory, dynamic random access memory (DRAM) such as synchronous DRAM (SDRAM), etc.), a static memory 606 (e.g., flash memory, static random access memory (SRAM), etc.), and a secondary memory (e.g., a data storage device 628), which communicate with each other via a bus 608.

Processing device 602 represents one or more general-purpose processors such as a microprocessor, central processing unit, or the like. More particularly, the processing device 602 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processing device 602 may also be one or more special-purpose processing devices such as an application specific integrated circuit (ASIC), a field programmable gate array (FPGA), a digital signal processor (DSP), network processor, or the like. Processing device 602 is configured to execute the processing logic (instructions 626) for performing operations and steps discussed herein.

The computing device 600 may further include a network interface device 622 for communicating with a network 664. The computing device 600 also may include a video display unit 610 (e.g., a liquid crystal display (LCD) or a cathode ray tube (CRT)), an alphanumeric input device 612 (e.g., a keyboard), a cursor control device 614 (e.g., a mouse), and a signal generation device 620 (e.g., a speaker).

The data storage device 628 may include a machine-readable storage medium (or more specifically a non-transitory machine-readable storage medium) 624 on which is stored one or more sets of instructions 626 embodying any one or more of the methodologies or functions described herein. A non-transitory machine-readable storage medium refers to a storage medium other than a carrier wave. The instructions 626 may also reside, completely or at least partially, within the main memory 604 and/or within the processing device 602 during execution thereof by the computing device 600, the main memory 604 and the processing device 602 also constituting computer-readable storage media.

The computer-readable storage medium 624 may also be used to store one or more instructions for dental appliance production and/or a dental appliance generator 420, which may perform one or more of the operations of methods 500A-K described with reference to FIGS. 5A-K. The computer-readable storage medium 624 may also store a software library containing methods that call a dental appliance generator 420. While the computer-readable storage medium 624 is shown in an example embodiment to be a single medium, the term "non-transitory machine-readable storage medium" should be taken to include a single medium or multiple media (e.g., a centralized or distributed database, and/or associated caches and servers) that store the one or more sets of instructions. The term "non-transitory machine-readable storage medium" shall also be taken to include any medium that is capable of storing or encoding a set of instructions for execution by the machine and that cause the machine to perform any one or more of the methodologies of the present disclosure. The term "non-transitory machine-readable storage medium" shall accordingly be taken to include, but not be limited to, solid-state memories, and optical and magnetic media.

Figure 7A:
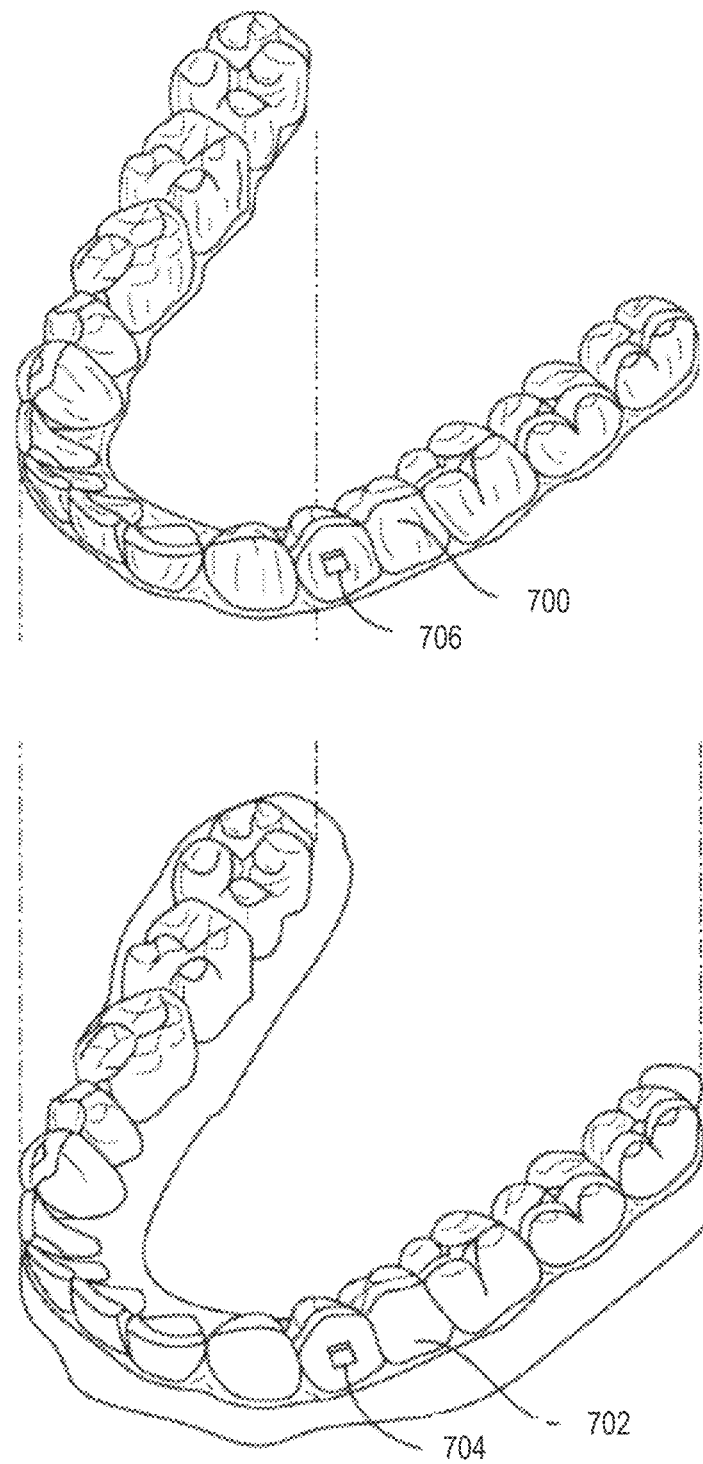
FIG. 7A illustrates a tooth repositioning appliance, according to certain embodiments.

FIG. 7A illustrates an exemplary tooth repositioning dental appliance or aligner 700 that can be worn by a patient in order to achieve an incremental repositioning of individual teeth 702 in the jaw. The aligner 700 may be formed from a mold 100 that includes a beam 120 extending between distal portions 112A-B of the mold 100, as disclosed herein. The appliance can include a shell (e.g., a continuous polymeric shell or a segmented shell) having teeth-receiving cavities that receive and resiliently reposition the teeth. An appliance or portion(s) thereof may be indirectly fabricated using a physical model of teeth. For example, an appliance (e.g., polymeric appliance) can be formed using a physical model of teeth and a sheet of suitable layers of polymeric material. A "polymeric material," as used herein, may include any material formed from a polymer. A "polymer," as used herein, may refer to a molecule composed of repeating structural units connected by covalent chemical bonds often characterized by a substantial number of repeating units (e.g., equal to or greater than 3 repeating units, optionally, in some embodiments equal to or greater than 10 repeating units, in some embodiments greater or equal to 30 repeating units) and a high molecular weight (e.g. greater than or equal to 10,000 Da, in some embodiments greater than or equal to 50,000 Da or greater than or equal to 100,000 Da). Polymers are commonly the polymerization product of one or more monomer precursors. The term polymer includes homopolymers, or polymers consisting essentially of a single repeating monomer subunit. The term polymer also includes copolymers which are formed when two or more different types of monomers are linked in the same polymer. Useful polymers include organic polymers or inorganic polymers that may be in amorphous, semi-amorphous, crystalline or semi-crystalline states. Polymers may include polyolefins, polyesters, polyacrylates, polymethacrylates, polystyrenes, Polypropylenes, polyethylenes, Polyethylene terephthalates, poly lactic acid, polyurethanes, epoxide polymers, polyethers, poly (vinyl chlorides), polysiloxanes, polycarbonates, polyamides, poly acrylonitriles, polybutadienes, poly(cycloolefins), and copolymers. The systems and/or methods provided herein are compatible with a range of plastics and/or polymers. Accordingly, this list is not all inclusive, but rather is exemplary. The plastics can be thermosets or thermoplastics. The plastic may be a thermoplastic.

Examples of materials applicable to the embodiments disclosed herein include, but are not limited to, those materials described in the following patent applications filed by Align Technology: "MULTILAYER DENTAL APPLIANCES AND RELATED METHODS AND SYSTEMS," U.S. Pat. No. 9,655,691 to Li, et al., filed May 14, 2012; "SYSTEMS AND METHODS FOR VARYING ELASTIC MODULUS APPLIANCES," U.S. Pat. No. 6,964,564 to Phan, et al., filed Jul. 26, 2002; "METHODS OF MAKING ORTHODONTIC APPLIANCES," U.S. Pat. No. 7,641,828 to DeSimone, et al., filed Oct. 12, 2004; "TREATMENT OF TEETH BY ALIGNERS," U.S. Pat. No. 8,740,614 to Wen et al., filed Jul. 29, 2009; and any applications claiming benefit therefrom or providing benefit thereto (including publications and issued patents), including any divisional, continuation, or continuation-in-part thereof, the content of which are incorporated by reference herein.

Examples of materials applicable to the embodiments disclosed herein include a hard polymer layer disposed between two soft polymer layers. In some embodiments, the hard inner polymer layer includes a co-polyester and has a polymer layer elastic modulus. In some embodiments, a first soft outer polymer layer and a second soft outer polymer layer each include a thermoplastic polyurethane elastomer and each have a soft polymer elastic modulus less than the hard polymer layer elastic modulus, a flexural modulus of greater than about 35,000 psi, a hardness of about 60A to about 85D, and a thickness in a range from 25 microns to 100 microns. In some embodiments, the hard inner polymer layer is disposed between the first soft outer polymer layer and the second soft outer polymer layer so as to reduce degradation of the resilient position force applied to the teeth when the appliance is worn. The hard polymer layer can include a polyester, a co-polyester, a polycarbonate, a thermoplastic polyurethane, a polypropylene, a polyethylene, a polypropylene and polyethylene copolymer, an acrylic, a cyclic block copolymer, a polyetheretherketone, a polyamide, a polyethylene terephthalate, a polybutylene terephthalate, a polyetherimide, a polyethersulfone, a polytrimethylene terephthalate or a combination thereof (e.g., a blend of at least two of the listed hard polymeric materials). In some embodiments, the hard polymer layer includes two or more hard polymer layers. The soft outer polymer material may include a styrenic block copolymer (SBC), a silicone rubber, an elastomeric alloy, a thermoplastic elastomer (TPE), a thermoplastic vulcanizate (TPV) elastomer, a polyurethane elastomer, a block copolymer elastomer, a polyolefin blend elastomer, a thermoplastic co-polyester elastomer, a thermoplastic polyamide elastomer, or a combination thereof (e.g., a blend of at least two of the listed soft polymeric materials). The soft polymer layers can be the same material or a different material.

Examples of materials applicable to the embodiments disclosed herein include a middle layer disposed between two layers. The two layers individually include a thermoplastic polymer having a flexural modulus of from about 1,000 MPa to 2,500 MPa and a glass transition temperature and/or melting point of from about 80° C. to 180° C. The middle layer includes a polyurethane elastomer having a flexural modulus of from about 50 MPa to about 500 MPa and one or more of a glass transition temperature and/or melting point of from about 90° C. to about 220° C. The polymeric sheet composition has a combined thickness of the middle layer and the outer layers of from 250 microns to 2000 microns and a flexural modulus of from 500 MPa to 1,500 MPa. In some embodiments, the outer layers include one or more of a co-polyester, a polycarbonate, a polyester polycarbonate blend, a polyurethane, a polyamide, or a polyolefin. The middle layer may have a Shore hardness of from A90 to D55 and a compression set of less than 35% after 22 hours at 25° C. In some embodiments, the outer layers have a lateral restoring force of less than 100 Newtons (N) per square centimeter when displayed by 0.05 mm to 0.1 mm relative to each other. In some embodiments, the interplay peel strength between the outer layers and the middle layer is greater than 50 N per 2.5 cm. In some embodiments, the combined thickness of the outer layers is from 50 microns to 1,000 microns. In some embodiments one or more of the outer layers include a microcrystalline polyamide including from 50 to 100 mole % of C6 to C14 aliphatic diacid moieties and about 50 to 100 mole % of 4,4'-methylene-bis(cyclohexylamine), having a glass transition of between about 100° C. and 180° C., a heat of fusion of less than 20 J/g and a light transmission of greater than 80%. In some embodiments, one or more of the outer layers includes a co-polyester including: a dicarboxylic acid component including 70 mole % to 100 mole % of terephthalic acid residues; and a diol component including (i) 0 to 90 mole % ethylene glycol, (ii) 5 mole % to 50 mole % of 2,2,4,4-tetramethyl-1,3-cyclobutanediol residues, (iii) 50 mole % to 95 mole % 1,4-cyclohexanedimethanol residues, and (iv) 0 to 1 mole % of a polyol having three or more hydroxyl groups, where the sum of the mole % of diol residues (i), (ii), (iii), and (iv) amounts to 100 mole % and the co-polyester exhibits a glass transition temperature Tg from 80° C. to 150° C. In some embodiments, the middle layer includes an aromatic polyether polyurethane having a Shore hardness of from A90 to D55 and a compression set of less than 35%, where the interlayer peel strength between the outer layers and the middle layer is greater than 50 N per 2.5 cm. In some embodiments, one or more of the outer layers includes a polyurethane that includes: a di-isocyanate including 80 mole % to 100 mole % of methylene diphenyl diisocyanate residues and/or hydrogenated methylene diphenyl diisocyanate; and a diol component including: (i) 0 to 100 mole % hexamethylene diol; and (ii) 0 to 50 mole % 1,4-cyclohexanedimethanol, where the sum of (i) and (ii) amounts to greater than 90 mole % and the polyurethane has a glass transition temperature Tg from about 85° C. to about 150° C.

Although polymeric aligners are discussed herein, the techniques disclosed may also be applied to aligners having different materials. Some embodiments are discussed herein with reference to orthodontic aligners (also referred to simply as aligners). However, embodiments also extend to other types of shells formed over molds, such as orthodontic retainers, orthodontic splints, sleep appliances for mouth insertion (e.g., for minimizing snoring, sleep apnea, etc.) and/or shells for non-dental applications. Accordingly, it should be understood that embodiments herein that refer to aligners also apply to other types of shells. For example, the principles, features and methods discussed may be applied to any application or process in which it is useful to perform simultaneous forming multiple shells which are any suitable type of shells that are form fitting devices such as eye glass frames, contact or glass lenses, hearing aids or plugs, artificial knee caps, prosthetic limbs and devices, orthopedic inserts, as well as protective equipment such as knee guards, athletic cups, or elbow, chin, and shin guards and other like athletic/protective devices.

The aligner 700 can fit over all teeth present in an upper or lower jaw, or less than all of the teeth. The appliance can be designed specifically to accommodate the teeth of the patient (e.g., the topography of the tooth-receiving cavities matches the topography of the patient's teeth), and may be fabricated based on positive or negative models of the patient's teeth generated by impression, scanning, and the like. Alternatively, the appliance can be a generic appliance configured to receive the teeth, but not necessarily shaped to match the topography of the patient's teeth. In some cases, only certain teeth received by an appliance will be repositioned by the appliance while other teeth can provide a base or anchor region for holding the appliance in place as it applies force against the tooth or teeth targeted for repositioning. In some cases, some, most, or even all of the teeth will be repositioned at some point during treatment. Teeth that are moved can also serve as a base or anchor for holding the appliance as it is worn by the patient. Typically, no wires or other means will be provided for holding an appliance in place over the teeth. In some cases, however, it may be desirable or necessary to provide individual attachments or other anchoring elements 704 on teeth 702 with corresponding receptacles or apertures 706 in the aligner 700 so that the appliance can apply a selected force on the tooth. Exemplary appliances, including those utilized in the Invisalign® System, are described in numerous patents and patent applications assigned to Align Technology, Inc. including, for example, in U.S. Pat. Nos. 6,450,807, and 5,975,893, as well as on the company's website, which is accessible on the World Wide Web (see, e.g., the URL "invisalign.com"). Examples of tooth-mounted attachments suitable for use with orthodontic appliances are also described in patents and patent applications assigned to Align Technology, Inc., including, for example, U.S. Pat. Nos. 6,309,215 and 6,830,450.

Figure 7B:
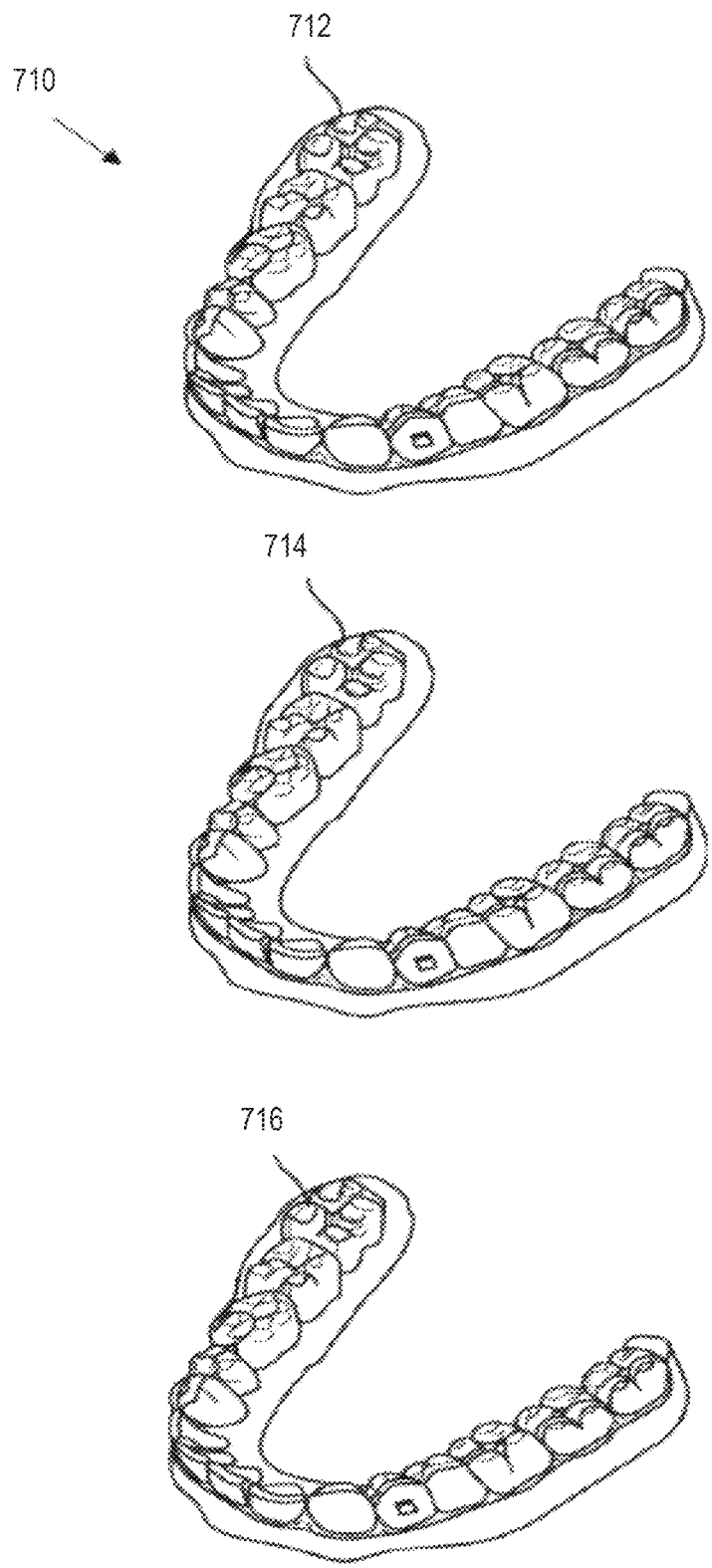
FIG. 7B illustrates a tooth repositioning system, according to certain embodiments.

FIG. 7B illustrates a tooth repositioning system 710 including a plurality of appliances 712, 714, 716. The appliances 712, 714, 716 may be formed from a mold 100 that includes a beam 120 extending between distal portions 112A-B of the mold 100, as disclosed herein. Alternatively, the appliances 712, 714, 716 may be directly manufactured using a rapid prototyping machine such as that discussed herein above. Any of the appliances described herein can be designed and/or provided as part of a set of a plurality of appliances used in a tooth repositioning system. Each appliance may be configured so a tooth-receiving cavity has a geometry corresponding to an intermediate or final tooth arrangement intended for the appliance. The patient's teeth can be progressively repositioned from an initial tooth arrangement to a target tooth arrangement by placing a series of incremental position adjustment appliances over the patient's teeth. For example, the tooth repositioning system 710 can include a first appliance 712 corresponding to an initial tooth arrangement, one or more intermediate appliances 714 corresponding to one or more intermediate arrangements, and a final appliance 716 corresponding to a target arrangement. A target tooth arrangement can be a planned final tooth arrangement selected for the patient's teeth at the end of all planned orthodontic treatment. Alternatively, a target arrangement can be one of some intermediate arrangements for the patient's teeth during the course of orthodontic treatment, which may include various different treatment scenarios, including, but not limited to, instances where surgery is recommended, where interproximal reduction (IPR) is appropriate, where a progress check is scheduled, where anchor placement is best, where palatal expansion is desirable, where restorative dentistry is involved (e.g., inlays, onlays, crowns, bridges, implants, veneers, and the like), etc. As such, it is understood that a target tooth arrangement can be any planned resulting arrangement for the patient's teeth that follows one or more incremental repositioning stages. Likewise, an initial tooth arrangement can be any initial arrangement for the patient's teeth that is followed by one or more incremental repositioning stages.

In some embodiments, the appliances 712, 714, 716 (or portions thereof) can be produced using indirect fabrication techniques, such as by thermoforming over a positive or negative mold. Indirect fabrication of an orthodontic appliance can involve producing a positive or negative mold of the patient's dentition in a target arrangement (e.g., by rapid prototyping, milling, etc.) and thermoforming one or more sheets of material over the mold in order to generate an appliance shell.

In an example of indirect fabrication, a mold of a patient's dental arch may be fabricated from a digital model of the dental arch, and a shell may be formed over the mold (e.g., by thermoforming a polymeric sheet over the mold of the dental arch and then trimming the thermoformed polymeric sheet). The fabrication of the mold may be performed by a rapid prototyping machine (e.g., a stereolithography (SLA) 3D printer). The rapid prototyping machine may receive digital models of molds of dental arches and/or digital models of the appliances 712, 714, 716 after the digital models of the appliances 712, 714, 716 have been processed by processing logic of a computing device, such as the computing device in FIG. 6. The processing logic may include hardware (e.g., circuitry, dedicated logic, programmable logic, microcode, etc.), software (e.g., instructions executed by a processing device), firmware, or a combination thereof. For example, one or more operations may be performed by a processing device executing a dental appliance generator 420.

To manufacture the molds, a shape of a dental arch for a patient at a treatment stage is determined based on a treatment plan. In the example of orthodontics, the treatment plan may be generated based on an intraoral scan of a dental arch to be modeled. The intraoral scan of the patient's dental arch may be performed to generate a 3D virtual model of the patient's dental arch (mold). For example, a full scan of the mandibular and/or maxillary arches of a patient may be performed to generate 3D virtual models thereof. The intraoral scan may be performed by creating multiple overlapping intraoral images from different scanning stations and then stitching together the intraoral images to provide a composite 3D virtual model. In other applications, virtual 3D models may also be generated based on scans of an object to be modeled or based on use of computer aided drafting techniques (e.g., to design the virtual 3D mold). Alternatively, an initial negative mold may be generated from an actual object to be modeled (e.g., a dental impression or the like). The negative mold may then be scanned to determine a shape of a positive mold that will be produced.

Once the virtual 3D model of the patient's dental arch is generated, a dental practitioner may determine a desired treatment outcome, which includes final positions and orientations for the patient's teeth. Processing logic may then determine a number of treatment stages to cause the teeth to progress from starting positions and orientations to the target final positions and orientations. The shape of the final virtual 3D model and each intermediate virtual 3D model may be determined by computing the progression of tooth movement throughout orthodontic treatment from initial tooth placement and orientation to final corrected tooth placement and orientation. For each treatment stage, a separate virtual 3D model of the patient's dental arch at that treatment stage may be generated. The shape of each virtual 3D model will be different. The original virtual 3D model, the final virtual 3D model and each intermediate virtual 3D model is unique and customized to the patient.

Accordingly, multiple different virtual 3D models (digital designs) of a dental arch may be generated for a single patient. A first virtual 3D model may be a unique model of a patient's dental arch and/or teeth as they presently exist, and a final virtual 3D model may be a model of the patient's dental arch and/or teeth after correction of one or more teeth and/or a jaw. Multiple intermediate virtual 3D models may be modeled, each of which may be incrementally different from previous virtual 3D models.

Each virtual 3D model of a patient's dental arch may be used to generate a unique customized physical mold of the dental arch at a particular stage of treatment. The shape of the mold may be at least in part based on the shape of the virtual 3D model for that treatment stage. The virtual 3D model may be represented in a file such as a computer aided drafting (CAD) file or a 3D printable file such as a stereolithography (STL) file. The virtual 3D model for the mold may be sent to a third party (e.g., clinician office, laboratory, manufacturing facility or other entity). The virtual 3D model may include instructions that will control a fabrication system or device in order to produce the mold with specified geometries.

A clinician office, laboratory, manufacturing facility or other entity may receive the virtual 3D model of the mold, the digital model having been created as set forth above. The entity may input the digital model into a rapid prototyping machine. The rapid prototyping machine then manufactures the mold using the digital model. One example of a rapid prototyping manufacturing machine is a 3D printer. 3D printing includes any layer-based additive manufacturing processes. 3D printing may be achieved using an additive process, where successive layers of material are formed in proscribed shapes. 3D printing may be performed using extrusion deposition, granular materials binding, lamination, photopolymerization, continuous liquid interface production (CLIP), or other techniques. 3D printing may also be achieved using a subtractive process, such as milling.

Appliances may be formed from each mold and when applied to the teeth of the patient, may provide forces to move the patient's teeth as dictated by the treatment plan. The shape of each appliance is unique and customized for a particular patient and a particular treatment stage. In an example, the appliances 712, 714, 716 can be pressure formed or thermoformed over the molds. Each mold may be used to fabricate an appliance that will apply forces to the patient's teeth at a particular stage of the orthodontic treatment. The appliances 712, 714, 716 each have teeth-receiving cavities that receive and resiliently reposition the teeth in accordance with a particular treatment stage.

In one embodiment, a sheet of material is pressure formed or thermoformed over the mold. The sheet may be, for example, a sheet of polymeric (e.g., an elastic thermopolymeric, a sheet of polymeric material, etc.). To thermoform the shell over the mold, the sheet of material may be heated to a temperature at which the sheet becomes pliable. Pressure may concurrently be applied to the sheet to form the now pliable sheet around the mold. Once the sheet cools, it will have a shape that conforms to the mold. In one embodiment, a release agent (e.g., a non-stick material) is applied to the mold before forming the shell. This may facilitate later removal of the mold from the shell. Forces may be applied to lift the appliance from the mold. In some instances, a breakage, warpage, or deformation may result from the removal forces. Accordingly, embodiments disclosed herein may determine where the probable point or points of damage may occur in a digital design of the appliance prior to manufacturing and may perform a corrective action.

Additional information may be added to the appliance. The additional information may be any information that pertains to the appliance. Examples of such additional information includes a part number identifier, patient name, a patient identifier, a case number, a sequence identifier (e.g., indicating which appliance a particular liner is in a treatment sequence), a date of manufacture, a clinician name, a logo and so forth. For example, after determining there is a probable point of damage in a digital design of an appliance, an indicator may be inserted into the digital design of the appliance. The indicator may represent a recommended place to begin removing the polymeric appliance to prevent the point of damage from manifesting during removal in some embodiments.

In some embodiments, a library of removal methods/patterns may be established and this library may be referenced when simulating the removal of the aligner in the numerical simulation. Different patients or production technicians may tend to remove aligners differently, and there might be a few typical patterns. For example: 1) some patients lift from the lingual side of posteriors first (first left and then right, or vice versa), and then go around the arch from left/right posterior section to the right/left posterior section; 2) similar to #1, but some other patients lift only one side of the posterior and then go around the arch; 3) similar to #1, but some patients lift from the buccal side rather than the lingual side of the posterior; 4) some patients lift from the anterior incisors and pull hard to remove the aligner; 5) some other patients grab both lingual and buccal side of a posterior location and pull out both sides at the same time; 6) some other patients grab a random tooth in the middle. The library can also include a removal guideline provided by the manufacturer of the aligner. Removal approach may also depend on presence or absence of attachments on teeth as some pf the above method may result in more comfortable way of removal. Based on the attachment situation on each tooth, it can be determined how each patient would probably remove an aligner and adapt that removal procedure for that patient in that specific simulation.

After an appliance is formed over a mold for a treatment stage, the appliance is removed from the mold (e.g., automated removal of the appliance from the mold), and the appliance is subsequently trimmed along a cutline (also referred to as a trim line). The processing logic may determine a cutline for the appliance. The determination of the cutline(s) may be made based on the virtual 3D model of the dental arch at a particular treatment stage, based on a virtual 3D model of the appliance to be formed over the dental arch, or a combination of a virtual 3D model of the dental arch and a virtual 3D model of the appliance. The location and shape of the cutline can be important to the functionality of the appliance (e.g., an ability of the appliance to apply desired forces to a patient's teeth) as well as the fit and comfort of the appliance. For shells such as orthodontic appliances, orthodontic retainers and orthodontic splints, the trimming of the shell may play a role in the efficacy of the shell for its intended purpose (e.g., aligning, retaining or positioning one or more teeth of a patient) as well as the fit of the shell on a patient's dental arch. For example, if too much of the shell is trimmed, then the shell may lose rigidity and an ability of the shell to exert force on a patient's teeth may be compromised. When too much of the shell is trimmed, the shell may become weaker at that location and may be a point of damage when a patient removes the shell from their teeth or when the shell is removed from the mold. In some embodiments, the cut line may be modified in the digital design of the appliance as one of the corrective actions taken when a probable point of damage is determined to exist in the digital design of the appliance.

On the other hand, if too little of the shell is trimmed, then portions of the shell may impinge on a patient's gums and cause discomfort, swelling, and/or other dental issues. Additionally, if too little of the shell is trimmed at a location, then the shell may be too rigid at that location. In some embodiments, the cutline may be a straight line across the appliance at the gingival line, below the gingival line, or above the gingival line. In some embodiments, the cutline may be a gingival cutline that represents an interface between an appliance and a patient's gingiva. In such embodiments, the cutline controls a distance between an edge of the appliance and a gum line or gingival surface of a patient.

Each patient has a unique dental arch with unique gingiva. Accordingly, the shape and position of the cutline may be unique and customized for each patient and for each stage of treatment. For instance, the cutline is customized to follow along the gum line (also referred to as the gingival line). In some embodiments, the cutline may be away from the gum line in some regions and on the gum line in other regions. For example, it may be desirable in some instances for the cutline to be away from the gum line (e.g., not touching the gum) where the shell will touch a tooth and on the gum line (e.g., touching the gum) in the interproximal regions between teeth. Accordingly, it is important that the shell be trimmed along a predetermined cutline.

In some embodiments, the dental appliances (e.g., orthodontic appliances) herein (or portions thereof) can be produced using direct fabrication, such as additive manufacturing techniques (also referred to herein as "3D printing) or subtractive manufacturing techniques (e.g., milling). In some embodiments, direct fabrication involves forming an object (e.g., an orthodontic appliance or a portion thereof) without using a physical template (e.g., mold, mask etc.) to define the object geometry. Additive manufacturing techniques can be categorized as follows: (1) vat photopolymerization (e.g., stereolithography), in which an object is constructed layer by layer from a vat of liquid photopolymer resin; (2) material jetting, in which material is jetted onto a build platform using either a continuous or drop on demand (DOD) approach; (3) binder jetting, in which alternating layers of a build material (e.g., a powder-based material) and a binding material (e.g., a liquid binder) are deposited by a print head; (4) fused deposition modeling (FDM), in which material is drawn though a nozzle, heated, and deposited layer by layer; (5) powder bed fusion, including but not limited to direct metal laser sintering (DMLS), electron beam melting (EBM), selective heat sintering (SHS), selective laser melting (SLM), and selective laser sintering (SLS); (6) sheet lamination, including but not limited to laminated object manufacturing (LOM) and ultrasonic additive manufacturing (UAM); and (7) directed energy deposition, including but not limited to laser engineering net shaping, directed light fabrication, direct metal deposition, and 3D laser cladding. For example, stereolithography can be used to directly fabricate one or more of the appliances 712, 714, and 716. In some embodiments, stereolithography involves selective polymerization of a photosensitive resin (e.g., a photopolymer) according to a desired cross-sectional shape using light (e.g., ultraviolet light). The object geometry can be built up in a layer-by-layer fashion by sequentially polymerizing a plurality of object cross-sections. As another example, the appliances 712, 714, and 716 can be directly fabricated using selective laser sintering. In some embodiments, selective laser sintering involves using a laser beam to selectively melt and fuse a layer of powdered material according to a desired cross-sectional shape in order to build up the object geometry. As yet another example, the appliances 712, 714, and 716 can be directly fabricated by fused deposition modeling. In some embodiments, fused deposition modeling involves melting and selectively depositing a thin filament of thermoplastic polymer in a layer-by-layer manner in order to form an object. In yet another example, material jetting can be used to directly fabricate the appliances 712, 714, and 716. In some embodiments, material jetting involves jetting or extruding one or more materials onto a build surface in order to form successive layers of the object geometry.

In some embodiments, the direct fabrication methods provided herein build up the object geometry in a layer-by-layer fashion, with successive layers being formed in discrete build steps. Alternatively or in combination, direct fabrication methods that allow for continuous build-up of an object geometry can be used, referred to herein as "continuous direct fabrication." Various types of continuous direct fabrication methods can be used. As an example, in some embodiments, the appliances 712, 714, and 716 are fabricated using "continuous liquid interphase printing," in which an object is continuously built up from a reservoir of photopolymerizable resin by forming a gradient of partially cured resin between the building surface of the object and a polymerization-inhibited "dead zone." In some embodiments, a semi-permeable membrane is used to control transport of a photopolymerization inhibitor (e.g., oxygen) into the dead zone in order to form the polymerization gradient. Continuous liquid interphase printing can achieve fabrication speeds about 25 times to about 100 times faster than other direct fabrication methods, and speeds about 1000 times faster can be achieved with the incorporation of cooling systems. Continuous liquid interphase printing is described in U.S. Patent Publication Nos. 2015/0097315, 2015/0097316, and 2015/0102532, the disclosures of each of which are incorporated herein by reference in their entirety.

As another example, a continuous direct fabrication method can achieve continuous build-up of an object geometry by continuous movement of the build platform (e.g., along the vertical or Z-direction) during the irradiation phase, such that the hardening depth of the irradiated photopolymer is controlled by the movement speed. Accordingly, continuous polymerization of material on the build surface can be achieved. Such methods are described in U.S. Pat. No. 7,892,474, the disclosure of which is incorporated herein by reference in its entirety.

In another example, a continuous direct fabrication method can involve extruding a composite material composed of a curable liquid material surrounding a solid strand. The composite material can be extruded along a continuous three-dimensional path in order to form the object. Such methods are described in U.S. Patent Publication No. 2014/0061974, the disclosure of which is incorporated herein by reference in its entirety.

In yet another example, a continuous direct fabrication method utilizes a "heliolithography" approach in which the liquid photopolymer is cured with focused radiation while the build platform is continuously rotated and raised. Accordingly, the object geometry can be continuously built up along a spiral build path. Such methods are described in U.S. Patent Publication No. 2014/0265034, the disclosure of which is incorporated herein by reference in its entirety.

The direct fabrication approaches provided herein are compatible with a wide variety of materials, including but not limited to one or more of the following: a polyester, a co-polyester, a polycarbonate, a thermoplastic polyurethane, a polypropylene, a polyethylene, a polypropylene and polyethylene copolymer, an acrylic, a cyclic block copolymer, a polyetheretherketone, a polyamide, a polyethylene terephthalate, a polybutylene terephthalate, a polyetherimide, a polyethersulfone, a polytrimethylene terephthalate, a styrenic block copolymer (SBC), a silicone rubber, an elastomeric alloy, a thermoplastic elastomer (TPE), a thermoplastic vulcanizate (TPV) elastomer, a polyurethane elastomer, a block copolymer elastomer, a polyolefin blend elastomer, a thermoplastic co-polyester elastomer, a thermoplastic polyamide elastomer, a thermoset material, or combinations thereof. The materials used for direct fabrication can be provided in an uncured form (e.g., as a liquid, resin, powder, etc.) and can be cured (e.g., by photopolymerization, light curing, gas curing, laser curing, crosslinking, etc.) in order to form an orthodontic appliance or a portion thereof. The properties of the material before curing may differ from the properties of the material after curing. Once cured, the materials herein can exhibit sufficient strength, stiffness, durability, biocompatibility, etc. for use in an orthodontic appliance. The post-curing properties of the materials used can be selected according to the desired properties for the corresponding portions of the appliance.

In some embodiments, relatively rigid portions of the orthodontic appliance can be formed via direct fabrication using one or more of the following materials: a polyester, a co-polyester, a polycarbonate, a thermoplastic polyurethane, a polypropylene, a polyethylene, a polypropylene and polyethylene copolymer, an acrylic, a cyclic block copolymer, a polyetheretherketone, a polyamide, a polyethylene terephthalate, a polybutylene terephthalate, a polyetherimide, a polyethersulfone, and/or a polytrimethylene terephthalate.

In some embodiments, relatively elastic portions of the orthodontic appliance can be formed via direct fabrication using one or more of the following materials: a styrenic block copolymer (SBC), a silicone rubber, an elastomeric alloy, a thermoplastic elastomer (TPE), a thermoplastic vulcanizate (TPV) elastomer, a polyurethane elastomer, a block copolymer elastomer, a polyolefin blend elastomer, a thermoplastic co-polyester elastomer, and/or a thermoplastic polyamide elastomer.

Optionally, the direct fabrication methods described herein allow for fabrication of an appliance including multiple materials, referred to herein as "multi-material direct fabrication." In some embodiments, a multi-material direct fabrication method involves concurrently forming an object from multiple materials in a single manufacturing step. For instance, a multi-tip extrusion apparatus can be used to selectively dispense multiple types of materials from distinct material supply sources in order to fabricate an object from a plurality of different materials. Such methods are described in U.S. Pat. No. 6,749,414, the disclosure of which is incorporated herein by reference in its entirety. Alternatively or in combination, a multi-material direct fabrication method can involve forming an object from multiple materials in a plurality of sequential manufacturing steps. For instance, a first portion of the object can be formed from a first material in accordance with any of the direct fabrication methods herein, and then a second portion of the object can be formed from a second material in accordance with methods herein, and so on, until the entirety of the object has been formed.

Direct fabrication can provide various advantages compared to other manufacturing approaches. For instance, in contrast to indirect fabrication, direct fabrication permits production of an orthodontic appliance without utilizing any molds or templates for shaping the appliance, thus reducing the number of manufacturing steps involved and improving the resolution and accuracy of the final appliance geometry. Additionally, direct fabrication permits precise control over the three-dimensional geometry of the appliance, such as the appliance thickness. Complex structures and/or auxiliary components can be formed integrally as a single piece with the appliance shell in a single manufacturing step, rather than being added to the shell in a separate manufacturing step. In some embodiments, direct fabrication is used to produce appliance geometries that would be difficult to create using alternative manufacturing techniques, such as appliances with very small or fine features, complex geometric shapes, undercuts, interproximal structures, shells with variable thicknesses, and/or internal structures (e.g., for improving strength with reduced weight and material usage). For example, in some embodiments, the direct fabrication approaches herein permit fabrication of an orthodontic appliance with feature sizes of less than or equal to about 5 µm, or within a range from about 5 µm to about 50 µm, or within a range from about 20 µm to about 50 µm.

The direct fabrication techniques described herein can be used to produce appliances with substantially isotropic material properties, e.g., substantially the same or similar strengths along all directions. In some embodiments, the direct fabrication approaches herein permit production of an orthodontic appliance with a strength that varies by no more than about 25%, about 20%, about 15%, about 10%, about 5%, about 1%, or about 0.5% along all directions. Additionally, the direct fabrication approaches herein can be used to produce orthodontic appliances at a faster speed compared to other manufacturing techniques. In some embodiments, the direct fabrication approaches herein allow for production of an orthodontic appliance in a time interval less than or equal to about 1 hour, about 30 minutes, about 25 minutes, about 20 minutes, about 15 minutes, about 10 minutes, about 5 minutes, about 4 minutes, about 3 minutes, about 2 minutes, about 1 minutes, or about 30 seconds. Such manufacturing speeds allow for rapid "chair-side" production of customized appliances, e.g., during a routine appointment or checkup.

In some embodiments, the direct fabrication methods described herein implement process controls for various machine parameters of a direct fabrication system or device in order to ensure that the resultant appliances are fabricated with a high degree of precision. Such precision can be beneficial for ensuring accurate delivery of a desired force system to the teeth in order to effectively elicit tooth movements. Process controls can be implemented to account for process variability arising from multiple sources, such as the material properties, machine parameters, environmental variables, and/or post-processing parameters.

Material properties may vary depending on the properties of raw materials, purity of raw materials, and/or process variables during mixing of the raw materials. In many embodiments, resins or other materials for direct fabrication should be manufactured with tight process control to ensure little variability in photo-characteristics, material properties (e.g., viscosity, surface tension), physical properties (e.g., modulus, strength, elongation) and/or thermal properties (e.g., glass transition temperature, heat deflection temperature). Process control for a material manufacturing process can be achieved with screening of raw materials for physical properties and/or control of temperature, humidity, and/or other process parameters during the mixing process. By implementing process controls for the material manufacturing procedure, reduced variability of process parameters and more uniform material properties for each batch of material can be achieved. Residual variability in material properties can be compensated with process control on the machine, as discussed further herein.

Machine parameters can include curing parameters. For digital light processing (DLP)-based curing systems, curing parameters can include power, curing time, and/or grayscale of the full image. For laser-based curing systems, curing parameters can include power, speed, beam size, beam shape and/or power distribution of the beam. For printing systems, curing parameters can include material drop size, viscosity, and/or curing power. These machine parameters can be monitored and adjusted on a regular basis (e.g., some parameters at every 1-x layers and some parameters after each build) as part of the process control on the fabrication machine. Process control can be achieved by including a sensor on the machine that measures power and other beam parameters every layer or every few seconds and automatically adjusts them with a feedback loop. For DLP machines, gray scale can be measured and calibrated at the end of each build. In addition, material properties and/or photo-characteristics can be provided to the fabrication machine, and a machine process control module can use these parameters to adjust machine parameters (e.g., power, time, gray scale, etc.) to compensate for variability in material properties. By implementing process controls for the fabrication machine, reduced variability in appliance accuracy and residual stress can be achieved.

In many embodiments, environmental variables (e.g., temperature, humidity, Sunlight or exposure to other energy/curing source) are maintained in a tight range to reduce variable in appliance thickness and/or other properties. Optionally, machine parameters can be adjusted to compensate for environmental variables.

In many embodiments, post-processing of appliances includes cleaning, post-curing, and/or support removal processes. Relevant post-processing parameters can include purity of cleaning agent, cleaning pressure and/or temperature, cleaning time, post-curing energy and/or time, and/or consistency of support removal process. These parameters can be measured and adjusted as part of a process control scheme. In addition, appliance physical properties can be varied by modifying the post-processing parameters. Adjusting post-processing machine parameters can provide another way to compensate for variability in material properties and/or machine properties.

Once appliances (e.g., aligners) are directly fabricated, they may be inspected using the systems and/or methods described herein above.

The configuration of the orthodontic appliances herein can be determined according to a treatment plan for a patient, e.g., a treatment plan involving successive administration of a plurality of appliances for incrementally repositioning teeth. Computer-based treatment planning and/or appliance manufacturing methods can be used in order to facilitate the design and fabrication of appliances. For instance, one or more of the appliance components described herein can be digitally designed and fabricated with the aid of computer-controlled manufacturing devices (e.g., computer numerical control (CNC) milling, computer-controlled rapid prototyping such as 3D printing, etc.). The computer-based methods presented herein can improve the accuracy, flexibility, and convenience of appliance fabrication.

Figure 7C:
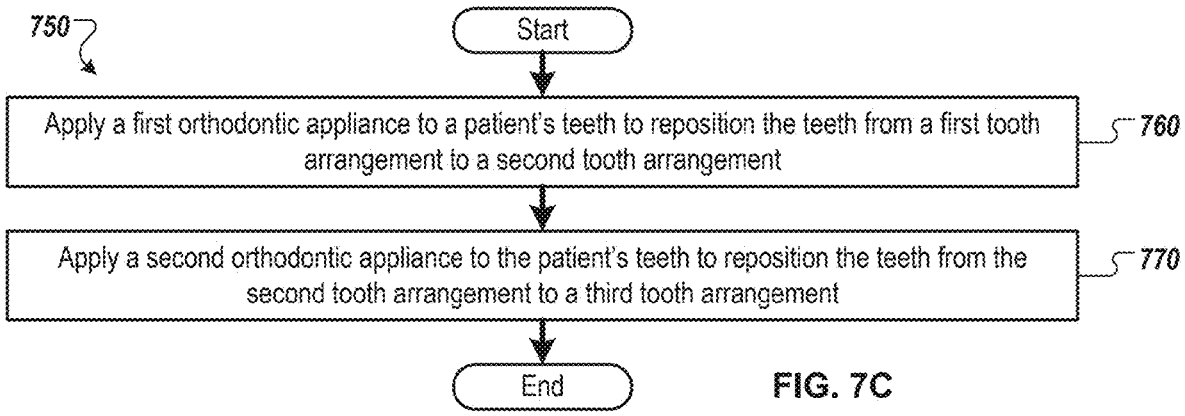
FIG. 7C illustrates a method of orthodontic treatment using a plurality of appliances, according to certain embodiments.

FIG. 7C illustrates a method 750 of orthodontic treatment using a plurality of appliances, in accordance with embodiments. One or more of the plurality of appliances may be formed from a mold 100 that includes a beam 120 extending between distal portions 112A-B of the mold 100, as disclosed herein. The method 750 can be practiced using any of the appliances or appliance sets described herein. In block 760, a first orthodontic appliance is applied to a patient's teeth in order to reposition the teeth from a first tooth arrangement to a second tooth arrangement. In block 770, a second orthodontic appliance is applied to the patient's teeth in order to reposition the teeth from the second tooth arrangement to a third tooth arrangement. The method 750 can be repeated as necessary using any suitable number and combination of sequential appliances in order to incrementally reposition the patient's teeth from an initial arrangement to a target arrangement. The appliances can be generated all at the same stage or in sets or batches (e.g., at the beginning of a stage of the treatment), or the appliances can be fabricated one at a time, and the patient can wear each appliance until the pressure of each appliance on the teeth can no longer be felt or until the maximum amount of expressed tooth movement for that given stage has been achieved. A plurality of different appliances (e.g., a set) can be designed and even fabricated prior to the patient wearing any appliance of the plurality. After wearing an appliance for an appropriate period of time, the patient can replace the current appliance with the next appliance in the series until no more appliances remain. The appliances are generally not affixed to the teeth and the patient may place and replace the appliances at any time during the procedure (e.g., patient-removable appliances). The final appliance or several appliances in the series may have a geometry or geometries selected to overcorrect the tooth arrangement. For instance, one or more appliances may have a geometry that would (if fully achieved) move individual teeth beyond the tooth arrangement that has been selected as the "final." Such over-correction may be desirable in order to offset potential relapse after the repositioning method has been terminated (e.g., permit movement of individual teeth back toward their pre-corrected positions). Over-correction may also be beneficial to speed the rate of correction (e.g., an appliance with a geometry that is positioned beyond a desired intermediate or final position may shift the individual teeth toward the position at a greater rate). In such cases, the use of an appliance can be terminated before the teeth reach the positions defined by the appliance. Furthermore, over-correction may be deliberately applied in order to compensate for any inaccuracies or limitations of the appliance.

Figure 8:
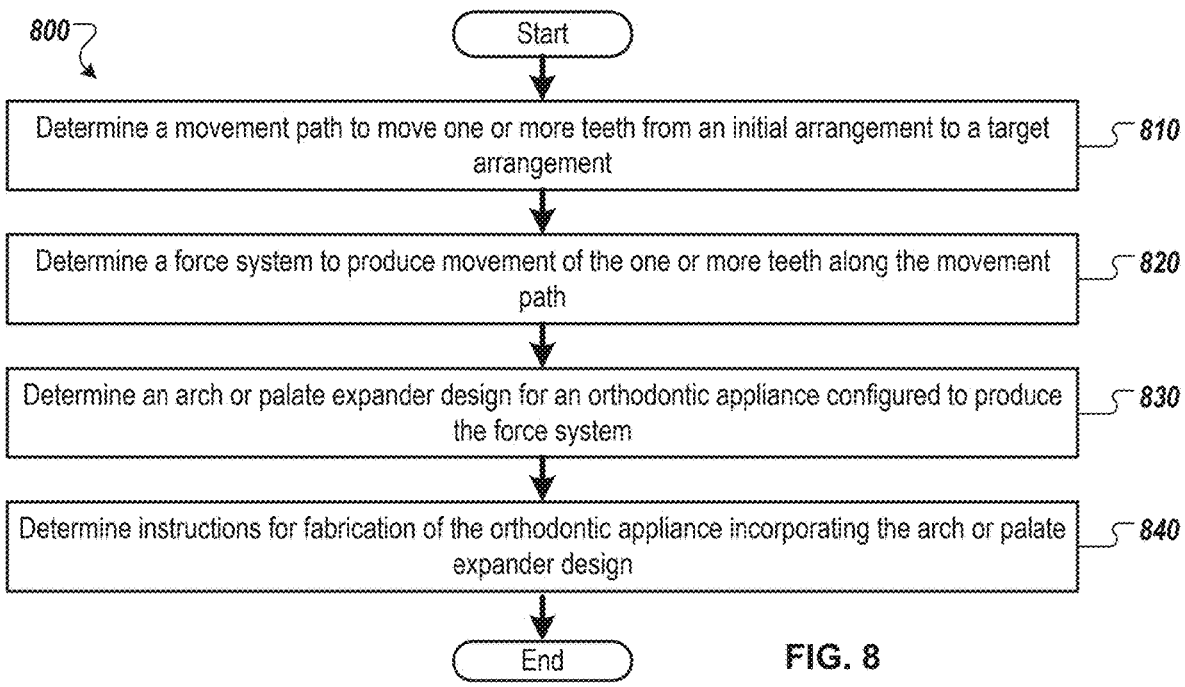
FIG. 8 illustrates a method for designing an orthodontic appliance, according to certain embodiments.

FIG. 8 illustrates a method 800 for designing an orthodontic appliance to be produced by direct fabrication, in accordance with embodiments. The method 800 can be applied to any embodiment of the orthodontic appliances that may be formed from a mold 100 that includes a beam 120 extending between distal portions 112A-B of the mold 100, as disclosed herein. Some or all of the blocks of the method 800 can be performed by any suitable data processing system or device, e.g., one or more processors configured with suitable instructions.

In block 810, a movement path to move one or more teeth from an initial arrangement to a target arrangement is determined. The initial arrangement can be determined from a mold or a scan of the patient's teeth or mouth tissue, e.g., using wax bites, direct contact scanning, x-ray imaging, tomographic imaging, sonographic imaging, and other techniques for obtaining information about the position and structure of the teeth, jaws, gums and other orthodontically relevant tissue. From the obtained data, a digital data set can be derived that represents the initial (e.g., pretreatment) arrangement of the patient's teeth and other tissues. Optionally, the initial digital data set is processed to segment the tissue constituents from each other. For example, data structures that digitally represent individual tooth crowns can be produced. Advantageously, digital models of entire teeth can be produced, including measured or extrapolated hidden surfaces and root structures, as well as surrounding bone and soft tissue.

The target arrangement of the teeth (e.g., a desired and intended end result of orthodontic treatment) can be received from a clinician in the form of a prescription, can be calculated from basic orthodontic principles, and/or can be extrapolated computationally from a clinical prescription. With a specification of the desired final positions of the teeth and a digital representation of the teeth themselves, the final position and surface geometry of each tooth can be specified to form a complete model of the tooth arrangement at the desired end of treatment.

Having both an initial position and a target position for each tooth, a movement path can be defined for the motion of each tooth. In some embodiments, the movement paths are configured to move the teeth in the quickest fashion with the least amount of round-tripping to bring the teeth from their initial positions to their desired target positions. The tooth paths can optionally be segmented, and the segments can be calculated so that each tooth's motion within a segment stays within threshold limits of linear and rotational translation. In this way, the end points of each path segment can constitute a clinically viable repositioning, and the aggregate of segment end points can constitute a clinically viable sequence of tooth positions, so that moving from one point to the next in the sequence does not result in a collision of teeth.

In block 820, a force system to produce movement of the one or more teeth along the movement path is determined. A force system can include one or more forces and/or one or more torques. Different force systems can result in different types of tooth movement, such as tipping, translation, rotation, extrusion, intrusion, root movement, etc. Biomechanical principles, modeling techniques, force calculation/measurement techniques, and the like, including knowledge and approaches commonly used in orthodontia, may be used to determine the appropriate force system to be applied to the tooth to accomplish the tooth movement. In determining the force system to be applied, sources may be considered including literature, force systems determined by experimentation or virtual modeling, computer-based modeling, clinical experience, minimization of unwanted forces, etc.

The determination of the force system can include constraints on the allowable forces, such as allowable directions and magnitudes, as well as desired motions to be brought about by the applied forces. For example, in fabricating palatal expanders, different movement strategies may be desired for different patients. For example, the amount of force needed to separate the palate can depend on the age of the patient, as very young patients may not have a fully-formed suture. Thus, in juvenile patients and others without fully-closed palatal sutures, palatal expansion can be accomplished with lower force magnitudes. Slower palatal movement can also aid in growing bone to fill the expanding suture. For other patients, a more rapid expansion may be desired, which can be achieved by applying larger forces. These requirements can be incorporated as needed to choose the structure and materials of appliances; for example, by choosing palatal expanders capable of applying large forces for rupturing the palatal suture and/or causing rapid expansion of the palate. Subsequent appliance stages can be designed to apply different amounts of force, such as first applying a large force to break the suture, and then applying smaller forces to keep the suture separated or gradually expand the palate and/or arch.

The determination of the force system can also include modeling of the facial structure of the patient, such as the skeletal structure of the jaw and palate. Scan data of the palate and arch, such as X-ray data or 3D optical scanning data, for example, can be used to determine parameters of the skeletal and muscular system of the patient's mouth, so as to determine forces sufficient to provide a desired expansion of the palate and/or arch. In some embodiments, the thickness and/or density of the mid-palatal suture may be measured, or input by a treating professional. In other embodiments, the treating professional can select an appropriate treatment based on physiological characteristics of the patient. For example, the properties of the palate may also be estimated based on factors such as the patient's age—for example, young juvenile patients will typically require lower forces to expand the suture than older patients, as the suture has not yet fully formed.

In block 830, appliance design for an orthodontic appliance configured to produce the force system is determined. Determination of the orthodontic appliance, appliance geometry, material composition, and/or properties can be performed using a treatment or force application simulation environment. A simulation environment can include, e.g., computer modeling systems, biomechanical systems or apparatus, and the like. Optionally, digital models of the appliance and/or teeth can be produced, such as finite element models. The finite element models can be created using computer program application software available from a variety of vendors. For creating solid geometry models, computer aided engineering (CAE) or computer aided design (CAD) programs can be used, such as the Auto-CAD® software products available from Autodesk, Inc., of San Rafael, CA. For creating finite element models and analyzing them, program products from a number of vendors can be used, including finite element analysis packages from ANSYS, Inc., of Canonsburg, PA, and SIMULIA (Abaqus) software products from Dassault Systèmes of Waltham, MA.

Optionally, one or more orthodontic appliances can be selected for testing or force modeling. As noted above, a desired tooth movement, as well as a force system required or desired for eliciting the desired tooth movement, can be identified. Using the simulation environment, a candidate orthodontic appliance can be analyzed or modeled for determination of an actual force system resulting from use of the candidate appliance. One or more modifications can optionally be made to a candidate appliance, and force modeling can be further analyzed as described, e.g., in order to iteratively determine an appliance design that produces the desired force system.

In block 840, instructions for fabrication of the orthodontic appliance incorporating the appliance design are generated. The instructions can be configured to control a fabrication system or device in order to produce the orthodontic appliance with the specified orthodontic appliance. In some embodiments, the instructions are configured for manufacturing the orthodontic appliance using direct fabrication (e.g., stereolithography, selective laser sintering, fused deposition modeling, 3D printing, continuous direct fabrication, multi-material direct fabrication, etc.), in accordance with the various methods presented herein. In alternative embodiments, the instructions can be configured for indirect fabrication of the appliance, e.g., by thermoforming. In some embodiments, the instructions for fabrication of the orthodontic appliance include instructions for forming a mold 100 that includes a beam 120 extending between distal portions 112A-B of the mold 100, as disclosed herein.

Method 800 may comprise additional blocks: 1) The upper arch and palate of the patient is scanned intraorally to generate three dimensional data of the palate and upper arch; and/or 2) The three dimensional shape profile of the appliance is determined to provide a gap and teeth engagement structures as described herein.

Although the above blocks show a method 800 of designing an orthodontic appliance in accordance with some embodiments, a person of ordinary skill in the art will recognize some variations based on the teaching described herein. Some of the blocks may comprise sub-blocks. Some of the blocks may be repeated as often as desired. One or more blocks of the method 800 may be performed with any suitable fabrication system or device, such as the embodiments described herein. Some of the blocks may be optional, and the order of the blocks can be varied as desired.

Figure 9:
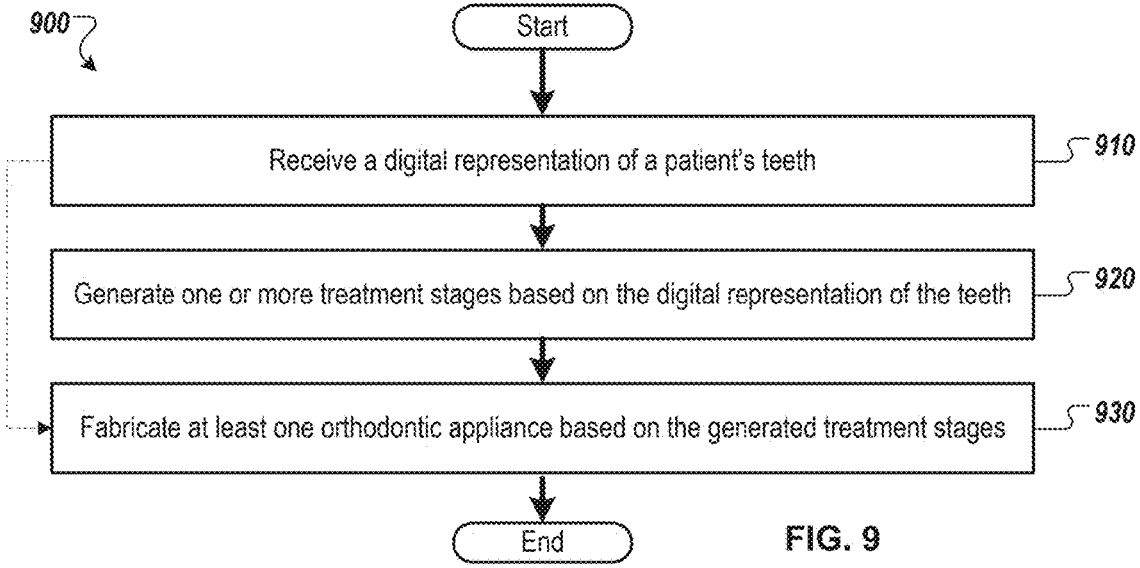
FIG. 9 illustrates a method for digitally planning an orthodontic treatment, according to certain embodiments.

FIG. 9 illustrates a method 900 for digitally planning an orthodontic treatment and/or design or fabrication of an appliance, in accordance with embodiments. The method 900 can be applied to any of the treatment procedures described herein and can be performed by any suitable data processing system.

In block 910, a digital representation of a patient's teeth is received. The digital representation can include surface topography data for the patient's intraoral cavity (including teeth, gingival tissues, etc.). The surface topography data can be generated by directly scanning the intraoral cavity, a physical model (positive or negative) of the intraoral cavity, or an impression of the intraoral cavity, using a suitable scanning device (e.g., a handheld scanner, desktop scanner, etc.).

In block 920, one or more treatment stages are generated based on the digital representation of the teeth. The treatment stages can be incremental repositioning stages of an orthodontic treatment procedure designed to move one or more of the patient's teeth from an initial tooth arrangement to a target arrangement. For example, the treatment stages can be generated by determining the initial tooth arrangement indicated by the digital representation, determining a target tooth arrangement, and determining movement paths of one or more teeth in the initial arrangement necessary to achieve the target tooth arrangement. The movement path can be optimized based on minimizing the total distance moved, preventing collisions between teeth, avoiding tooth movements that are more difficult to achieve, or any other suitable criteria.

In block 930, at least one orthodontic appliance is fabricated based on the generated treatment stages. For example, a set of appliances can be fabricated, each shaped according a tooth arrangement specified by one of the treatment stages, such that the appliances can be sequentially worn by the patient to incrementally reposition the teeth from the initial arrangement to the target arrangement. The appliance set may include one or more of the orthodontic appliances described herein. The fabrication of the appliance may involve creating a digital model of the appliance to be used as input to a computer-controlled fabrication system. The appliance can be formed using direct fabrication methods, indirect fabrication methods, or combinations thereof, as desired. The fabrication of the appliance may be via a mold 100 that includes a beam 120 extending between distal portions 112A-B of the mold 100, as disclosed herein.

In some instances, staging of various arrangements or treatment stages may not be necessary for design and/or fabrication of an appliance. As illustrated by the dashed line in FIG. 9, design and/or fabrication of an orthodontic appliance, and perhaps a particular orthodontic treatment, may include use of a representation of the patient's teeth (e.g., receive a digital representation of the patient's teeth at block 910), followed by design and/or fabrication of an orthodontic appliance based on a representation of the patient's teeth in the arrangement represented by the received representation.

Other examples of aligners including features that may be formed to be more rigid than tooth-engagement regions may include apparatuses with an occlusal block, such as those described in US20210169617, incorporated herein by reference in its entirety.

In general, any of the aligners described herein may have variable properties, including a mix of regions of different stiffness/compliances (e.g., Young's modulus). For example, the methods and features described herein may be used with and/or may modify the apparatuses shown and described in US20170007359A1, herein incorporated by reference in its entirety. For example, the methods described herein may be used to make any of the dental appliances shown and described in the in US20170007359A1.

It is to be understood that the above description is intended to be illustrative, and not restrictive. Many other embodiments will be apparent upon reading and understanding the above description. Although embodiments of the present disclosure have been described with reference to specific example embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense. The scope of the invention should, therefore, be determined with reference to the appended claims, along with the full scope of equivalents to which such claims are entitled.

What is claimed is:

1. A mold for a dental appliance, the mold comprising:
    a dental arch portion, the dental arch portion comprising a first distal portion, a second distal portion, and an incisor portion disposed between the first distal portion and the second distal portion; and
    a beam extending from the first distal portion to the second distal portion to reinforce the mold, wherein the beam comprises a label portion forming a label for identification of the mold, and wherein at least one of:
        the label comprises through-holes that form at least a portion of an identifier of the label;
        the beam comprises a reinforcement portion between the first distal portion of the dental arch portion and the second distal portion of the dental arch portion; or
        the mold further comprises a first chamfer disposed between the label portion and the first distal portion of the dental arch portion.

2. The mold of claim 1, wherein the label comprises the through-holes from an upper surface of the label portion to a lower surface of the label portion, and wherein the through-holes form digits of the identifier of the label.

3. The mold of claim 1, further comprising:
    a pick and place component coupled to the beam, wherein the pick and place component is configured to be secured by dental appliance manufacturing equipment.

4. The mold of claim 1, wherein the beam comprises a flat portion configured to interface with a locking mechanism of a plate to secure the mold to the plate in a z-direction.

5. The mold of claim 1 further comprising a plurality of identifier features extending from one or more sidewalls of the beam for automated identification of the mold.

6. The mold of claim 1, wherein the beam comprises the reinforcement portion extending from the first distal portion of the dental arch portion to the second distal portion of the dental arch portion, and wherein the reinforcement portion is configured to reinforce the beam, and wherein the reinforcement portion has a greater thickness than the label portion.

7. The mold of claim 1, further comprising:
    the first chamfer disposed between the label portion and the first distal portion of the dental arch portion; and
    a second chamfer disposed between the label portion and the second distal portion of the dental arch portion.

8. A method comprising:
    determining a position of a beam of a mold relative to a dental arch portion of the mold, the dental arch portion comprising a first distal portion, a second distal portion, and an incisor portion disposed between the first distal portion and the second distal portion, wherein the beam is to extend from the first distal portion to the second distal portion;
    determining layout of an identifier to be formed on the beam between the first distal portion and the second distal portion; and
    determining a shape of the beam to be attached to the dental arch portion of the mold, wherein the mold is to be formed based on the position of the beam, the layout of the identifier, and the shape of the beam, wherein the beam comprises a label portion forming a label for identification of the mold, and wherein at least one of:
        the label comprises through-holes that form at least a portion of the identifier of the label;
        the beam comprises a reinforcement portion between the first distal portion of the dental arch portion and the second distal portion of the dental arch portion; or
        the mold further comprises a first chamfer disposed between the label portion and the first distal portion of the dental arch portion.

9. The method of claim 8, wherein the determining of the position of the beam comprises:
    identifying a plurality of transformations of the mold, wherein each of the plurality of transformations comprises a corresponding position of the beam relative to the dental arch portion;
    slicing a three-dimensional (3D) model of the dental arch portion to generate two-dimensional (2D) contours of the 3D model; and
    selecting, based on the 2D contours, a first transformation of the plurality of transformations, wherein the first transformation comprises the position of the beam relative to the dental arch portion.

10. The method of claim 9, wherein the selecting of the first transformation comprises:
    determining a width distance between distal ends of the beam from the first distal portion to the second distal portion in the first transformation meets a threshold distance.

11. The method of claim 9, wherein the selecting of the first transformation comprises:
    determining that the beam is positioned between the incisor portion of the dental arch portion and a line intersecting a first distal end of the first distal portion and a second distal end of the second distal portion in the first transformation; and
    determining a length distance between the beam and the line in the first transformation meets a threshold distance.

12. The method of claim 9, wherein the selecting of the first transformation comprises:
    determining a feature offset distance between a pick and place component of the beam and corresponding identifier features extending from the beam in the first transformation meets a threshold distance, wherein the feature offset distance provides clearance for dental appliance manufacturing equipment to secure the pick and place component to move the mold.

13. The method of claim 9, wherein the selecting of the first transformation comprises:
    determining that the identifier to be formed in the beam is not obstructed by geometries of the mold.

14. The method of claim 9, wherein the selecting of the first transformation is further based on determining a gap distance between a trim line of the dental arch portion and a connection between the dental arch portion and the beam in the first transformation meets a threshold distance.

15. The method of claim 8, wherein the determining of the layout of the identifier to be formed on the beam comprises:
   identifying a predefined format for the label portion of the beam;
   determining, based on the identifier, digits of a label to be formed in the label portion of the beam; and
   determining, based on the identifier, a plurality of identifier features that are to extend from sidewalls of the beam, wherein the identifier features form a binary code to be decoded to verify the identifier determined from the digits of the label.

16. The method of claim 8, wherein the label portion is substantially flat, the label portion forming stencil digits cut through the beam based on the identifier, and the beam further comprises a plurality of identifier features extending from sidewalls of the beam.

17. The method of claim 16, wherein the shape of the beam comprises:
   the reinforcement portion configured to prevent deformation of the beam, wherein the reinforcement portion has a greater thickness than the label portion of the beam.

18. The method of claim 8, wherein the shape of the beam comprises:
   the first chamfer and a second chamfer between the label portion of the beam and the dental arch portion to prevent breakage of the beam, wherein the first chamfer and the second chamfer are to provide a gap distance between the beam and a trim line of the mold.

19. A non-transitory machine-readable storage medium storing instructions which, when executed, cause a processing device to perform operations comprising:
   determining a position of a beam of a mold relative to a dental arch portion of the mold, the dental arch portion comprising a first distal portion, a second distal portion, and an incisor portion disposed between the first distal portion and the second distal portion, wherein the beam is to extend from the first distal portion to the second distal portion;
   determining layout of an identifier to be formed on the beam between the first distal portion and the second distal portion; and
   determining a shape of the beam to be attached to the dental arch portion of the mold, wherein the mold is to be formed based on the position of the beam, the layout of the identifier, and the shape of the beam, wherein the beam comprises a label portion forming a label for identification of the mold, and wherein at least one of:
   the label comprises through-holes that form at least a portion of the identifier of the label;
   the beam comprises a reinforcement portion between the first distal portion of the dental arch portion and the second distal portion of the dental arch portion; or
   the mold further comprises a first chamfer disposed between the label portion and the first distal portion of the dental arch portion.

20. A system comprising:
a memory; and
a processing device coupled to the memory, the processing device to:
   determine a position of a beam of a mold relative to a dental arch portion of the mold, the dental arch portion comprising a first distal portion, a second distal portion, and an incisor portion disposed between the first distal portion and the second distal portion, wherein the beam is to extend from the first distal portion to the second distal portion;
   determine layout of an identifier to be formed on the beam between the first distal portion and the second distal portion; and
   determine a shape of the beam to be attached to the dental arch portion of the mold, wherein the mold is to be formed based on the position of the beam, the layout of the identifier, and the shape of the beam, wherein the beam comprises a label portion forming a label for identification of the mold, and wherein at least one of:
   the label comprises through-holes that form at least a portion of the identifier of the label;
   the beam comprises a reinforcement portion between the first distal portion of the dental arch portion and the second distal portion of the dental arch portion; or
   the mold further comprises a first chamfer disposed between the label portion and the first distal portion of the dental arch portion.

* * * * *